United States Patent
Rivers et al.

(10) Patent No.: US 10,556,356 B2
(45) Date of Patent: Feb. 11, 2020

(54) SYSTEMS AND METHODS FOR PERFORMING A TASK ON A MATERIAL, OR LOCATING THE POSITION OF A DEVICE RELATIVE TO THE SURFACE OF THE MATERIAL

(71) Applicant: Shaper Tools, Inc., San Francisco, CA (US)

(72) Inventors: Alec Rothmyer Rivers, Oakland, CA (US); Ilan Ellison Moyer, Belmont, MA (US)

(73) Assignee: Sharper Tools, Inc., San Francisco, CA (US)

( * ) Notice: Subject to any disclaimer, the term of this patent is extended or adjusted under 35 U.S.C. 154(b) by 361 days.

(21) Appl. No.: 14/396,291

(22) PCT Filed: Apr. 26, 2013

(86) PCT No.: PCT/US2013/038474
§ 371 (c)(1),
(2) Date: Oct. 22, 2014

(87) PCT Pub. No.: WO2013/163588
PCT Pub. Date: Oct. 31, 2013

(65) Prior Publication Data
US 2015/0094836 A1  Apr. 2, 2015

Related U.S. Application Data

(60) Provisional application No. 61/639,062, filed on Apr. 26, 2012, provisional application No. 61/729,247, filed on Nov. 21, 2012.

(51) Int. Cl.
*B26D 5/00* (2006.01)
*G06F 3/042* (2006.01)
(Continued)

(52) U.S. Cl.
CPC .............. *B26D 5/007* (2013.01); *B23B 25/06* (2013.01); *B23Q 17/22* (2013.01);
(Continued)

(58) Field of Classification Search
CPC .......... H04N 2201/02439; H04N 2201/04758; H04N 1/12; H04N 1/192;
(Continued)

(56) References Cited

U.S. PATENT DOCUMENTS 4,199,814 A    4/1980  Johnson
4,326,824 A *  4/1982  Lasermann ............ B23Q 17/22
                                                         408/1 R (Continued)

FOREIGN PATENT DOCUMENTS

CN      101376194 B      2/2011
DE         3942901       6/1991
(Continued)

OTHER PUBLICATIONS

U.S. Office Action for U.S. Appl. No. 14/678,752 dated Nov. 4, 2015.
(Continued)

*Primary Examiner* — Crystal J Barnes-Bullock
(74) *Attorney, Agent, or Firm* — Almanac IP Advisors LLP

(57) ABSTRACT

Systems and methods of the present disclosure relate generally to facilitate performing a task on a surface such as woodworking or printing. More specifically, in some embodiments, the present disclosure relates to mapping the surface of the material and determining the precise location of a tool in reference to the surface of a material. Some embodiments relate to obtaining and relating a design with the map of the material or displaying the current position of the tool on a display device. In some embodiments, the
(Continued)

present disclosure facilitates adjusting, moving or autocorrecting the tool along a predetermined path such as, e.g., a cutting or drawing path. In some embodiments, the reference location may correspond to a design or plan obtained from obtained via an online design store.

42 Claims, 36 Drawing Sheets

(51) Int. Cl.
    *B23Q 17/22*     (2006.01)
    *B23B 25/06*     (2006.01)
    *G05B 19/18*     (2006.01)
    *G05B 19/19*     (2006.01)
    *G05B 19/4069*     (2006.01)
    *H04N 9/31*     (2006.01)
    *H04N 1/12*     (2006.01)
    *H04N 1/192*     (2006.01)
    *G05B 19/4097*     (2006.01)

(52) U.S. Cl.
CPC ........... *B23Q 17/2233* (2013.01); *B26D 5/00* (2013.01); *B26D 5/005* (2013.01); *G05B 19/18* (2013.01); *G05B 19/19* (2013.01); *G05B 19/4069* (2013.01); *G05B 19/4097* (2013.01); *G06F 3/0425* (2013.01); *H04N 1/12* (2013.01); *H04N 1/192* (2013.01); *H04N 9/3179* (2013.01); *H04N 9/3194* (2013.01); *B26D 2005/002* (2013.01); *G05B 2219/32001* (2013.01); *G05B 2219/36342* (2013.01); *G05B 2219/36429* (2013.01); *H04N 2201/02439* (2013.01); *H04N 2201/0471* (2013.01); *H04N 2201/04717* (2013.01); *H04N 2201/04758* (2013.01); *Y10T 408/03* (2015.01); *Y10T 408/172* (2015.01); *Y10T 408/175* (2015.01)

(58) Field of Classification Search
CPC . H04N 2201/0471; H04N 2201/04717; H04N 9/3179; H04N 9/3194; Y10T 408/03; Y10T 408/172; Y10T 408/175; G06F 3/0425; B23Q 17/22; B23Q 17/2233; B23B 25/06; G05B 19/18; G05B 19/19; G05B 19/4069; G05B 19/4097; G05B 2219/32001; G05B 2219/36342; G05B 2219/36429; B26D 5/00; B26D 5/005; B26D 5/007; B26D 2005/002
See application file for complete search history.

(56) References Cited

U.S. PATENT DOCUMENTS

| | | |
|---|---|---|
| 4,552,493 A | 11/1985 | Schultshick |
| 4,598,380 A | 7/1986 | Holmes |
| 4,678,976 A | 7/1987 | Inoue |
| 4,734,845 A | 3/1988 | Kawamura |
| 4,752,160 A | 6/1988 | Murray |
| 4,788,481 A | 11/1988 | Niwa |
| 4,789,931 A | 12/1988 | Kuragano et al. |
| 4,907,169 A | 3/1990 | Lovoi |
| 4,912,625 A | 3/1990 | Glatfelter |
| 4,949,270 A | 8/1990 | Shima |
| 4,965,499 A | 10/1990 | Taft et al. |
| 5,010,652 A | 4/1991 | Miletich |
| 5,095,788 A | 3/1992 | Matoni |
| 5,139,376 A | 8/1992 | Pumphrey |
| 5,150,306 A | 9/1992 | Kawamura |
| 5,172,326 A | 12/1992 | Campbell, Jr. et al. |
| 5,175,688 A | 12/1992 | Sasaki |
| 5,243,665 A * | 9/1993 | Maney ............ H01L 21/67242 348/128 |
| 5,255,199 A | 10/1993 | Barkman et al. |
| 5,333,111 A * | 7/1994 | Chaiken ................ B26D 5/00 382/111 |
| 5,406,494 A | 4/1995 | Schuett |
| 5,436,027 A * | 7/1995 | Offer ..................... B05D 1/325 427/10 |
| 5,448,146 A | 9/1995 | Erlbacher |
| 5,465,215 A | 11/1995 | Stricklan et al. |
| 5,467,003 A | 11/1995 | Kosaka et al. |
| 5,506,682 A | 4/1996 | Pryor |
| 5,575,099 A | 11/1996 | Strobel |
| 5,602,453 A | 2/1997 | Sekikawa |
| 5,686,960 A | 11/1997 | Sussman |
| 5,777,880 A | 7/1998 | Bowen et al. |
| 5,780,805 A * | 7/1998 | Duncan, Jr. .......... B23K 26/361 219/121.68 |
| 5,799,135 A | 8/1998 | Terawaki |
| 5,807,449 A | 9/1998 | Hooker et al. |
| 5,815,683 A | 9/1998 | Vogler |
| 5,831,407 A | 11/1998 | Ouchi |
| 5,831,857 A | 11/1998 | Clarino et al. |
| 5,857,812 A * | 1/1999 | Stahl ................ B23B 29/03432 33/634 |
| 5,886,319 A * | 3/1999 | Preston ................ B23K 26/032 219/121.72 |
| 5,959,425 A | 9/1999 | Bieman et al. |
| 5,963,451 A | 10/1999 | Seki |
| 6,019,554 A | 2/2000 | Hong |
| 6,044,308 A | 3/2000 | Huissoon |
| 6,073,058 A | 6/2000 | Cossen et al. |
| 6,075,223 A | 6/2000 | Harrison |
| 6,107,768 A | 8/2000 | Ouchi et al. |
| 6,161,055 A | 12/2000 | Pryor |
| 6,167,328 A | 12/2000 | Takaoka |
| 6,269,283 B1 | 7/2001 | Shinozaki |
| 6,292,715 B1 | 9/2001 | Rongo |
| 6,304,050 B1 | 10/2001 | Skaar et al. |
| 6,311,098 B1 | 10/2001 | Higasayama et al. |
| 6,330,492 B1 | 12/2001 | Wisniewski |
| 6,397,124 B1 | 5/2002 | Lan |
| 6,430,472 B1 | 8/2002 | Boillot |
| 6,447,223 B1 | 9/2002 | Farah |
| 6,456,896 B1 | 9/2002 | Ito et al. |
| 6,474,378 B1 | 11/2002 | Ryan |
| 6,535,788 B1 | 3/2003 | Yoshida |
| 6,536,536 B1 | 3/2003 | Gass |
| 6,594,543 B2 | 7/2003 | Murozumi |
| 6,606,528 B1 | 8/2003 | Hagmeier et al. |
| 6,663,469 B2 * | 12/2003 | Kimura ................ B24B 37/013 257/E21.304 |
| 6,701,816 B2 | 3/2004 | Smith |
| 6,718,854 B2 * | 4/2004 | Bedi ..................... B23Q 15/02 82/118 |
| 6,763,281 B2 * | 7/2004 | Schauer ................ B23Q 3/186 206/710 |
| 6,803,925 B2 | 10/2004 | Vronay |
| 6,829,371 B1 | 12/2004 | Nichani |
| 6,889,113 B2 | 5/2005 | Tasker et al. |
| 6,996,452 B2 | 2/2006 | Erichsen |
| 7,149,602 B2 | 12/2006 | Watanabe et al. |
| 7,181,362 B2 * | 2/2007 | Ratti ..................... G06F 3/0425 702/152 |
| 7,403,317 B2 * | 7/2008 | Mochizuki ......... G02B 26/0841 359/224.1 |
| 7,561,301 B2 | 7/2009 | Osumi et al. |
| 7,831,292 B2 | 11/2010 | Quaid et al. |
| 7,894,689 B2 | 2/2011 | Liu et al. |
| 7,946,905 B2 * | 5/2011 | Thomas .................. B24B 3/38 451/374 |
| 7,962,192 B2 | 6/2011 | Bodduluri et al. |
| 8,000,895 B2 | 8/2011 | Shulman |
| 8,095,233 B1 | 1/2012 | Shankar |
| 8,190,272 B2 | 5/2012 | Crothers et al. |
| 8,287,522 B2 | 10/2012 | Moses |
| 8,311,661 B2 * | 11/2012 | Krapf .................... B23D 59/001 700/174 |

(56) References Cited

U.S. PATENT DOCUMENTS

| | | | |
|---|---|---|---|
| 8,350,514 B2 | 1/2013 | Otsuki et al. | |
| 8,405,522 B2 | 3/2013 | Shaffer | |
| 8,423,171 B2 | 4/2013 | Sato et al. | |
| 8,428,768 B2 | 4/2013 | Bandini | |
| 8,620,473 B2 | 12/2013 | Diolaiti | |
| 8,639,393 B2* | 1/2014 | Taylor | E02F 9/2045 |
| | | | 701/2 |
| 8,700,369 B2 | 4/2014 | Yang et al. | |
| 8,763,721 B2 | 7/2014 | Koeder et al. | |
| 8,826,548 B2 | 9/2014 | Kaiser | |
| 8,970,156 B2 | 3/2015 | Tezuka et al. | |
| 9,026,242 B2* | 5/2015 | Rivers | B23Q 9/0042 |
| | | | 700/114 |
| 9,056,396 B1 | 6/2015 | Linnell | |
| 9,073,134 B2 | 7/2015 | Koeder et al. | |
| 9,098,077 B2 | 8/2015 | Nagaoka | |
| 9,221,506 B1* | 12/2015 | Georgeson | B05C 1/00 |
| 9,256,220 B1 | 2/2016 | Coffland | |
| 9,684,301 B2 | 6/2017 | Taguchi | |
| 10,065,318 B2* | 9/2018 | Bain | B25J 9/1684 |
| 10,067,495 B2* | 9/2018 | Rivers | B23Q 9/0042 |
| 10,078,320 B2 | 9/2018 | Rivers | |
| 10,179,032 B2* | 1/2019 | Andersson | A61B 34/20 |
| 10,363,106 B2* | 7/2019 | Kwon | A61B 34/20 |
| 2001/0000805 A1 | 5/2001 | Kadono | |
| 2001/0012972 A1 | 8/2001 | Matsumoto | |
| 2001/0016786 A1 | 8/2001 | Takahashi et al. | |
| 2002/0111709 A1 | 8/2002 | Distasio et al. | |
| 2002/0120359 A1 | 8/2002 | Xi | |
| 2002/0129485 A1 | 9/2002 | Mok | |
| 2002/0133264 A1 | 9/2002 | Maiteh | |
| 2002/0164221 A1 | 11/2002 | Izutsu et al. | |
| 2002/0164223 A1 | 11/2002 | Ryan et al. | |
| 2002/0169522 A1 | 11/2002 | Kanno | |
| 2002/0189120 A1 | 12/2002 | Kaneda | |
| 2003/0000355 A1 | 1/2003 | Butler et al. | |
| 2003/0000988 A1* | 1/2003 | Ruhland | B31F 1/2836 |
| | | | 226/20 |
| 2003/0120375 A1 | 6/2003 | Arai et al. | |
| 2003/0120377 A1 | 6/2003 | Hooke | |
| 2003/0167104 A2 | 9/2003 | Erichsen et al. | |
| 2003/0179226 A1 | 9/2003 | Kawai et al. | |
| 2003/0226438 A1 | 12/2003 | Adams | |
| 2004/0115606 A1 | 6/2004 | Davies | |
| 2004/0123297 A1 | 6/2004 | Flautner et al. | |
| 2004/0125195 A1* | 7/2004 | Satoh | G02B 26/123 |
| | | | 347/234 |
| 2004/0136706 A1 | 7/2004 | Takahashi | |
| 2004/0161877 A1 | 8/2004 | Nepomuceno et al. | |
| 2004/0172164 A1 | 9/2004 | Habibi | |
| 2004/0189631 A1 | 9/2004 | Kazi | |
| 2004/0193321 A1 | 9/2004 | Anfindsen et al. | |
| 2004/0236461 A1 | 11/2004 | Erichsen | |
| 2004/0245227 A1 | 12/2004 | Grafton-Reed et al. | |
| 2004/0254673 A1 | 12/2004 | Tomelleri | |
| 2005/0055127 A1 | 3/2005 | Swain | |
| 2005/0115421 A1 | 6/2005 | Lyons | |
| 2005/0119783 A1 | 6/2005 | Brisson et al. | |
| 2005/0142525 A1 | 6/2005 | Cotin et al. | |
| 2005/0149231 A1 | 7/2005 | Pretlove | |
| 2005/0168616 A1 | 8/2005 | Rastegar et al. | |
| 2005/0174287 A1 | 8/2005 | Wall | |
| 2005/0230130 A1 | 10/2005 | Strasser | |
| 2005/0241774 A1* | 11/2005 | Hart | B65H 19/1852 |
| | | | 156/502 |
| 2005/0251290 A1 | 11/2005 | Skourup | |
| 2005/0277104 A1 | 12/2005 | Morimoto et al. | |
| 2005/0283269 A1 | 12/2005 | Genma et al. | |
| 2005/0283270 A1 | 12/2005 | Nakamura | |
| 2005/0283985 A1 | 12/2005 | Yang | |
| 2006/0016957 A1 | 1/2006 | Hofmann | |
| 2006/0069462 A1 | 3/2006 | Cannedy | |
| 2006/0074525 A1 | 4/2006 | Close | |
| 2006/0131183 A1 | 6/2006 | Knaapen | |
| 2006/0206233 A1* | 9/2006 | Carpenter | B23Q 35/128 |
| | | | 700/159 |
| 2006/0229761 A1 | 10/2006 | Kita et al. | |
| 2006/0269377 A1 | 11/2006 | Onose | |
| 2007/0073437 A1 | 3/2007 | Walt | |
| 2007/0085850 A1 | 4/2007 | Hong et al. | |
| 2007/0157782 A1 | 7/2007 | Hetcher | |
| 2007/0169847 A1 | 7/2007 | Zhong | |
| 2007/0180962 A1 | 8/2007 | Bretschneider et al. | |
| 2007/0257195 A1 | 11/2007 | Reibel et al. | |
| 2007/0261522 A1 | 11/2007 | Bono | |
| 2007/0267104 A1 | 11/2007 | McGehee et al. | |
| 2007/0273854 A1* | 11/2007 | Nagasaka | G03F 7/70208 |
| | | | 355/46 |
| 2008/0018287 A1 | 1/2008 | Ogawa | |
| 2008/0027580 A1 | 1/2008 | Zhang et al. | |
| 2008/0060535 A1 | 3/2008 | Edwards et al. | |
| 2008/0101682 A1 | 5/2008 | Blanford et al. | |
| 2008/0115589 A1 | 5/2008 | Derose | |
| 2008/0177417 A1 | 7/2008 | Kasuga et al. | |
| 2008/0208461 A1 | 8/2008 | Gharsalli et al. | |
| 2008/0228303 A1 | 9/2008 | Schmitt | |
| 2008/0229589 A1 | 9/2008 | Bone | |
| 2008/0243142 A1 | 10/2008 | Gildenberg | |
| 2008/0244888 A1 | 10/2008 | Sarh | |
| 2008/0252248 A1 | 10/2008 | Lundberg et al. | |
| 2008/0252645 A1 | 10/2008 | Mouilleseaux | |
| 2008/0252726 A1 | 10/2008 | Chan et al. | |
| 2008/0302226 A1 | 12/2008 | Fischer | |
| 2008/0319570 A1 | 12/2008 | Van Schoiack | |
| 2009/0060574 A1 | 3/2009 | Shibata et al. | |
| 2009/0070077 A1 | 3/2009 | Tian et al. | |
| 2009/0071941 A1 | 3/2009 | Knoblauch et al. | |
| 2009/0112925 A1 | 4/2009 | Amirehteshami | |
| 2009/0124170 A1* | 5/2009 | Thomas | B24B 3/10 |
| | | | 451/11 |
| 2009/0154791 A1 | 6/2009 | Yoon et al. | |
| 2009/0171184 A1 | 7/2009 | Jenkins | |
| 2009/0182436 A1 | 7/2009 | Ferrara | |
| 2009/0228166 A1 | 9/2009 | Durkos | |
| 2009/0234511 A1 | 9/2009 | Ouchi | |
| 2009/0254211 A1 | 10/2009 | Monnin | |
| 2009/0259442 A1 | 10/2009 | Gandikota et al. | |
| 2010/0018609 A1 | 1/2010 | Van Der Linde | |
| 2010/0023157 A1 | 1/2010 | Burgess et al. | |
| 2010/0032178 A1 | 2/2010 | Koeder et al. | |
| 2010/0033553 A1 | 2/2010 | Levy | |
| 2010/0054412 A1 | 3/2010 | Brinks | |
| 2010/0057257 A1 | 3/2010 | Ichikawa | |
| 2010/0063615 A1 | 3/2010 | Mori et al. | |
| 2010/0063616 A1 | 3/2010 | Mori et al. | |
| 2010/0063617 A1 | 3/2010 | Mori et al. | |
| 2010/0066559 A1 | 3/2010 | Judelson | |
| 2010/0070078 A1 | 3/2010 | Kong et al. | |
| 2010/0087949 A1 | 4/2010 | Coleman | |
| 2010/0111367 A1 | 5/2010 | Hiraoka | |
| 2010/0125790 A1 | 5/2010 | Erskin | |
| 2010/0145499 A1 | 6/2010 | Sato et al. | |
| 2010/0153058 A1 | 6/2010 | Crothers et al. | |
| 2010/0181014 A1* | 7/2010 | Raymond | F24J 2/085 |
| | | | 156/209 |
| 2010/0206429 A1 | 8/2010 | Pozgay et al. | |
| 2010/0213107 A1 | 8/2010 | Susnjara | |
| 2010/0265048 A1 | 10/2010 | Lu | |
| 2010/0268363 A1 | 10/2010 | Karim et al. | |
| 2010/0332438 A1 | 12/2010 | Toland et al. | |
| 2011/0015877 A1 | 1/2011 | Okita | |
| 2011/0023023 A1 | 2/2011 | Renke | |
| 2011/0027032 A1 | 2/2011 | Keller et al. | |
| 2011/0046773 A1 | 2/2011 | Iwashita et al. | |
| 2011/0102542 A1 | 5/2011 | Chen et al. | |
| 2011/0125320 A1 | 5/2011 | Bongardt | |
| 2011/0130761 A1 | 6/2011 | Plaskos | |
| 2011/0137450 A1 | 6/2011 | Glasser | |
| 2011/0138873 A1 | 6/2011 | Razi | |
| 2011/0173819 A1 | 7/2011 | Koeder | |
| 2011/0190922 A1 | 8/2011 | Walker et al. | |
| 2011/0190936 A1 | 8/2011 | Koeder et al. | |
| 2011/0211938 A1 | 9/2011 | Eakins et al. | |

(56) References Cited

U.S. PATENT DOCUMENTS

| | | |
|---|---|---|
| 2011/0213490 A1 | 9/2011 | Liu et al. |
| 2011/0218668 A1 | 9/2011 | Morfino |
| 2011/0222980 A1 | 9/2011 | Kuo |
| 2011/0228050 A1 | 9/2011 | Wang et al. |
| 2011/0230758 A1 | 9/2011 | Eichler |
| 2011/0251727 A1 | 10/2011 | Koeder |
| 2011/0282492 A1 | 11/2011 | Krause et al. |
| 2011/0303427 A1 | 12/2011 | Tang |
| 2011/0306985 A1 | 12/2011 | Inoue |
| 2011/0311328 A1 | 12/2011 | Barr |
| 2012/0000080 A1 | 1/2012 | Kaiser |
| 2012/0065944 A1* | 3/2012 | Nielsen ............... G06Q 10/103 703/1 |
| 2012/0072039 A1 | 3/2012 | Anderson |
| 2012/0089247 A1 | 4/2012 | Kawauchi |
| 2012/0100520 A1 | 4/2012 | Jo |
| 2012/0157834 A1 | 6/2012 | Lazebnik |
| 2012/0163673 A1 | 6/2012 | Thompson et al. |
| 2012/0221141 A1 | 8/2012 | Otsuki |
| 2012/0221300 A1* | 8/2012 | Tukora ............... G05B 19/4069 703/1 |
| 2012/0230550 A1 | 9/2012 | Kraut |
| 2012/0271448 A1 | 10/2012 | Freeman |
| 2012/0296463 A1 | 11/2012 | Rivers |
| 2013/0019735 A1 | 1/2013 | Koeder et al. |
| 2013/0068737 A1 | 3/2013 | Saito |
| 2013/0169208 A1 | 7/2013 | Tezuka |
| 2013/0169423 A1 | 7/2013 | Iorgulescu |
| 2013/0175092 A1 | 7/2013 | Kolpack |
| 2013/0218322 A1 | 8/2013 | Carli |
| 2013/0233447 A1 | 9/2013 | Schnell |
| 2013/0286187 A1 | 10/2013 | Slesinski |
| 2013/0337238 A1 | 12/2013 | Costin, Jr. |
| 2014/0005807 A1 | 1/2014 | Busschaert |
| 2014/0025191 A1 | 1/2014 | Wadehn |
| 2014/0081441 A1* | 3/2014 | Regan ............... G05B 19/4093 700/98 |
| 2014/0123740 A1 | 5/2014 | Yoshikawa |
| 2014/0313166 A1* | 10/2014 | Rattray ............... H04N 9/3179 345/175 |
| 2014/0343571 A1 | 11/2014 | Popovic |
| 2015/0057675 A1 | 2/2015 | Akeel |
| 2015/0094836 A1* | 4/2015 | Rivers ............... G05B 19/4093 700/97 |
| 2015/0277421 A1 | 10/2015 | Rivers |
| 2015/0360305 A1 | 12/2015 | Willgert |
| 2015/0367427 A1 | 12/2015 | Burton |
| 2016/0046010 A1 | 2/2016 | Busscharet et al. |
| 2016/0125339 A1 | 5/2016 | Itaya |
| 2016/0288236 A1 | 10/2016 | Becker |
| 2016/0291567 A1 | 10/2016 | Rivers |
| 2016/0291568 A1 | 10/2016 | Rivers |
| 2016/0291569 A1* | 10/2016 | Rivers ............... B23Q 9/0042 |
| 2016/0349725 A1 | 12/2016 | Miura |
| 2017/0113342 A1 | 4/2017 | Abramson |
| 2017/0210011 A1 | 7/2017 | Hull |
| 2018/0126476 A1 | 5/2018 | Meess |
| 2018/0126507 A1 | 5/2018 | Rivers |
| 2019/0196438 A1* | 6/2019 | Rivers ............... B27C 5/00 |
| 2019/0231436 A1* | 8/2019 | Panse ............... A61B 5/061 |
| 2019/0231471 A1* | 8/2019 | Glossop ............... A61B 5/01 |

FOREIGN PATENT DOCUMENTS

| | | |
|---|---|---|
| DE | 202004005478 | 8/2004 |
| DE | 10027526 B4 | 4/2007 |
| DE | 10 2008 041 088 | 2/2010 |
| EP | 0314853 | 5/1989 |
| EP | 0588057 | 3/1994 |
| EP | 1174212 | 1/2002 |
| EP | 2 089 178 | 5/2008 |
| EP | 2 302 476 A2 | 3/2011 |
| GB | 2 462 372 | 2/2010 |
| GB | 2 488 703 | 9/2012 |
| JP | S57-033916 | 2/1982 |
| JP | 60207742 A * | 10/1985 |
| JP | S63312096 | 12/1988 |
| JP | H06-183914 | 7/1994 |
| JP | 08227035 A * | 9/1996 |
| JP | H09-503253 | 3/1997 |
| JP | H11248432 A | 9/1999 |
| JP | 2002277981 A * | 9/2002 |
| JP | 2003-251464 | 9/2003 |
| JP | 2008260121 A | 10/2008 |
| JP | 2010-036337 | 2/2010 |
| WO | WO-94/03301 | 2/1994 |
| WO | WO-02/068982 | 9/2002 |
| WO | 2008055738 | 5/2008 |
| WO | WO-2012/159123 | 11/2012 |
| WO | 2014144946 | 9/2014 |
| WO | 2016051342 | 4/2016 |
| WO | 2016183390 | 11/2016 |
| WO | 2018035499 | 2/2018 |

OTHER PUBLICATIONS

Final Office Action for U.S. Appl. No. 13/477,029 dated Sep. 23, 2014.
International Preliminary Report on Patentability for PCT/US2012/038910 dated Nov. 19, 2013.
International Preliminary Report on Patentability for PCT/US2013/038474 dated Nov. 6, 2014.
International Search Report and Written Opinion for PCT/US2012/038910 dated Nov. 20, 2012.
International Search Report and Written Opinion for PCT/US2013/038474 dated Aug. 16, 2013.
Non-Final Office Action for U.S. Appl. No. 13/477,029 dated Feb. 25, 2014.
U.S. Notice of Allowance for U.S. Appl. No. 13/477,029 dated Jan. 7, 2015.
U.S. Office Action for U.S. Appl. No. 14/678,752 dated Jul. 1, 2016.
Extended European Search Report for EPO Appl. Ser. No. 13781455.4 dated Aug. 24, 2016 (7 pages).
Office Action for Japanese Appl. Ser. No. 2015-509197 dated Apr. 4, 2017 (9 pages).
Roach, "Handheld cutting tool makes anyone a master carpenter", MSNBC FutureOfTech, Aug. 10, 2012, Downloaded from https://web.archive.org/web/20120810065905/http:/www.futureoftech.msnbc.msn.com/technology/futureoftech/handheld-cutting-tool-makes-anyone-master-carpenter-928602 on Apr. 21, 2017, pp. 1-2.
Bdring, "Position Correcting Hand Tools", Buildlog.Net Blog, Aug. 9, 2012, Downloaded from http://www.buildlog.net/blog/2012/08/position-correcting-hand-tools/ dated Mar. 14, 2017, pp. 1-3.
Benchoff, "Largest CNC router is controlled by hand", Hackaday, Aug. 9, 2012, Downloaded from http://hackaday.com/2012/08/09/largest-cnc-router-is-controlled-by-hand/#more-82158, pp. 1-16.
Boyle, "MIT's Smart Handheld Woodworking Tool Makes Precise Cuts Automatically", Popular Science, Aug. 9, 2012, Downloaded from http://www.popsci.com/diy/article/2012-08/mits-new-smart-woodworking-tool-makes-routing-more-precise on Mar. 31, 2017, pp. 1-8.
Brandon, "Augmented Reality Router", SolidSmack, Sep. 4, 2012, Downloaded from http://solidsmack.com/fabrication/augmented-reality-router/ on Mar. 14, 2017, pp. 1-7.
Eisenberg, "For the Home Workshop, a GPS for Power Tools", The Hew York Times, Sep. 22, 2012, Downloaded from http://www.nytimes.com/2012/09/23/technology/computer-precision-for-power-tools-novelties.html on Mar. 14, 2017, pp. 1-9.
Esler, "Hand-Held CNC Router Hits Precision Cuts", Woodworking Network, Aug. 14, 2012, Downloaded from http://www.woodworkingnetwork.com/news/woodworking-industry-news/Hand-Held-CNC-Router-Self-Corrects-166100876.html on Mar. 14, 2017, pp. 1-8.
Ferguson, "Robotic power tool keeps your woodcutting on track", New Scientist, Aug. 8, 2012, Downloaded from http://www.newscientist.com/blogs/onepercent/2012/08/robotic-power-tool.html on Mar. 14, 2017, pp. 1-5.

(56) References Cited

OTHER PUBLICATIONS

Hu, "A Copernican Revolution in Digital Fabrication: Handheld CNC for 2D Applications", Core77, Sep. 5, 2012, Downloaded from http://www.core77.com/blog/digital_fabrication/a_copernican_revolution_in_digital_fabrication_handheld_cnc_for_2d_23342.asp#more on Mar. 14, 2017, pp. 1-20.
Knight, "New router enhances the precision of woodworking—Handheld device precisely follows a digital plan with minimal guidance from a user.", MIT News, Aug. 8, 2012, Downloaded from http://news.mit.edu/2012/automated-handheld-router-for-woodworking-0808 on Mar. 14, 2017, pp. 1-5.
Mack, "MIT Students Create an Incredibly Accurate Router", The World Is My Workshop, Sep. 20, 2012, Downloaded from http://theworldismyworkshop.com/home/2012/9/20/mit-students-create-an-incredibly-accurate-router.html on Mar. 20, 2017, pp. 1-4.
Massachusetts Institute of Technology (Specific Author Unknown), "Rivers, Moyer & Durand create tool allowing human design with digital precision", EECS, Aug. 8, 2012, Downloaded from http://www.eecs.mit.edu//news-events/media/rivers-moyer-durand-create-tool-allowing-human-design-digital-precision on Mar. 14, 2017, pp. 1-4.
McKenna, "MIT Students and Professor Invent Handheld CNC Router System", Fine Woodworking Magazine, Aug. 9, 2012, Downloaded from http://www.finewoodworking.com/item/57081/mit-students-and-professor-invent-handheld-cnc-router-system on Mar. 14, 2017, pp. 1-8.
Reddit/Theworldismyworkshop, "A Super Precise Automated Router Made by MIT Students", Reddit, Sep. 20, 2012, Downloaded from http://www.reddit.com/r/woodworking/comments/107p14/a_super_precise_automated_router_made_by_mit/ on Mar. 14, 2017, pp. 1-5.
Rivers et al., "Position-Correcting Tools for 2D Digital Fabrication", ACM Transactions on Graphics, vol. 31, No. 4, Article 88, Publication Date: Jul. 2012,Downloaded from http://www.alecrivers.com/positioncorrectingtools/files/Position-Correcting%20Tools%20for%202D%20Digital%20Fabrication.pdf on Mar. 14, 2017, pp. 1-7.
Rivers, "MIT's Infinite Size CNC Router ", Hacker News, Aug. 10, 2012, Downloaded from http://news.ycombinator.com/item?id=4363119 on Mar. 14, 2017, pp. 1-5.
Specific Author Unknown, "GPS for your power tools", Ponoko, Sep. 27, 2012, Downloaded from http://blog.ponoko.com/2012/09/27/gps-for-your-power-tools/ on Mar. 14, 2017, pp. 1-2.
U.S. Office Action for U.S. Appl. No. 14/678,752 dated Mar. 1, 2017.
Warfield, "Students Create Hand-Held CNC Router: You Gotta See This!", CNC Cookbook, Aug. 9, 2012, Downloaded from http://blog.cnccookbook.com/2012/08/09/mit-students-create-hand-held-cnc-router-you-gotta-see-this/ on Mar. 14, 2017, pp. 1-8.
U.S. Office Action for U.S. Appl. No. 14/678,752 dated Jun. 29, 2017.
U.S. Office Action for U.S. Appl. No. 15/178,380 dated Oct. 12, 2017.
U.S. Office Action for U.S. Appl. No. 15/178,388 dated Nov. 1, 2017.
Snavely, Noah, et al., "Photo Tourism: Exploring Photo Collections in 3D," Proceeding SIGGRAPH '06 ACM SIGGRAPH 2006 Papers, Jul. 2006, pp. 835-846, vol. 25 Issue 3, Association for Computing Machinery, Inc., New York, NY, USA.
Havlena, Michal, et al., "Randomized structure from motion based on atomic 3D models from camera triplets," IEEE Conference on Computer Vision and Pattern Recognition, 2009, Jun. 20-25, 2009, pp. 2874-2881, IEEE.
U.S. Notice of Allowance for U.S. Appl. No. 14/678,752 dated Jul. 28, 2017.
U.S. Notice of Allowance for U.S. Appl. No. 14/678,752 dated Oct. 19, 2017.
Office Action for Japanese Appl. Ser. No. 2015-509197 dated Sep. 5, 2017 (6 pages).
Rivers, Augmented Manual Fabrication Methods for 2D Tool Positioning and 3D Sculpting, Ph.D. Thesis MIT, Dec. 20, 2012, 75 pages.
Rivers, Augmented Manual Fabrication Methods for 2D Tool Positioning and 3D Sculpting, Ph.D. Thesis Defense MIT, Sep. 26, 2012.
JP2018-034318 Reasons for Refusal dated Jan. 29, 2019, 4 pages.
EP13 781 455.4 Communication pursuant to Article 94(3) EPC dated Apr. 17, 2019, 3 pages.
Non-Final Office Action for U.S. Appl. No. 15/178,388 dated May 30, 2019 (17 pages).
Communication pursuant to Article 94(3) EPC for EP Application No. 13781455.4 dated Apr. 17, 2019 (3 pages).
International Search Report and Written Opinion of International Searching Authority for PCT/US2019/015624 dated May 3, 2019 (21 pages).
Various, "Topic: Goliath to slay Shaper Origin ?," Postings on Festool Owners Group (retreived on Feb. 20, 2019 from: http://festoolownersgroup.com/other-tools-accessories/goliath-to-slay-shaper-origin/) dated from Oct. 5, 2017 to Apr. 26, 2018, 40 pages.
PCT/US2017/047682 International Search Report dated Feb. 9, 2018, 5 pages.
PCT/US2017/047682 Written Opinion dated Feb. 9, 2018, 9 pages.
PCT/US2017/047682 International Preliminary Report on Patentability dated Feb. 19, 2019, 10 pages.
U.S. Appl. No. 16/326,218 Preliminary Amendment filed Feb. 17, 2019, 7 pages.
PCT/US2016/032224 International Search Report dated Aug. 16, 2016, 2 pages.
PCT/US2016/032224 Written Opinion dated Aug. 16, 2016, 7 pages.
PCT/US2016/032224 International Preliminary Report on Patentability dated Nov. 14, 2017, 8 pages.
U.S. Appl. No. 15/573,465 Restriction Requirement dated Dec. 17, 2018, 6 pages.
U.S. Appl. No. 15/573,465 Response to Restriction Requirement filed Feb. 13, 2019, 9 pages.
EP16793574.1 extended European Search Report dated Nov. 19, 2018, 6 pages.
U.S. Appl. No. 14/678,752 Response to Final Office Action filed Jul. 19, 2017, 14 pages.
U.S. Appl. No. 14/678,752 Notice of Allowance dated Feb. 22, 2018, 2 pages.
U.S. Appl. No. 14/678,752 Notice of Allowance dated Jun. 26, 2018, 9 pages.
U.S. Appl. No. 14/678,752 Notice of Allowance dated Apr. 4, 2018, 8 pages.
U.S. Appl. No. 15/178,376 Preliminary Amendment filed Jan. 2, 2018, 48 pages.
U.S. Appl. No. 15/178,376 Preliminary Amendment filed Jan. 18, 2018, 12 pages.
U.S. Appl. No. 15/178,376 Non-Final Office Action dated Feb. 22, 2018, 18 pages.
U.S. Appl. No. 15/178,376 Response to Non-Final Office Action filed May 17, 2018, 23 pages.
U.S. Appl. No. 15/178,376 Notice of Allowance dated Jul. 5, 2018, 9 pages.
U.S. Appl. No. 15/178,380 Response to Non-Final Office Action filed Jan. 12, 2018, 54 pages.
U.S. Appl. No. 15/178,380 Final Office Action dated May 15, 2018, 23 pages.
U.S. Appl. No. 15/178,380 Response to Final Office Action filed Sep. 17, 2018, 32 pages.
U.S. Appl. No. 15/178,380 Supplemental Amendment filed Jan. 23, 2019, 12 pages.
U.S. Appl. No. 15/178,380 Notice of Allowance dated Feb. 13, 2019, 9 pages.
U.S. Appl. No. 15/178,388 Response to Non-Final Office Action filed Jan. 31, 2018, 53 pages.
U.S. Appl. No. 15/178,388 Final Office Action dated May 15, 2018, 24 pages.
U.S. Appl. No. 15/178,388 Response to Final Office Action filed Oct. 15, 2018, 12 pages.

(56) References Cited

OTHER PUBLICATIONS

Notice of Allowance for U.S. Appl. No. 15/573,465 dated Jun. 4, 2019 (10 pages).
Response to Non-Final Office Action for U.S. Appl. No. 15/178,388, filed Aug. 28, 2019 (16 pages).
Response to ESSR for EP13781455.4 filed on Mar. 17, 2017 (17 pages).
Response to Examination Report for EP13781455.4 filed on Aug. 23, 2019 (4 pages).
Response for JP2018-034318 filed on Jul. 29, 2019 (17 pages).
Response to ESSR for EP16793574.1 filed on May 29, 2019 (14 pages).
Notice of Intent to Grant for EP16793574.1 dated Aug. 2, 2019 (107 pages).
Communication pursuant to Rule 161(2) and 162 EPC for EP17842243.2 dated Mar. 26, 2019 (3 pages).
Response to Communication pursuant to Rule 161(2) and 162 EPC for EP17842243.2 filed on Aug. 5, 2019 (17 pages).

\* cited by examiner

SYSTEMS AND METHODS FOR PERFORMING A TASK ON A MATERIAL, OR LOCATING THE POSITION OF A DEVICE RELATIVE TO THE SURFACE OF THE MATERIAL

CROSS-REFERENCE TO RELATED PATENT APPLICATIONS

The present application is the U.S. National Stage of International Application Number PCT/US2013/038474, filed Apr. 26, 2013, which claims the benefit of priority to U.S. Provisional Patent Application No. 61/729,247 filed on Nov. 21, 2012 and U.S. Provisional Patent Application No. 61/639,062, filed on Apr. 26, 2012, the entire contents of which are hereby incorporated by reference.

BACKGROUND

Visual guides that are drawn on material using measuring devices may be difficult for a user to follow manually. Hand tools that facilitate guiding a tool may attempt to minimize the movement of the tool in one or more directions. Mechanical guides such as railings or fences that can be put in place to assist the user in guiding the tool may limit movement or take time to set up, and these guides may not support complex paths.

SUMMARY

Apparatuses, systems and methods of the present disclosure facilitate guiding a tool with precision and flexibility. In some embodiments, the system includes a rig or frame with a stage that may be positioned on the surface of a piece of material such as wood. The tool can be electrically or mechanically coupled to the frame, and the frame together with the tool can be passed over the material. The system can include sensors, cameras or positioning logic to determine the tool's position on the material and accurately move (or provide instructions for a user to move) the frame, stage, or tool to a desired coordinate on the material.

At least one aspect is directed to a method for providing a design to facilitate performing a task on a material. The method can include a data processing system that receives a selection of a standard design. The method can receive a customization parameter corresponding to an aspect of the standard design which can indicate a modification to the standard design. The method can generate a custom design based on the standard design and the customization parameter. The method can determine or select a material associated with the second design. The method can order the one material. The method can transmit the custom design to a user device. The user device may include at least one of a cutting tool, drawing tool, and a computing device.

At least one aspect is directed to a system for providing a design to facilitate performing a task on a material or to create an object. The system can include a data processing system configured to receive a selection of a standard design. The data processing system can be configured to receive a customization parameter corresponding to an aspect of the standard design. The customization parameter can indicate a modification to the standard design. The data processing system can generate a custom design based on the standard design and the customization parameter. The data processing system can determine or select at least one material to build at least part of the custom design. The data processing system can order the at least one material. The data processing system can transmit the custom design to a user device, the user device being at least one of a cutting tool, drawing tool, and computing device.

In some embodiments, the method or the system can include a tool having a control system. The control system can be configured to implement the custom design to create an object. The custom design can be included in a computer program that when executed by a processor causes the processor to control the tool to cut or mark the material as indicated by the custom design, or where the tool can auto correct or provide an indication to correct deviations from a path indicated by the custom design.

At least one aspect is directed to a computer readable storage medium having instructions to facilitate performing a task on a material or to create an object. The instructions can include instructions to receive a selection of a standard design. The instructions can include instructions to receive a customization parameter corresponding to an aspect of the standard design. The customization parameter can indicate a modification to the standard design. The instructions can include instructions to generate a custom design based on the standard design and the customization parameter. The instructions can include instructions to determine or select at least one material to build at least part of the custom design. The instructions can include instructions to order the at least one material. The instructions can include instructions to transmit the custom design to a user device, the user device being at least one of a cutting tool, drawing tool, and computing device.

At least one aspect is directed to a method for locating a device relative to a surface of a material. The method can include scanning the surface of the material using a camera coupled with the device. The method obtains at least one image generated by the scan and processes the at least one image to identify variations in the material. The method generates a map of the material based on the variations in the material. The method rescans the surface of the material to obtain at least one second image. The method compares the at least one second image with the map to determine a position of the camera or the device relative to the surface of the material.

At least one aspect is directed to a system for locating a device relative to a surface of a material. The system can include a camera coupled to the device configured to scan the material and generate at least one image. The system can include a processor configured to process the at least one image to identify variations in the material. The processor can be configured to generate a map of the material based on the variations in the material. The processor can be configured to rescan the surface of the material to obtain at least one second image. The processor can be configured to compare the at least one second image with the map to determine a position of the camera or the device relative to the surface of the material.

At least one aspect is directed to a method for locating a device relative to a surface of a material. The method can scan the surface of the material to generate a map of the material based on variations identified in the scan. The method can identify a design plan and relate the design plan to the map of the material or overlay the design plan on the map of the material. The method can position the device near the surface of the material to perform a task corresponding to the design plan. The method can image a portion of the material proximate to the device to generate an image. The method can determine a position of the device based on comparing the image with the design plan relative to the map or the map overlaid with the design plan. The method can include adjusting the position of the device based on the comparison (e.g., to follow the design the plan). In some embodiments, the method can determine that the position of the device deviates from a design path of the design plan. The method can adjust or automatically correct the device or the position on the material of the device or a cutting or drawing tool of the device using at least one of a servo-mechanism, eccentric, actuation mechanisms, and stepper motors. In some embodiments, the method can automatically correct the position in response to the determination, while in some embodiments the method can adjust the position of the device to follow the design plan.

At least one aspect is directed to a system for locating a device relative to a surface of a material. The system can include a frame coupled with the device. The system can include a camera coupled to the frame or the device. The camera can be configured to scan the surface of the material to generate a map of the material based on variations identified in the scan. The system can include an automatic correction device. The automatic correction device can be configured to adjust the position of at least one of the device, a cutting tool, and a drawing tool relative to the surface of the material. The automatic correction device can include at least one of a servomechanism, eccentric, actuation mechanisms, and stepper motors. The system can include a computing device communicatively coupled with the camera and the automatic correction device. The computing device can identify a design plan and relate the design plan to a map of the material, or overlay the design plan on a map of the material. The computing device can position the device near the surface of the material to perform a task corresponding to the design plan. The computing device can image a portion of the material proximate to the device to generate an image. The computing device can determine a position of device based on a comparison of the image with the map overlaid with the design plan. The computing device can determine that the position is off a design path of the design plan. The computing device can instruct the automatic correction mechanism to adjust the position of the device or a cutting or drawing tool of the device. The computing device can give this instruction responsive to the determination.

At least one aspect is directed to a method for performing a task on a material. The method can map a material. The method can obtain a design and relate the design to a map of the material or overlay the design on a map image to create a design path. The method can identify a position of a tool relative to the material based on the map and design. In some embodiments, the method can display, on a display device communicatively coupled to the tool, the position of the tool and the design path.

In some embodiments, the method can map the material by placing a marker on the material that increases variations that can be detected by a camera. The marker can include at least one of a sticker, sticker with a barcode, tape, drawing, ink, pattern, random drawing or pattern, and light beam. The method can scan the material with the camera to obtain at least one image of a portion of the material. In some embodiments, the method can obtain two images of the material and stitch the images together to generate a cohesive map of the material.

In some embodiments, the method can identify a second position of the tool and compare the second position with the design path. In some embodiments, the method can determine, based on the comparison, that the second position is not on the design path and move the position of the tool to a third position that corresponds with the design path. In some embodiments, the method can move the position by adjusting at least one of a servo motor, stepper motor, and eccentric mechanism to move the position of the tool. In some embodiments, the method adjust the z-axis position of a tool to stop the performance of an aspect of the task on the material. For example, the method may position the tool above the surface of the material.

In some embodiments, the design is provided by an online design store. The method can receive a selection of the design and customize the selected design based on user input.

At least one aspect is directed to a method for providing a design for performing a task on a material. The method can receive a selection of a design and at least one customization parameter. The method can generate a second design corresponding to the selected design and at least one customization parameter. The method can determine at least one material for use with the second design. The method can order the at least one material.

At least one aspect is directed to a hybrid positioning method for positioning a tool relative to the surface of a material. The method can determine the location of the tool and a desired location for the tool. The method can then position the tool using a first positioning method that is capable of adjusting, moving, or positioning the tool to within a first accuracy, e.g., to within first maximum range and first minimum range (e.g., plus or minus 5 inches of the desired location). The method can further position the tool using a second positioning method capable of adjusting, moving, or positioning the tool to a position to within a second accuracy, e.g., to within a second maximum range and second minimum range (e.g., plus or minus 0.25 inches of the desired location). In some embodiments, the first and second positioning methods are different. In some embodiments, the first positioning method includes human positioning and the second positioning method includes automatic computer positioning using at least one of servo motors, stepper motors, linkage actuators, eccentrics, and actuation mechanisms. In some embodiments, the first minimum range is substantially similar to the second maximum range. In some embodiments, the second accuracy is substantially more accurate than the first accuracy.

At least one aspect is directed to a system for performing a task on a material. The system can include a frame configured to receive a tool. The system can include a camera coupled to the frame. The system can include a display coupled to the frame. The system can include a computing device communicatively coupled to the display and the camera.

The system may include a digital camera attached to the rig or frame. The digital camera can capture images used to detect the position of the rig and stage on the material. In some embodiments, the digital camera and associated control circuitry or control logic can build a map of a piece of material and track the location of the rig and stage on the map. The system may include a tool mounted on the stage that can perform work on the surface of the material including, e.g., cutting, drilling, sanding, printing, sewing, welding or other tasks.

In some embodiments, the system controls the location of the stage, or any attached tool, in accordance with a design or plan. For example, the system may control the location of the tool relative to the material and the design in response to a sensed position. In some embodiments, a user of the system may free hand a design while the system automatically adjusts the stage and associated tool to match the design plan, which may eliminate or minimize human error.

In some embodiments, the system may control a router which can be used to cut wood or other materials.

The tool can receive processing input received from the digital camera to determine the location of the rig relative to the material. For example, computer vision ("CV") or sensor based techniques may facilitate determining the location of the rig relative to the material.

At least one aspect is directed to a method of facilitating performance of a task on a surface of a material with a user device. The user device may include at least one of a cutting tool and a drawing tool. The method may include scanning the surface of the material to obtain first scanned data (e.g., sensor data) of the surface of the material. The first scanned data may indicate a map of the surface of the material. For example, the obtained scanned data may include a map of the surface of the material generated based on the scan of the surface of the material. At least one of a sensor and a second sensor coupled with the user device can scan the surface of the material to obtain the first scanned data. For example, a camera or other optical device may scan the surface of the material to obtain first scanned image data. In another example, an ultrasonic range finder can scan the surface of the material or work area to obtain first scanned data. In some examples, the second sensor can be mechanically coupled to the user device, while the sensor may not be mechanically coupled to the user device, such as a stand alone digital camera or any other sensor configured to obtain first scanned image data. The method can include least one of the sensor and the second sensor scanning at least a portion of the surface of the material to obtain second scanned data or second image data. The method can include a processor evaluating the first scanned data and the second scanned data to determine a position of one of the sensor and the second sensor relative to the surface of the material. The method can include the processor determining a position of at least one of the cutting tool of the user device and the drawing tool of the user device relative to the surface of the material. The processor can determine the position based on the position of one of the sensor and the second sensor relative to the surface of the material.

In some embodiments, the method can include generating the first scanned data by stitching (e.g., joining or merging) a plurality of scanned data together to generate a cohesive map of the surface of the material.

In some embodiments, the method can include displaying on a display device a map image overlaid with an indication of a position of at least one of the cutting tool and the drawing tool relative to the surface of the material. The indication of the position can be overlaid based on the first scanned data and the second scanned data.

In some embodiments, the method can include marking the surface of the material with a marker such as a sticker, ink, paint, graphite, a light beam, pencil mark, a barcode, tape, a drawing, or a pattern. The method can include identifying a variation in the material based on a characteristic of the marker.

In some embodiments, the method can include identifying a design plan for the surface of the material. The method can include relating the design plan to at least one of the first scanned data and the second scanned data.

In some embodiments, the method can include marking the surface of the material with an indication (e.g., tape, sticker, ink, paint, light beam, barcode, etc.) of the design plan. The method can include at least one of the sensor and the second sensor scanning the surface of the material with the indication of the design plan. The method can include a processor identifying the design plan.

In some embodiments, the method can include a communication interface obtaining the design plan for the surface of the material. The method can include selecting the design plan via an online design store. The method can include modifying the design plan subsequent to selecting the design plan. In some embodiments, the method can include obtaining an indication of the design plan for the surface of the material via a user interface of the user device.

In some embodiments, the method can include comparing a position of the user device to a design plan. Responsive to the comparison, the method can include adjusting a position of at least one of the cutting tool and the drawing tool of the user device. The method can adjust the position of at least one of the cutting tool and the drawing tool based on the position of the user device and based on the design plan. In some embodiments, the method can include adjusting the position of at least one of the cutting tool and the drawing tool using an eccentric mechanism of the user device. For example, a processor may cause a motor coupled to the cutting tool or drawing tool via an eccentric based linkage to adjust the position of the cutting tool or drawing tool.

In some embodiments, the method can include determining that a position of the user device deviates from a design plan. The method can include correcting a position of at least one of the cutting tool and the drawing tool of the user device. The position can be corrected based on the position of the user device and based on the design path of the design plan.

In some embodiments, the method can include identifying a design plan for the surface of the material. The method can include a processor determining a first task to be performed on the surface of the material. The processor can determine the first task based on the design plan and the position of at least one of the cutting tool of the user device and the drawing tool of the user device relative to the surface of the material. The method can include at least one of the cutting tool of the user device and the drawing tool of the user device performing the first task.

In some embodiments, the method can include a processor determining a second task to be performed on the surface of the material. The processor can determine the second task based on the design plan and a second position of at least one of the cutting tool of the user device and the drawing tool of the user device relative to the surface of the material. The method can include at least one of the cutting tool of the user device and the drawing tool of the user device performing the second task.

In some embodiments, the method can include scanning a work area comprising the surface of the material. For example, one of the sensor and the second sensor can scan the work area, or a third sensor can scan the work area (e.g., the room in which the material is placed, the work bench or table on which the material is placed, or a ceiling, wall or floor proximate to the material). The method can include the processor tracking a marker of the work area via the sensor, second sensor or the third sensor. The marker may not be on the surface of the material; e.g., the marker may be adjacent to the material, above the material (e.g., ceiling), or on the wall. The method can include the processor determining a position of at least one of the cutting tool of the user device and the drawing tool of the user device relative to the surface of the material. the processor can determine the position based on the position of one of the sensor and the second sensor relative to the marker of the work area.

At least one aspect is directed to a system for facilitating use of a user device. The user device can include at least one of a cutting tool and a drawing tool. In some embodiments, the system includes the at least one of the cutting tool and the drawing tool. The system can include at least one of a sensor and a second sensor coupled with the user device. At least one of the sensor and the second sensor can be configured to scan the surface of the material to obtain first scanned data of the surface of the material. At least one of the sensor and the second sensor can be configured to scan at least a portion of the surface of the material to obtain second scanned data. The system can include a processor coupled to at least one of the sensor and the second sensor. The processor can be configured to obtain the first scanned data and the second scanned data to determine a position of one of the sensor and the second sensor relative to the surface of the material. The processor can be configured to determine a position of at least one of the cutting tool of the user device and the drawing tool of the user device relative to the surface of the material. The processor can determine the position based on the position of one of the sensor and the second sensor relative to the surface of the material.

In some embodiments, the processor can be configured to generate the first scanned data by stitching a plurality of scanned data together (e.g., a plurality of scanned image data) to generate a cohesive map of the surface of the material.

In some embodiments, the system can include a display device coupled to the processor. The processor can be configured to cause the display device to display a map image overlaid with an indication of a position of at least one of the cutting tool and the drawing tool relative to the surface of the material. The processor can display the map image based on the first scanned data and the second scanned data.

In some embodiments, the system includes a marker configured to mark the surface of the material. The marker can include at least one of a sticker, ink, paint, graphite, a light beam, pencil mark, a barcode, tape, a drawing, and a pattern. For example, the marker may include a unique barcode sequence. The processor can be configured to identify a variation in the material based on a characteristic of the marker.

In some embodiments, the processor can be configured to identify a design plan for the surface of the material. The processor can relate the design plan to at least one of the first scanned data and the second scanned data.

In some embodiments, where the surface of the material can be marked with an indication of the design plan, at least one of the sensor and the second sensor can scan the surface of the material with the indication of the design plan. The processor can be configured to identify the design plan.

In some embodiments, the system includes a communication interface. The communication interface can be configured to obtain the design plan for the surface of the material.

In some embodiments, the system can include an online design store. The communication interface can be configured to obtain the design plan selected via an online design store. In some embodiments, the online design store can be configured to modify the design plan subsequent to receiving an indication to select the design plan.

In some embodiments, the system can include a user interface. The user interface can be configured to obtain an indication of the design plan for the surface of the material.

In some embodiments, the processor can compare a position of the user device to a design plan. Responsive to the comparison, the processor can adjust a position of at least one of the cutting tool and the drawing tool of the user device based on the position of the user device and based on the design plan.

In some embodiments, the system can include an eccentric mechanism. The eccentric mechanism can be coupled to a motor and at least one of the cutting tool and the drawing tool. The eccentric mechanism can be configured to facilitate adjusting the position of at least one of the cutting tool and the drawing tool.

In some embodiments, the processor can be configured to determine that a position of the user device deviates from a design plan. The processor can be configured to correct a position of at least one of the cutting tool and the drawing tool of the user device. The processor can be configured to correct the position based on the position of the user device and based on the design path of the design plan.

In some embodiments, the processor can be configured to identify a design plan for the surface of the material. The processor can be configured to determine a first task to be performed on the surface of the material. The processor can be configured to determine the first task based on the design plan and the position of at least one of the cutting tool of the user device and the drawing tool of the user device relative to the surface of the material. In some embodiments, the processor can be configured to cause at least one of the cutting tool of the user device and the drawing tool of the user device to perform the first task.

In some embodiments, the processor can be configured to determine a second task to be performed on the surface of the material. The processor can be configured to determine the second task based on the design plan and a second position of at least one of the cutting tool of the user device and the drawing tool of the user device relative to the surface of the material. The processor can be configured to cause at least one of the cutting tool of the user device and the drawing tool of the user device to perform the second task.

At least one aspect is directed to a non-transitory computer readable medium comprising executable instructions that can be executed by a processor. The executable instructions can facilitate using a user device that can include at least one of a cutting tool and a drawing tool. In some embodiments, the instructions can include instructions to obtain first scanned data of the surface of the material. The instructions can include instructions to obtain the first scanned data via at least one of a sensor and a second sensor coupled with the user device. The instructions can include instructions to obtain second scanned data of at least a portion of the surface of the material. The instructions can include instructions to obtain the second scanned data via at least one of the sensor and the second sensor. The instructions can include instructions to evaluate the first scanned data and the second scanned data to determine a position of one of the sensor and the second sensor relative to the surface of the material. The instructions can include instructions to determine a position of at least one of the cutting tool of the user device and the drawing tool of the user device relative to the surface of the material. The instructions can include instructions to determine the position based on the position of one of the sensor and the second sensor relative to the surface of the material.

In some embodiments, the instructions can include instructions to identify a design plan for the surface of the material. The instructions can include instructions to relate the design plan to at least one of the first scanned data and the second scanned data.

DETAILED DESCRIPTION

Figure 1:
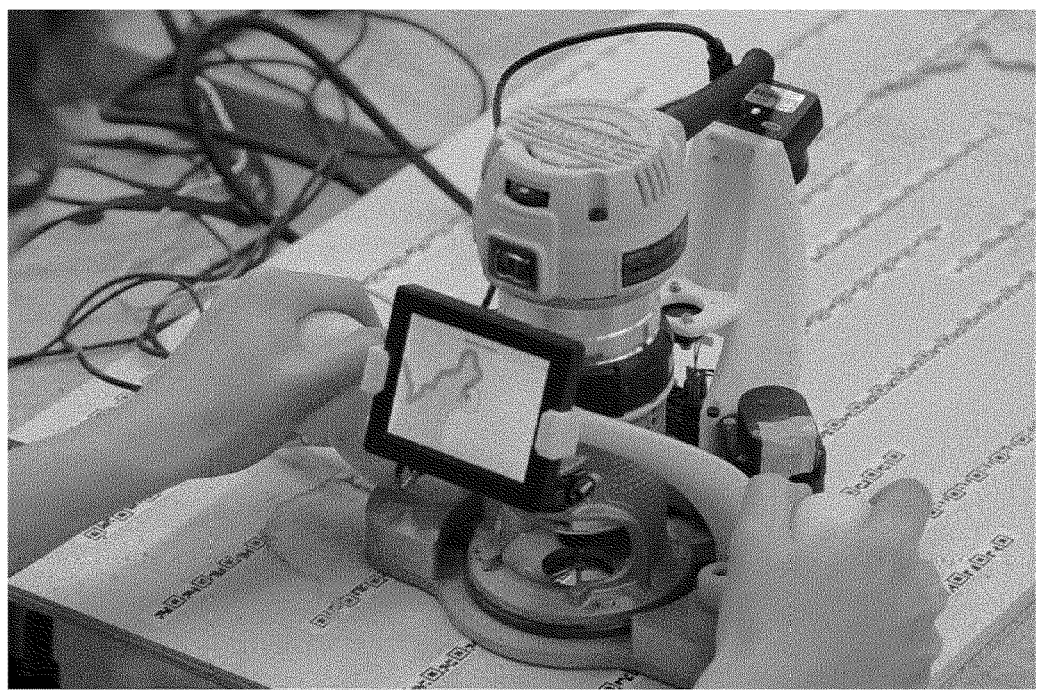
FIG. 1 is an illustrative example of an embodiment of an apparatus for automatically guiding tools.

The present disclosure relates generally to systems and methods for working on a surface such as woodworking or printing. More specifically, the present disclosure relates to determining the location of a tool in reference to the surface of a material and using the location to guide, adjust or auto-correct the tool along a predetermined path or design plan such as, e.g., a cutting or drawing path. In some embodiments, the reference location may correspond to a design or plan obtained via an online design store.

Apparatuses, systems and methods of the present disclosure relate to guiding tools to perform a task on a target material. In some embodiments, a system may automatically guide a tool to perform a task. For example, in some embodiments, the present disclosure provides a handheld system that can identify the location of a tool, or a rig that contains a tool, relative to the material being worked. In some embodiments, the device may be non-handheld; e.g., the device may be on a movable platform such as a remote control platform, robotic platform, or another type of movable platform that may or may not be controllable. The system may adjust the location of the tool (or provide instructions for the adjustment of the location of the tool)

based on or responsive to the current location of the tool and a desired location corresponding to a design plan. In some embodiments, the system includes a handheld device with a working instrument capable of being operated by hand which can make precision adjustments of the working instrument location based on spatial location to provide an accurate path which the working instrument travels.

In some embodiments, systems and methods disclosed herein can include a location detection system or perform one or more location detection techniques that can detect the current location or position of a tool on a target material accurately, robustly, or with low latency. For example, a video or sill image camera coupled to the tool and accompanying control circuitry may be used to scan the surface of the material and process the scanned data or scanned image data to generate a digital map of the surface of the material in advance of performing a task on the material. When the tool is brought near the surface of the material during performance of a task on the material, the camera may take a second image and compare the second image with the digital map to detect a location of the tool relative to the material.

In some embodiments, various location detection techniques may be used including, e.g., integrating wireless position sensing technologies, such as RF, near field communication, Bluetooth, laser tracking and sensing, or other suitable methods for determining the position of the tool and facilitating guiding or adjusting the position of the tool to perform a task. In some embodiments, the system may include a hybrid location detection system that employs two or more location detection techniques to determine the location of the tool. For example, each location detection technique may include orthogonal strengths and weaknesses, but when combined, can detect a location with high accuracy and low latency. For example, a first location detection technique may be high accuracy but low frequency (e.g., a sensor configured to obtain data once per second that accurately determines the position but has high latency). The first location detection technique may be combined with a second location technique that includes a sensor that provides location information with high frequency and high accuracy but provides limited information (e.g., an optical mouse sensor that is high frequency and high accuracy but only provides dead reckoning including direction and speed of movement rather than the location of the tool in a global context). In an illustrative example, the hybrid location system may use a camera to obtain an image to determine a position of the tool on the surface of the material accurately, and then use an optical mouse sensor to track the change of the position until the next frame of the image comes in. In this example, the second location technique using the optical mouse sensor may not provide all location tracking because integrating velocity to determine a position may accumulate error over time, or the device would not be able to determine a location if the device was picked up and put it down at a different position.

In some embodiments, to generate the map in advance of the cutting or drawing operation, a user may sweep the surface of a material with a camera until the camera has obtained images of all, substantially all, or a portion of the surface of the material or desired portion thereof. The system may obtain these images and stitch the images together to produce a cohesive map. Generating the digital map image and detecting the location may include one or more image processing techniques, pattern recognition techniques, localization techniques, computer vision techniques, for example. For example, the system may identify that points A and B in a first image correspond to point C and D in a second image and accordingly stitch the two images. For example, on a wood surface, the system may identify variations, bright spots, color variations, marks, or wood grains in the image and compare them with the digital map to determine a location. In another example, the system may further use corners, sides, lighting patterns, or other signal capable of identifying a location.

The material can be marked to facilitate mapping of the surface of the material or detection of a position of the tool on or proximate to the material. For example, the surface of a material, such as metal or plastic, may not contain sufficient identifying marks to accurately detect location. Distinguishing marks or markers can be added to the material to facilitate location detection techniques such as pattern recognition or image processing. The markers can include any type of material, ink, tape, light, laser, carving, engraving, temperature gradient, invisible ink (e.g., ink only visible under ultraviolet or other wavelengths of light) capable of facilitating a location detection technique. In some embodiments, the marker includes a tape that can be applied to at least a portion of the surface of the target material. The tape may include symbols such as a unique barcode, design, pattern, colors, engravings, raised bumps or depressions, for example. In some embodiments, the marker may include a user randomly marking on the target material with a pen, pencil, ink, invisible ink, paint, crayons, or any other marking or writing instrument.

In addition to generating a digital image of the surface of the material, in some embodiments, the system may identify a cutting or drawing design plan on the surface of the material. A design plan may include any cutting or drawing a user of the system desires. For example, the design plan may include a freehand design, tracing, picture, image, design generated using computer-aided design ("CAD") software, purchased design, or a purchased electronic design. The design plan can be a design of an object that the tool can create by performing an operation on the material, such as a design for a table that can be cut from at least one piece of wood.

The system can incorporate the design plan with the map image or otherwise relate the design plan with a map of the surface of the material or overlay the design plan on the map image. In some embodiments, the design plan may be drawn on the surface of the material before or after generating the initial map of the material (e.g., using a special pen whose ink can be detected by the system using ultraviolet or other wavelengths). If, for example, the surface of the material includes a design (e.g., a cutting design or drawing design) during the initial mapping phase, the system may process the image to identify the design plan and include it in the digital map of the surface of the material. If the design is drawn or otherwise marked on the surface of the material after generating the initial map, the system may obtain images of the material with the design by using the camera to rescan or take new images of the material. If the design is drawn or otherwise marked on the surface of the material before generating the initial map, the system may identify the design as a cutting or drawing design plan or a user may indicate to the system that the identified design is a cutting or drawing design plan.

In some embodiments, a digital design may be added to digital map of the surface of the material without physically adding the design to the surface of the material or otherwise marking the actual material with a design. For example, the digital design may be generated on a computer and may include a CAD drawing or any other type of drawing (e.g., JPEG, BMP, or GIF). Using CAD software, for example, a user may modify the map image by adding the design plan. Any other suitable software may be used to incorporate a design plan onto the map image or otherwise relate a design plan with a map of the surface of the material (e.g., data that indicates a location of the design plan used to facilitate the performance of a task on a material). After registering the design on the digital map or digital map image, the system may provide the corresponding digital map data or digital image data with the design plan to the tool. In some embodiments, the system may display the map image with the design on a display device of the tool to facilitate a user performing a task on the material. In some embodiments, the tool may perform the task in accordance with the design plan without displaying the design plan (e.g., the tool may automatically perform an aspect of the task or the tool may not include a display device).

During the cutting or drawing operation, a user may place the tool on or near the surface of the material. Upon placing the tool on the surface, the camera may re-scan or take an image of a portion of the surface of the material. The image may correspond to a portion of the material that is at a location different from the cutting or drawing tool. The system may determine the location of the tool relative to the surface of the material or the design plan by comparing identifying marks in the new image with identifying marks in the map image generated in advance of the performance of the task on the material. The camera may be mounted or otherwise coupled to the tool such that image capturing aspect of the camera (e.g., lens) is directed on the surface of the material at a fixed and known vector from the cutting tool (e.g., drill bit). By focusing the camera away from the cutting tool, the system may obtain images that are relatively clear of debris caused by cutting that may obfuscate the markers used for detecting a location.

The system may then compare the new images with the digital map of the surface of the material to determine a precise location of the tool. For example, the portion of the digital map corresponding to the top right corner may include a set of identifying marks. Upon obtaining the new image, the system may identify those same identifying marks and determine that those marks correspond to the top right corner of the map image. The system may then determine, based on the camera vector offset, the precise position of the cutting or drawing tool.

In some embodiments, the system may display, in real time, the precise position of the cutting or drawing tool on a display device (e.g., a display device of a tool or a remote display device communicatively coupled to the system or tool). The system may indicate the position on the display via an "X", circle, dot, icon, or using any other indication to signal a current position of the tool. In some embodiments, the tool may overlay the indication of the current position on the design plan or cutting path. In some embodiments, the tool may overlay the indication of the current position on the map image. In some embodiments, the tool may overlay the indication of the current position on the map image that includes an overlay of the design plan.

In some embodiments, the system may include a positioning system that adjusts or moves the tool based on a detected location of the tool and a design plan. In some embodiments, the system can use various location detection techniques to detect the location of the tool, and use various positioning techniques to move or adjust the location of the tool. For example, the system can include a hybrid positioning system that includes two or more positioning systems to position a tool. Upon determining the location of the tool and a desired location for the tool, the first positioning system may be configured to move, adjust, or position the tool over a relatively large range (e.g., move the tool to anywhere on the work area or surface of the material), but with relatively low accuracy. The second positioning system may be configured to move, adjust, or position the tool over a relatively short range (e.g., within a radius of 5 inches of the current location of the tool), but with high accuracy. In some embodiments, the first (e.g., coarse or rough) positioning system may include a human positioning a tool on the surface of a material, and the second (e.g., fine or precise) positioning system may include positioning the tool using servo motors, stepper motors, actuation mechanisms, or eccentrics, for example. The first positioning system can include non-human positioning systems such as, e.g., robotic systems, remote control systems, or Global Positioning System ("GPS") enabled devices.

For example, the first positioning system may include a long-range, low-accuracy positioning mechanism that is configured to move, adjust or correct the position of the tool based on the design plan. The second positioning system may include a short-range, high-accuracy positioning mechanism that can move, adjust or correct the position of the tool, within a maximum range, more precisely than the first positioning mechanism based on the design. In an illustrative and non-limiting example, the first positioning system may include, e.g., a maximum range that includes the range of the entire work area (e.g., the area comprising the surface of the material on which the task is to be performed), and include an accuracy of +/−0.25". The second positioning system may include, e.g., a maximum range of 0.5", with an accuracy of +/−0.01". The maximum ranges and accuracy of the first and second positioning systems may include other range and accuracy values that facilitate systems and methods of hybrid positioning. In various embodiments, range and accuracy may refer to one-dimensional accuracy (e.g., along an X-axis), two-dimensional accuracy (e.g., X-Y axes) or three-dimensional accuracy (e.g., X-Y-Z axes).

The first positioning system may be less accurate and include a positioning system where the maximum range is substantially greater than the maximum range of the second. For example, the first positioning system can move the tool from anywhere on the surface of the material to within +/−0.25 inches of a desired location, while the second positioning system can be configured to move the tool up to 5 inches from a current position, but with an accuracy of 0.01 inches. In some embodiments, the hybrid positioning system may include a plurality of positioning systems that are each configured to accurately determine a location and then position the tool to within a certain distance range such that, when the positioning systems are used together, the system can precisely determine a location and position or adjust the tool accordingly. In some embodiments, the maximum range of each subsequent positioning system may be equal to or greater than the accuracy of the previous positioning system. In an illustrative example, a first positioning system may be able to position the tool on the surface of the material with, e.g., a maximum range corresponding to the size of the surface of the material, and with an accuracy of +/−1 inch. A second positioning system may be able to position the tool on the surface of the material within a maximum of range of 2 inches with an accuracy of +/−0.1 inch. A third positioning system may be able to position the tool anywhere within a maximum range of 0.2 inches with an accuracy of +/−0.01 inch. Therefore, in this example, by using all three positioning systems together, the hybrid positioning system can precisely position the tool within a maximum range that includes the entire surface of the material or work area with an accuracy of +/−0.01 inch.

In some embodiments, the system may include automatic adjustment, guiding or error correction to facilitate performing a task in accordance with a design plan. The system may use various types of adjustment, guiding or correction mechanisms, including, e.g., eccentrics, servomechanisms, stepper motors, control loops, feedback loops, actuators, nut and bolt-type mechanisms. For example, the system may include eccentrics or servomotors coupled to a frame and the cutting tool configured to adjust the position of the cutting tool relative to the frame. Upon determining the current position of the cutting tool, the system may compare the current position with the desired position. The system may then guide the tool in accordance with the design plan. In some embodiments, when the system determines there is a discrepancy between the current position and the desired position, or the current position or trajectory deviates from the design plan, the system may adjust the cutting tool in accordance with the design plan. For example, the system may identify a cutting path or vector of the tool and the design plan and adjust the cutting tool such that the next cut is in accordance with the design plan.

The system may utilize various automatic correction mechanisms. In some embodiments, the system may include eccentrics configured to adjust the position of the cutting tool. For example, using two eccentrics, the system may adjust the position of the cutting tool in two dimensions. Eccentrics may include any circular widget rotating asymmetrically about an axis. For example, an eccentric may include a circle rotating about non-central axis. The eccentrics may be coupled to the cutting tool and the frame and be configured to adjust the position of the cutting tool relative to the frame, which may adjust the position of the cutting tool relative to the surface of the material. In some embodiments, the system may utilize a screw with a nut to change rotational motion to linear displacement to correct or adjust tool positioning.

In some embodiments, the system may include orientation control based on the type of cutting tool. For example, if the cutting tool is a saber saw that cannot be adjusted perpendicularly, the system may adjust the orientation or angle of the saber saw in accordance with a design plan. The system may include actuators configured to adjust the tilt or angle of the saw.

The system can control the z-axis of the cutting or drawing tool. By controlling the z-axis of the cutting or drawing tool, the system may start and stop cutting or drawing in accordance with a design plan. For example, if the cutting tool is beyond a correctable distance away from the design plan (e.g., outside the radius of automatic compensation), the system may stop the cutting by adjusting the z-axis position of the cutting tool (e.g., lifting the drill bit off the wood). When the user brings the cutting tool back to within the radius of automatic adjustment, the system may automatically adjust the z-axis position of the cutting tool such that cutting commences again (e.g., lowers the drill bit into the wood). The radius or range of compensation may correspond to a positioning system of the localization system. For example, if the localization system includes a hybrid positioning system that includes a large range and short range positioning system, the radius of compensation may correspond to the short range positioning system. In some embodiments, controlling the z-axis position of the tool may facilitate making 2.5 dimension designs. For example, a design plan may indicate z-axis information corresponding to the surface of the material.

In some embodiments, the system may indicate to the user that the cutting tool is on the design path or within the range of compensation such that the system may correct the position of the cutting tool. In some embodiments, the system may indicate to the user that the cutting is not on the design path or not within the range of compensation. The system may further indicate to the user to correct the position of the cutting tool or a direction in which to move the cutting tool to bring it on the design path or within the range of compensation. The system may provide one or more indication visually via the display device, using light emitting diodes or other light sources, audio signal, beeps, chirps, or vibrations. In some embodiments, an indication that the tool is deviating from the design path beyond an acceptable range may include automatically shutting off the cutting machine or adjusting the z-axis of the cutting or drawing tool such that it stops performing a task on the material. In some embodiments, the system may indicate the design path on the material of the surface itself by, e.g., shining a beam of light indicating to the user where the design path is and where to proceed. For example, upon determining the error, the system may shine a beam indicating to the user how much to adjust to the tool in order to bring the position of the tool to within the range of automatic compensation or on the design path.

In some embodiments, a plurality of cutting or drawing tools may be used with the system including, e.g., saber saw, jig saw, router, or drill. The system may be configured such that users may use various aspects of the present disclosure with various cutting or drawing tools without making any adjustments to the tool or minor/temporary adjustments. For example, the system may include a frame, camera, display device, and computing device. The frame may be configured such that a cutting tool may be placed in the frame. The camera may be coupled to the frame or may be attached to the cutting tool. Upon placing the camera, the system may automatically or manually be calibrated such that the system obtains the vector offset between the camera and the cutting or drawing tool (e.g., the drill bit).

In some embodiments, the system may include a freestanding device configured to perform mapping and localization functions and indicate to a user the current position of the device. In some embodiments, the freestanding device may be attached to a cutting tool or drawing tool. In some embodiments, the freestanding device may not provide automatic correction functionality. In some embodiments, the freestanding device may include a display or a camera. In some embodiments, the freestanding device may determine a design path and detect when the tool is off the design path. The freestanding device may indicate the error by, for example, the display, shining a light on the surface of the material, audio signals, or voice narration.

In some embodiments, and as further described herein, systems and methods of the present disclosure include an online design store. The design store may be configured to allow a user to select a design for a project (e.g., building a table), customize the design, facilitate ordering material or other parts to create the design or build the project, provide instructions or training on how to cut the design or build the project, or transfer the electronic design to the cutting system or tool or incorporate the design on the digital map of the material to create a design path or cutting path.

For example, a user of the online design store may browse a plurality of designs for a table, select a design, and then customize the design (e.g., length and width of table, number of drawers, aesthetic style). The online design store may allow for various design customization options and facilitate customization by automatically altering various cuts (e.g., corners, sides, reposition tongue-n-groove joint), material sizes and design (e.g., to account for structural integrity of new design, extra support structure, sturdier material, stronger coupling mechanisms such as screws, bolts, nuts, glue). The online design store may then identify the necessary supplies, including, e.g., the size of the material from which the design may be cut, number and types of screws, fasteners, glue, paint, varnish, supporting materials, hinges, or handles. For example, the online design store may automatically map the design onto material to maximize the usage of the material without wasting excess material. The online design store may further identify the corresponding part numbers, brand names, or barcode of the supply. The design store may then suggest vendors of the material and facilitate ordering the supplies from the material. For example, a user may order the supplies via the online design store and the online design store may transmit the order to the vendor (e.g., a hardware supply store). Thereafter, the online design store may facilitate overlaying the electronic design on the digital map of the material. In some embodiments, the system may obtain the electronic design from the online design store and incorporate the design on the digital map of the material. The electronic design can be stored as a computer program or application that can be downloaded to a computing device (e.g., tablet computer) that can be electrically or mechanically coupled to, or separate from, the tool and associated frame or guiding apparatus.

The online design store may include an online community. An online community may include members of the online design store, authorized users of the online design store, or any other users that can access the online design store. Online users or members of the online community may review designs, provide a design rating, or participate in chat rooms or otherwise communicate with other online users.

Referring to FIG. 1, an illustrative example of an embodiment of an apparatus for guiding tools to perform a task is shown. In some embodiments, the device includes a frame and a tool (e.g., a router in the example of FIG. 1) mounted within the frame. The frame may be positioned manually by the user. The device can adjust the position of the tool within the frame to guide or adjust the tool in accordance with a design plan or to correct for error in the user's coarse positioning. The device may also include a display and be configured to map the target material and display it on the display. In some embodiments, markers on the target material (e.g., stickers) may facilitate generating a map of the target material by providing differentiating features. The device may obtain a design or plan by downloading it from an online store. The device may display a map of the target material with the design that indicates the desired cutting pattern.

Figure 2:
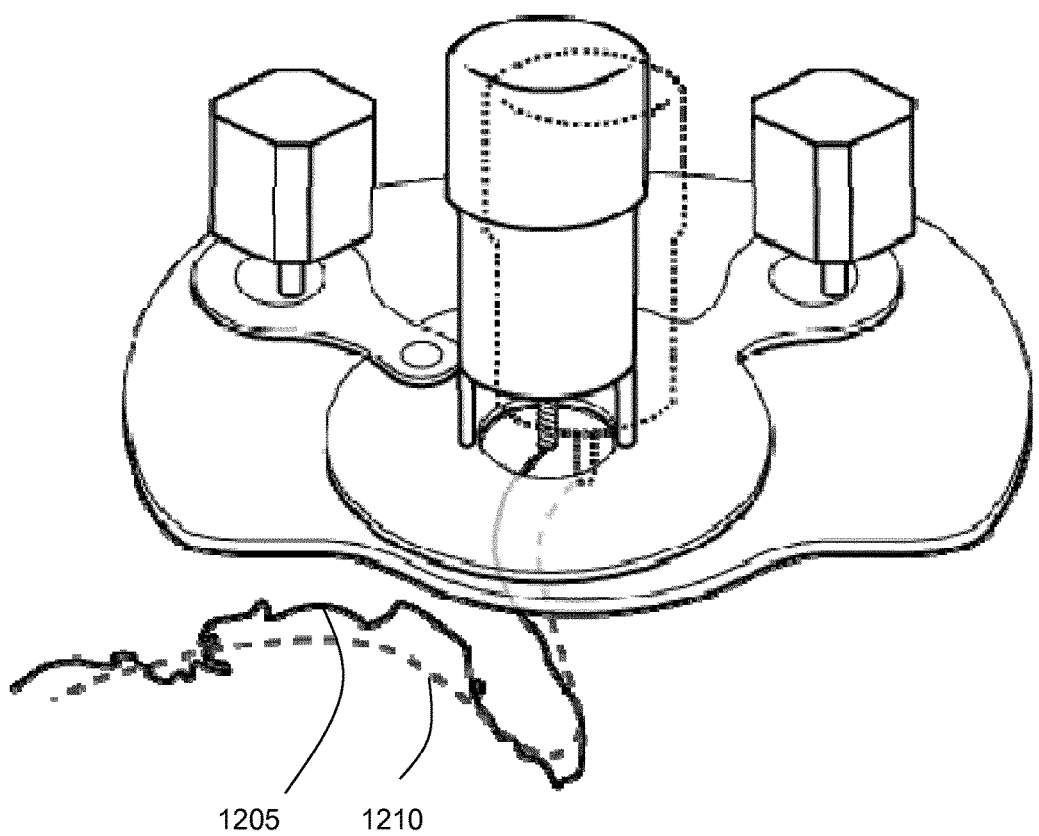
FIG. 2 is an illustrative example of an embodiment of an apparatus for automatically guiding tools following a target path area and performing a task according to a planned design.

Referring to FIG. 2, an illustrative example of an apparatus for automatically guiding tools following a target path area and performing a task according to a planned design is shown. In some embodiments, to follow a complex path, the user of the device may need to only move the frame in a rough approximation of the path. In this example, the dotted line shows the path that the tool would take if its position were not adjusted; the solid line is its actual path, e.g., an outline of the southeastern United States. In this example, the user can grip the frame and guide the tool generally along the dashed line, and the tool can self-adjust to cut along the solid line. In some embodiments, the device automatically adjusts the drill bit or other cutting tool based on the position of the cutting tool and the desired position of the cutting tool. In some embodiments, the user of the device may move the device along the dotted line 1210 in FIG. 2 (or the path 406 of FIG. 23), while the device automatically adjusts the cutting tool in accordance with the desired design plan, such as the design plan 1205 of FIG. 2 For example, the device may identify or detect the current position of the cutting tool relative to the target surface with the design. The device may then compare the current position with the desired position of a design or map and adjust the cutting tool.

Figure 3:
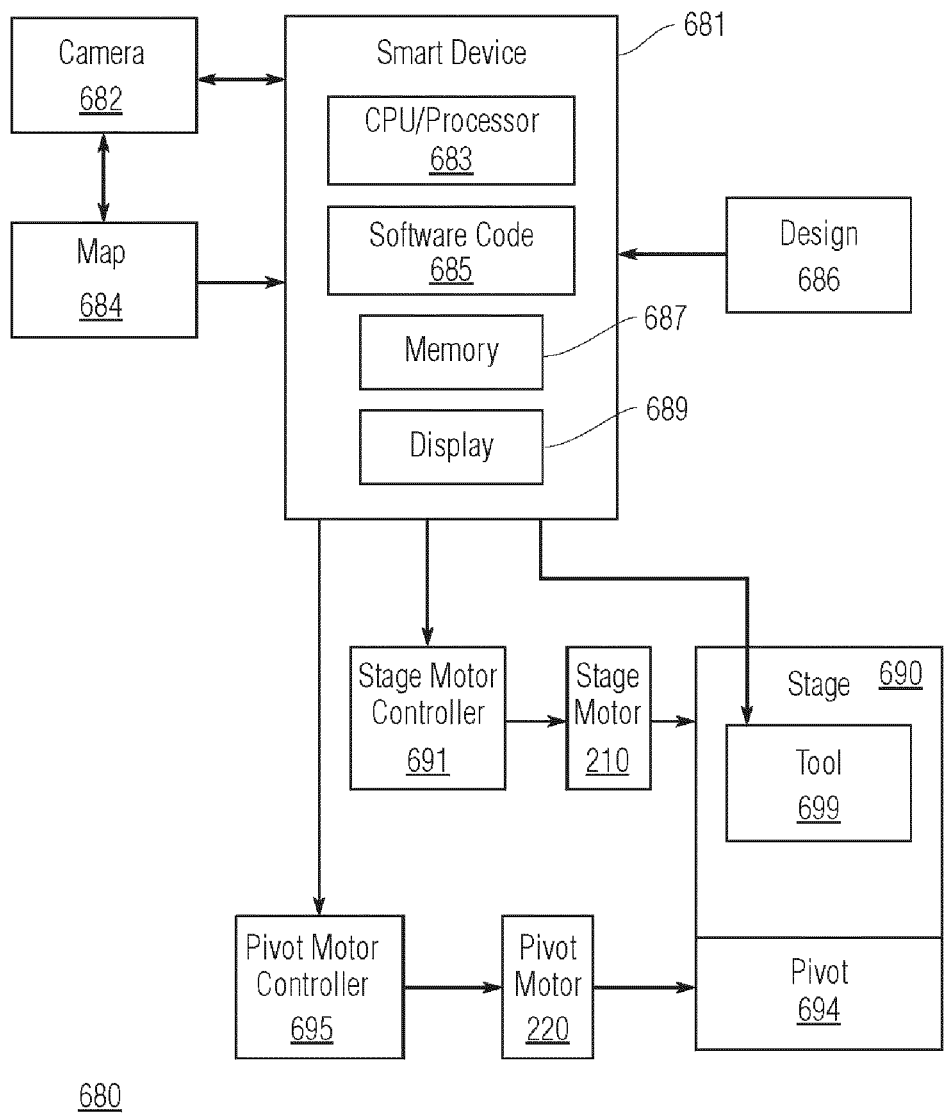
FIG. 3 is an illustrative block diagram of an embodiment of a system for automatically guiding tools.

Referring to FIG. 3, an illustrative block diagram of an embodiment of a system for automatically guiding tools is shown. In some embodiments, the system 680 includes a smart device 681. The smart device 681 may include at least one central processing unit ("CPU") or processor 683, and may include software code 685 that performs one or more processes, at least one memory 687, or at least one display 689. The smart device 681 may include a self-contained unit or the smart device 681 may include components that are not self-contained or separated. For example, the display 689 may be tethered to the smart device 681 or integrated into the housing of the smart device 681. In some embodiments, the smart device 681 may be integrated as part of the system 680 so that the system is a self-contained portable unit.

In various embodiments, the system 680 can include one or more sensors to facilitate determining a location of the tool (e.g., IR, lasers, ultrasonic range finding, etc.). For example, and in some embodiments, the system 680 can include a camera 682 that can be used in combination with the smart device 681 to build a map 684 of the material to be worked on. The camera 682 may be coupled or attached to any tool 699 to provide positioning for that tool 699. In some embodiments, the camera 682 is coupled with a display 689 and CPU 683. For example, the camera 682 may be part of a computer or smart device 681 that can be attached or coupled to any tool 699. A software application or code 685 can be installed on a mobile smartphone and can utilize the camera, CPU, memory, and display of the smartphone. In some embodiments, one or more aspect of the software or processing may be performed by a field programmable array device ("FPGA") or a digital signal processor ("DSP").

In some embodiments, the camera 682 can take images with a high-frame rate. For example, the camera can scan the surface of the material to obtain scanned data or scanned image data. In some embodiments, the camera may scan the surface of the material and a processor can process the scan to generate scanned data that indicates a map of the surface of the material. This may facilitate location functions or mapping functions disclosed herein. The camera 682 can also take images with a relatively low-frame rate and the camera 682 can be coupled with one or more optical sensors (e.g., sensors in optical computer mice). The optical sensors may provide low-latency dead reckoning information. These optical sensors may be used in conjunction with the camera 682. For example, the camera 682 may provide accurate global position information a few times a second and appreciable lag, and the optical sensors may be used to provide dead-reckoning information with low lag that fills in the time since the last image was taken. In some embodiments, accelerometers may be used for dead-reckoning. The system 100 may use multiple cameras to increase the accuracy or range of coverage when scanning, or to provide depth information.

In some embodiments, the system 100 is configured to build, generate or otherwise receive a map 684. In some embodiments, the map 684 may be built using computer vision ("CV") or sensors techniques. For example, a CV technique may be used to build a photo mosaic. A photo mosaic process may include taking multiple photographs of different parts of the same object and stitching at least two of the photographs together to make at least one overall image covering the entire object.

In some embodiments, the system 680 or processor may be configured to evaluate the scanned data using a technique that includes simultaneous localization and mapping ("SLAM"). SLAM may include using a sensor that is communicatively coupled with a processor 683 and related software 685 to build a map 684 of the material being worked on (or "target material") while determining (e.g., simultaneously) the location of the tool 699 relative to the map 684. For example, after building at least a portion of the map, a camera 682 may capture images of the material being worked. The images may be fed to and processed by the smart device 681 to determine the location of the tool 699 or rig. The system 680 may analyze the captured images based on the map 684 to determine the location (e.g., geo location) of the camera 681 relative to the material. Upon determining the location of the camera 682, in some embodiments, the system 680 may identify that the location of the rig is a known or determinable offset from the position of the camera 682, which may be rigidly attached to the rig.

Various embodiments may use various other location processing and determining technologies including, e.g., integrating wireless position sensing technologies, such as RF, near field communication, Bluetooth, laser tracking and sensing, or other suitable methods for determining the position of the tool 699 on top of the work piece. For example, ultrasonic, IR range finding, or lasers can be used to detect the location of the tool relative to a work area or surface of a material. The detected location of the tool can be provided to any other component of the system 680 to facilitate guiding or adjusting the position of the tool in accordance with an embodiment.

In some embodiments, the system 680 may be configured to compute the location of the tool 699 relative to the rig using the current orientations of the motor shafts. For example, the system 680 may identify the orientations of the motor shafts by homing them and then tracking one or more acts taken since the homing process. In some embodiments, the system 680 may use encoders could be used instead of homing as the encoders would be able to tell the orientations of the shafts directly. Through the offsets and calculations, the system 680 can identify the location of the tool 699 or rig relative to the material being worked on. The captured images that can be analyzed against the map 684 may include, e.g., characteristics of the material such as wood grains and deformations or may include markers placed on the material. Various aspects of the mapping and location technology will be described in more detail below.

In some embodiments, the system 680 may receive a design 686 or template. For example, the smart device 681 may be configured to receive the design 686 or template from a user of the system 680. The smart device 681 may include or have access to various input/output devices configured to receive the design 686. In some embodiments, the system 680 may receive the design 686 via a network. In some embodiments, the user or system 680 may modify or adjust the design 686 based on the map 684. For example, a user may adjust the size of the design 686 relative to the map 684 of the material in order to generate a desired working path on the material being worked on. In some embodiments, the system 680 may automatically adjust or optimize the size of the design based on the dimensions of the material.

The network may include computer networks such as the Internet, local, metro, or wide area networks, intranets, and other communication networks such as mobile telephone networks. The network can be used to access web pages, online stores, computers or data of a retail store that can be displayed on or used by at least one user device, system 680, or system 100, such as, e.g., a laptop, desktop, tablet, personal digital assistants, smart phones, or portable computers.

The system 680 may be configured to create, capture, or load designs 686 in a plurality of ways. In some embodiments, designs may be downloaded or otherwise obtained. For example, a user may generate a design on a computing device and transfer or otherwise convey the design to the system 680. In another example, the system 680 may receive the design from a third party entity. For example, a user may purchase a design online via a network and upload the design to the smart device or computer 681. In some embodiments, the system 680 may facilitate capturing a map of the surface and also of the design 686 on that surface. This may facilitate setting up the system 680 to follow a specific line or to show the user an image of the surface of the material underneath a large tool that obstructs sight, or to show the surface with a drawn plan in a pristine state before it is covered with debris or the surface on which the plan is drawn is cut away. In some embodiments, the design 686 could be designed, altered, or manipulated from its original form on the device 681 through a menu driven interface allowing the user to input distances, angles, and shapes or to free hand a drawing on a touch sensitive pad or display.

In some embodiments, while a user moves the system or rig 680 along the target material, the smart device 681 processes the captured images from the camera 682, determines the location of the rig 680, or provides a desired path to the user on display 689. Once the user has placed the rig 680 close to the desired path, the rig or system 680 may automatically adjust the position of the tool 699 to achieve the desired working path in accordance with the loaded design 686. The term "rig" and "system" may be used interchangeably as described herein. In some implementations, the rig includes the physical device and its attachments, and the system includes the physical device, its attachments, and related technology and software code embedded or included in some of the physical elements.

In some embodiments, the system 100 builds the map 684 based on images captured by the camera along an arbitrary path of the target material until the entire area of interest has been covered. For example, a user may sweep the camera 300 in an arbitrary path over the surface of the material until the entire area of interest has been covered. In some embodiments, the system 100 can be configured such that the camera 682 can be removed from the rig 100 to sweep or pass over an area of the material. The system 100 may stitch together the images obtained by the camera 682. For example, the system 100 may use an image mosaic software code 685 to form a cohesive map 684 of the area of interest of the surface of the material. The system 100 may store the map 684 in memory 687. Upon receiving an image taken by the camera 682 of mapped material, the system 100 can compare the image with the map 684 held in memory 687 and may further determine a position and orientation. For example, the system 100 may determine, based on the comparison, the position of the tool, drill, system, cutting member, stage, or rig.

In some embodiments, the system 680 may allow a user to create and load a design 686 after the map 684 has been assembled. For example, after the map 684 has been assembled on the smart device 681 (such as a computer), the user may create a design 686 on the computer by plotting it directly on the generated map 684. For example, the user may mark positions on a piece of wood where a drill hole is desired. The techniques and features of the software code 685 (include computer aided design and manufacturing) can be employed to create a design with accurate measurements. Then, when the user returns to the material, the position of the camera 682 on the map 684 may be displayed on a screen or display 689 to the user, with the design plan 686 overlaid on the map 684. For example, the system 680 can display on the display device a map image overlaid with an indication of a position (e.g., position of the sensor, device, cutting tool or drawing tool) relative to the surface of the material. In some embodiments, the system 680 may identify the geo location of the tool relative to the map. For example, the camera 682 may be attached to a drill and used to determine the position of the drill exactly relative to target drill locations specified in the design 686, facilitating the user to line up the drill more precisely.

In some embodiments, the system 680 is configured to build the map and track the camera's position using visual features of the target material. In some embodiments, the software 685 includes instructions to build the map and track the camera's position using visible features of the material such as grains, imperfections, or marks. The target material may be altered to facilitate mapping and tracking functions. For example, solid colored plastic may be too undifferentiated for the system 680 to effectively map or track. Therefore, a user may, e.g., alter the material surface in some way to add features that can be tracked. In another example, the system 680 may instruct a marker to arbitrarily add features that can be tracked. For example, features that may be added may include ink to the material that is typically invisible, but which can be seen either in a nonvisible spectrum or in the visible spectrum when UV or other light is applied, allowing the camera to track the pattern of the invisible ink while not showing any visible markings once the work is done. In some embodiments, the user may apply stickers with markers which can later be removed. Features could also be projected onto the material such as with a projector. Or, if the user will later paint over the material or for other reasons does not care about the appearance of the material, the user could simply mark up the material with a pencil or marker.

In some embodiments, the marker tape or stickers may include a unique sequence of barcodes over the entire length of the tape. In some embodiments, the marker tape may be thin such that the device may pass over the marker tape without getting stuck or disturbed. In some embodiments, the tape may be designed and constructed such that it will stay down as the device moves over the tape, but can also be easily taken off upon completion of the project. Marker tape materials may include, for example, vinyl or any other suitable material.

In cases where the camera cannot track the material, or cannot do so accurately enough, or the material is unsuitable for tracking (e.g. due to an uneven surface), or any other reason that prevents the camera tracking the surface directly, the camera may track other markers off of the material. For example, the user may put walls above, below, or around the sides of the material being worked on that have specific features or marks. The features or marks on the surrounding surfaces may enable the camera to determine its position on or relative to the material. In various embodiments, different types of positioning technology or devices may be used to locate the tool 699 or stage 690, possibly in conjunction with a camera 682 that is used mainly for recording the visual appearance of the material without needing to perform the tracking function. Positioning technology may include, e.g., ultrasonic, IR range finding, or lasers, for example.

The system 680 can adjust the precise location of the tool 699 by adjusting the geo location of the stage 690 or a moveable platform to which the tool 699 is attached. The stage 690 may be connected to an eccentric coupled to a motor shaft. As the motor shaft moves in a circular path the eccentric moves the stage 690 in complex arcs and paths. A pivot 694 may be connected to the stage and is also connected to an eccentric coupled to a second or pivot motor shaft. The pivot 694 may be configured to pull or push the stage 690 to achieve controlled movement of the stage within a 360 degree range. By controlling the rotation of the eccentrics, the system 680 may position the stage in almost any XY position in the range.

In some embodiments, the system 680 uses a reference lookup table to facilitate guiding the tool. For example, a reference look table may include motor coordinates related to desired stage positions. In some embodiments, the system 680 may compute calculations that can be used to adjust the motors that move the stage 690 and the cutting bit of the tool 699 connected to the stage 690 to the desired location. In some embodiments, the system 680 may move the tool 699 360 degrees in a two dimensional plane by positioning the stage 690 and pivot 694. For example, the cutting instrument of the tool can be moved anywhere within the 360 degree window of the target range 408 (see, e.g., FIG. 23).

In some embodiments, electric motors may move, position or adjust the stage 690 and pivot 694. A stage motor controller 691 may control the stage motor 210. A pivot motor controller 695 may control the pivot motor 220. The stage motor controller 691 and pivot motor controller 695 may receive information that includes the desired location or coordinates from the smart device 681. Based on the received information, the stage motor controller 691 and pivot motor controller may 695 activate and control their respective motors 210, 220 to place the stage 690 and the pivot 694 in the proper or desired position, thereby positioning the tool in the desired geo location.

In some embodiments, the smart device 681 may communicate with, receive information from, and control the tool 699. For example, the smart device 681 may send instructions to power on or off or increase or reduce speed. In some embodiments, the instructions may signal when to engage the target material by, e.g., adjusting the depth of the tool 699 when the user is close enough to or near the desired path on the material.

Figure 4:
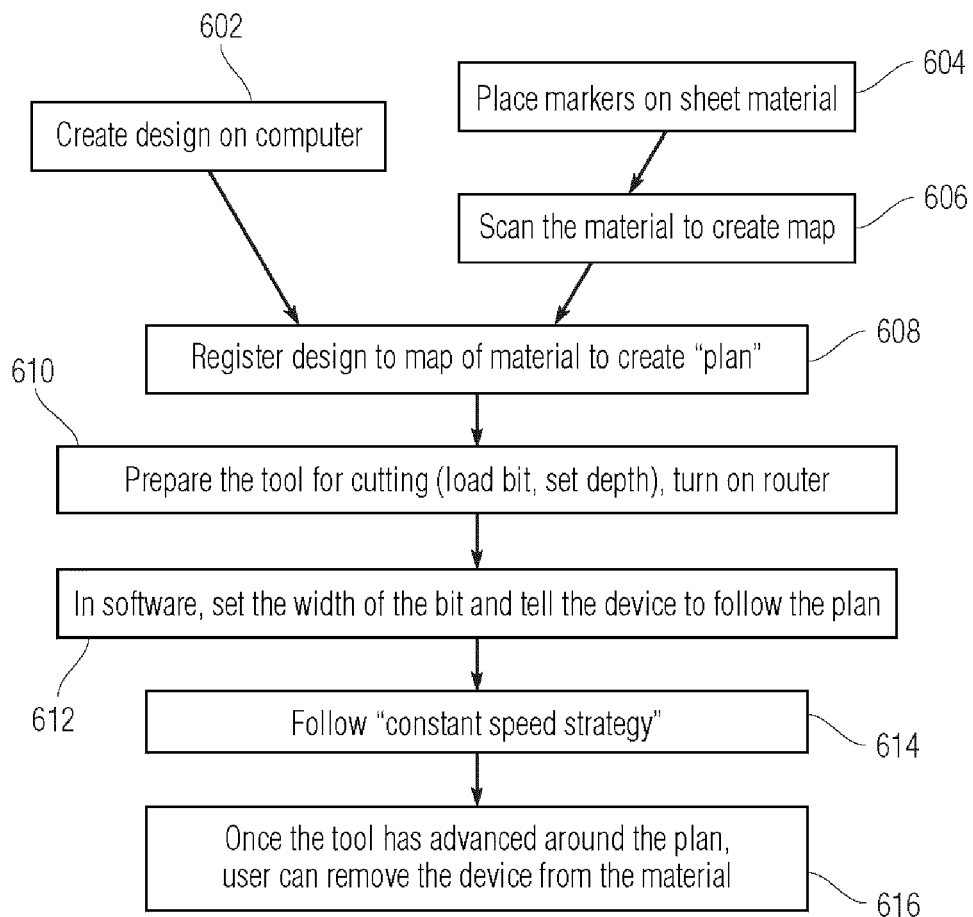
FIG. 4 is an illustrative flow chart of an embodiment of a method for automatically guiding tools.

FIG. 4 provides an illustrative flow chart of an embodiment of a method 600 for performing a task on a target material. For example, the method 600 may facilitate cutting a working surface using a router based embodiment. In some embodiments, at act 602 the user may find or create a design they want to cut out of a material. In some embodiments, the task may include a plurality of tasks (e.g., a first task and a second task that may be a subset of the entire task). For example, the task of cutting the design out of the material may comprise a first task of cutting a first portion of the design and a second task of cutting a second portion of the design. In some embodiments, the first and second task may be substantially similar (e.g., same type of cutting or drawing tool), while in other embodiments the first and second task may differ (e.g., different drill bit or drawing tool, different type of cutting tool, different user device, different area of the material, etc.).

Prior to or subsequent to identifying the design plan, the user may map the surface of the material or sheet of material. If the material has enough markings the user may use the material itself. However, in act 604, if the material has a flat surface or limited markings the user can place markers on the material. Markers may include, e.g., printer marker stickers or other type of suitable indicia capable of being readily identified.

In some embodiments, at act 606, a sensor may scan the material to obtain scanned data. For example, a camera scans the material and the various markers to create the map. The CPU may process the images captured by the sensor or the camera and generate the map or scanned data. The size and shape of the map can be appropriately manipulated to a preferred configuration. In some embodiments, at act 608, the design is registered or otherwise related to the map to create a cutting plan.

In some embodiments, at act 610, the cutting tool is prepared to perform the task. For example, a user may load, adjust, or secure the bit, mount it to the rig and turn the router on. In some embodiments, the system may turn on the router via a software initiated process in response to one or more parameters, including, e.g., motion sensing of a movement of the rig 100 in a particular direction by the user.

In some embodiments, at act 612, the system may receive various settings. For example, the user may set the width of the bit of the cutting tool, the range (e.g., area) of the tool's desired range correction, the size of the cross-hair, or the speed of the cutting tool. Thereafter, instructions may be provided to the software to begin the task.

In some embodiments, at act 614, the rig is placed adjacent to the desired path so that the system can automatically adjust the position of the tool into a starting adjustment range position along the desired path. The user may then follow the constant speed strategy as described herein, for example with regards to FIG. 5. In some embodiments, once the tool has advanced fully around the plan (act 616) the user can remove the device and work product from the material.

Figure 5:
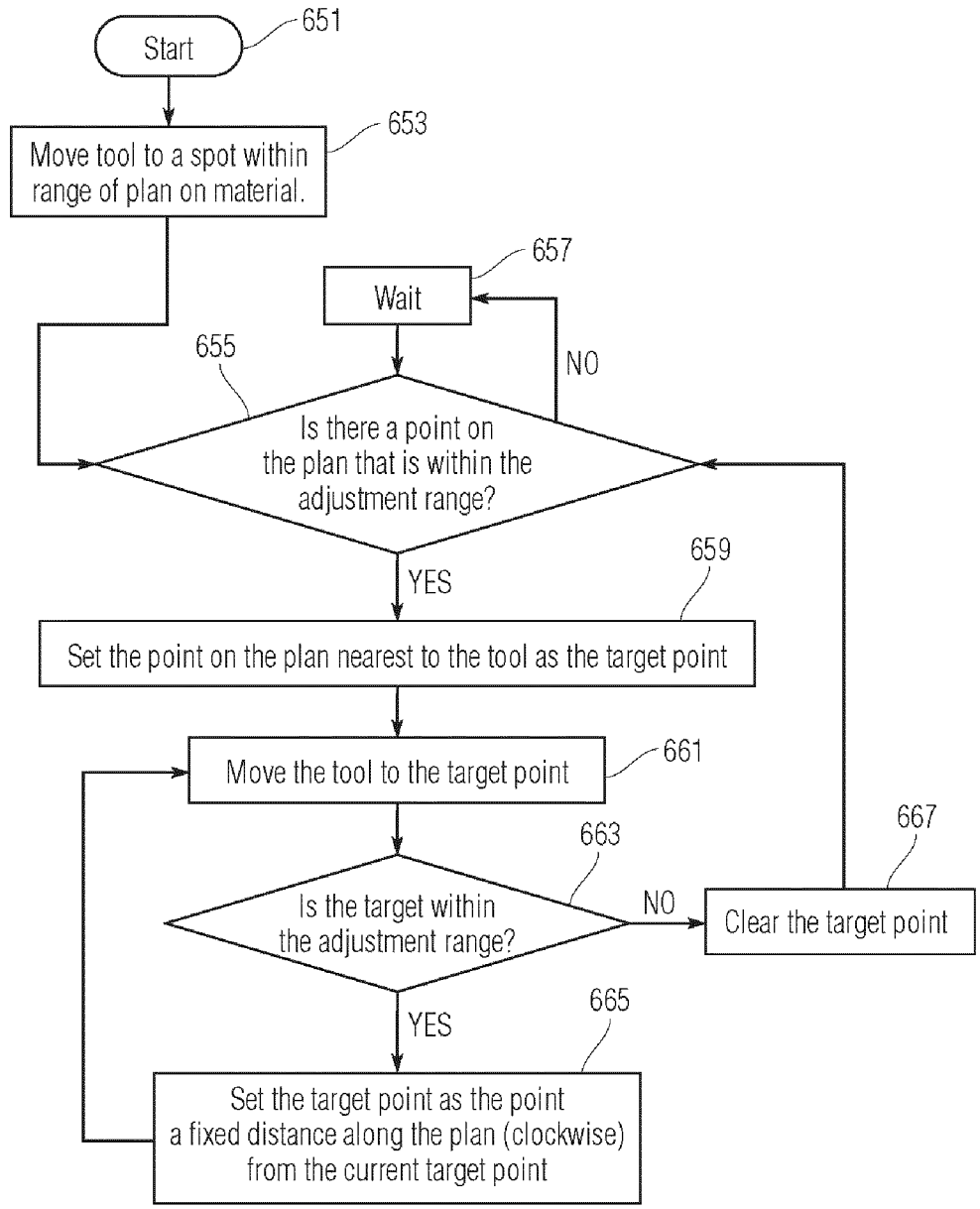
FIG. 5 is an illustrative flow chart of an embodiment of a method for automatically guiding tools.

FIG. 5 shows an illustrative flow chart of an embodiment of a method 650 for the constant speed strategy. The process in FIG. 5 assumes the user already has the router attached to the rig and has mapped their material and loaded up their design. In some embodiments, at act 651, the user starts the process to cut the material. The process can include moving the tool to a spot within the range of plan or path on the material (act 653). For example, a user may move the tool or the tool may be remotely controlled.

In some embodiments, the process includes determining, based on the location of the tool, whether there is a point on the plan within the adjustment range of the rig (act 655). In the event that there is no point within range, the process may include sending a notification (e.g., via the display, audio, vibration, light, or LED) and waiting until the user moves the device within the adjustment range (act 657).

In some embodiments, if there is a point within the adjustment range, the process includes, at act 659, setting the point on the plan nearest to the tool as the target point. In some embodiments, the process may include moving the tool to the target point and cuts the material (act 661).

In some embodiments, the process includes creating a second target by determining if a new target is within the adjust range (act 663). If there is a second target, the process may include setting the second target point as the new target (act 665). The device may continue to move in a clockwise direction, cutting from the old target point to the new target point. In some embodiments, the process may include identifying the next target point within the adjustment range (act 663) while the tool or router is cutting from the old target point to the new target point. For example, the determination of an optimum or desired second target may be continuous, and based on the image, or various images, detected from the camera and processed by the system.

If there is no target point within range, in some embodiments, the process includes clearing the target point (act 667) and starting at act 655 to determine whether there is a point on the plan within the adjustment range. In some embodiments, this process continues until the tool has gone through all or part of the plan in a particular direction, such as a clockwise direction.

Figure 6:
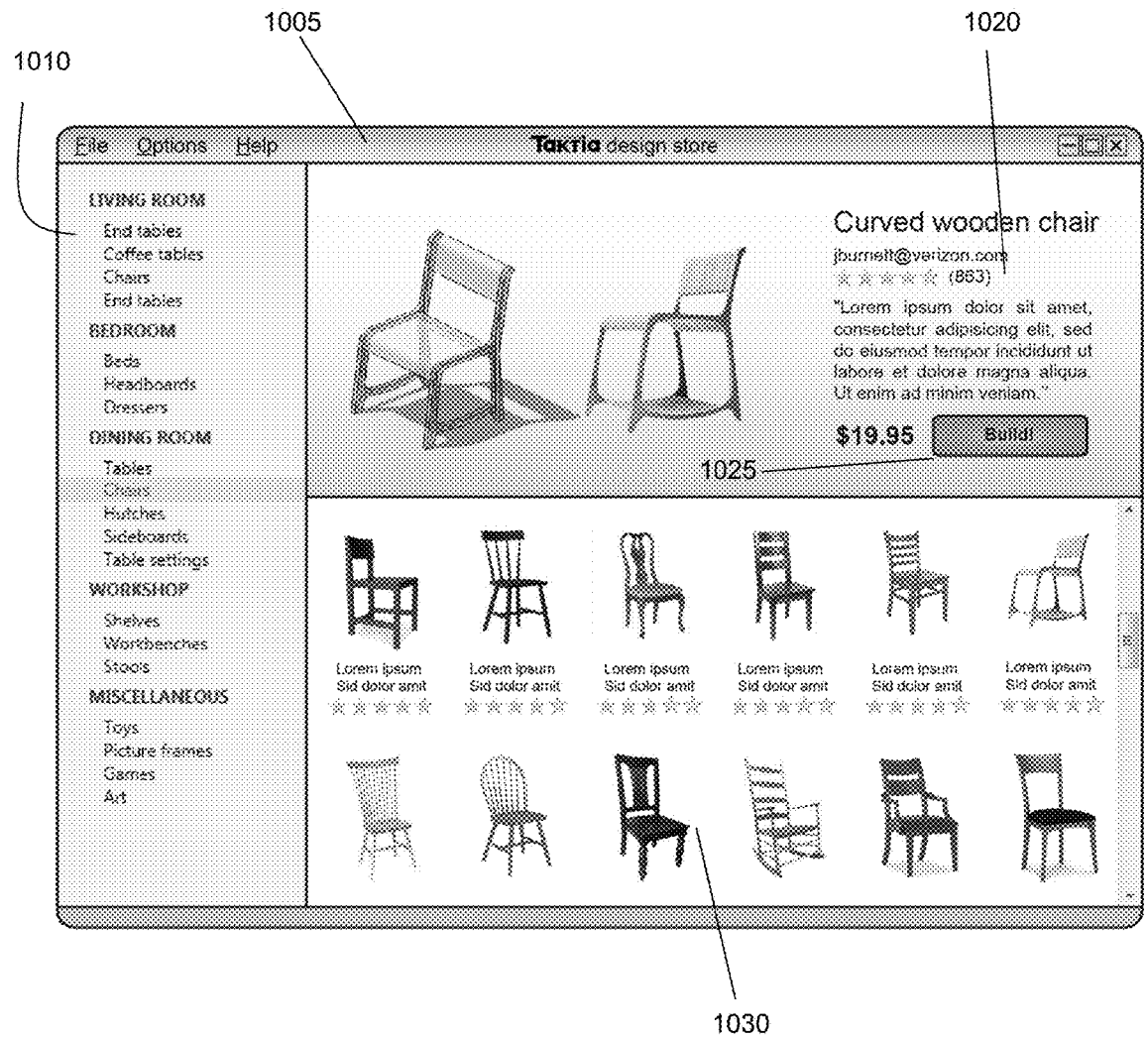
FIG. 6 is an illustrative example of an embodiment of an electronic design store that includes a plurality of electronic designs.

Referring to FIG. 6, an illustrative example of an embodiment of an electronic design store 1005 that includes a plurality of electronic designs 1030 is shown. A single entity may control the online design store and provide all designs, or a plurality of entities may provide designs to the design store. The entity controlling the design store may approve or reject designs provided by various entities. Users of the design store may purchase designs from the entity controlling the design store or the entity the submitted the design. For example, the entity controlling the design store may facilitate transactions with respect to selling and transferring the design to a user, and may keep a percentage of the purchase price while providing the supplier of the design with a certain percentage of the purchase price.

The electronic design store may execute on one or more servers configured to provide functionality disclosed herein. Client devices (e.g., computing device of the cutting or drawing system disclosed herein, laptop, smartphone, or tablet) may be configured to communicate with the electronic design store via a network (e.g., Internet, wireless network, Ethernet, cellular data networks, 3G, or 4G.).

In some embodiments, control circuitry of the system 680 can obtain an electronic design from the electronic design store. The electronic design store 1005 may be managed by an entity, such as an online retailer. The entity or one or more online users of the design store may provide the designs. In some embodiments, users modify the entity's designs or other users' designs and submit them to the store (see FIG. 9).

The electronic design store 1005 may include a plurality of categories of designs 1010 including, e.g., Living Room, Bedroom, Dining Room, Workshop, or Miscellaneous. In some embodiments, the designs may be categorized by material type (e.g., wood, type of wood, metal, glass, plastic, paper, tile, or linoleum), cost of materials, estimated time to completion, size, weight, difficulty to build, or popularity, for example. Each category 1010 may include sub-categories such as, e.g., Living Room: end tables, coffee tables, chairs; Bedroom: beds, headboards, dressers; Dining room: tables, chairs, hutches, sideboards, table settings; workshop: shelves, workbenches, stools; Miscellaneous: toys, picture frames, games art. These categories are examples and there can be other categories for various other items.

In some embodiments, the store 1005 may include a rating 1020 for a design as well as reviews. For example, online users of the store 1005 may rate or review the design based on various factors. In some embodiments, the factors may include aesthetic or functional factors such as, e.g., design, ease cutting, durability, difficulty, or price value.

In some embodiments, the store 1005 may include a "build" button 1025 and a price. Upon selecting the build button 1025, the user may be prompted to provide payment information. In some embodiments, the store 1005 may already have a user's payment information and not have to prompt the use for payment information. In some embodiments, the store 1005 may prompt the user to confirm their build selection (e.g., confirm the payment). Upon selecting build 1025, the store may display next acts.

Figure 7:
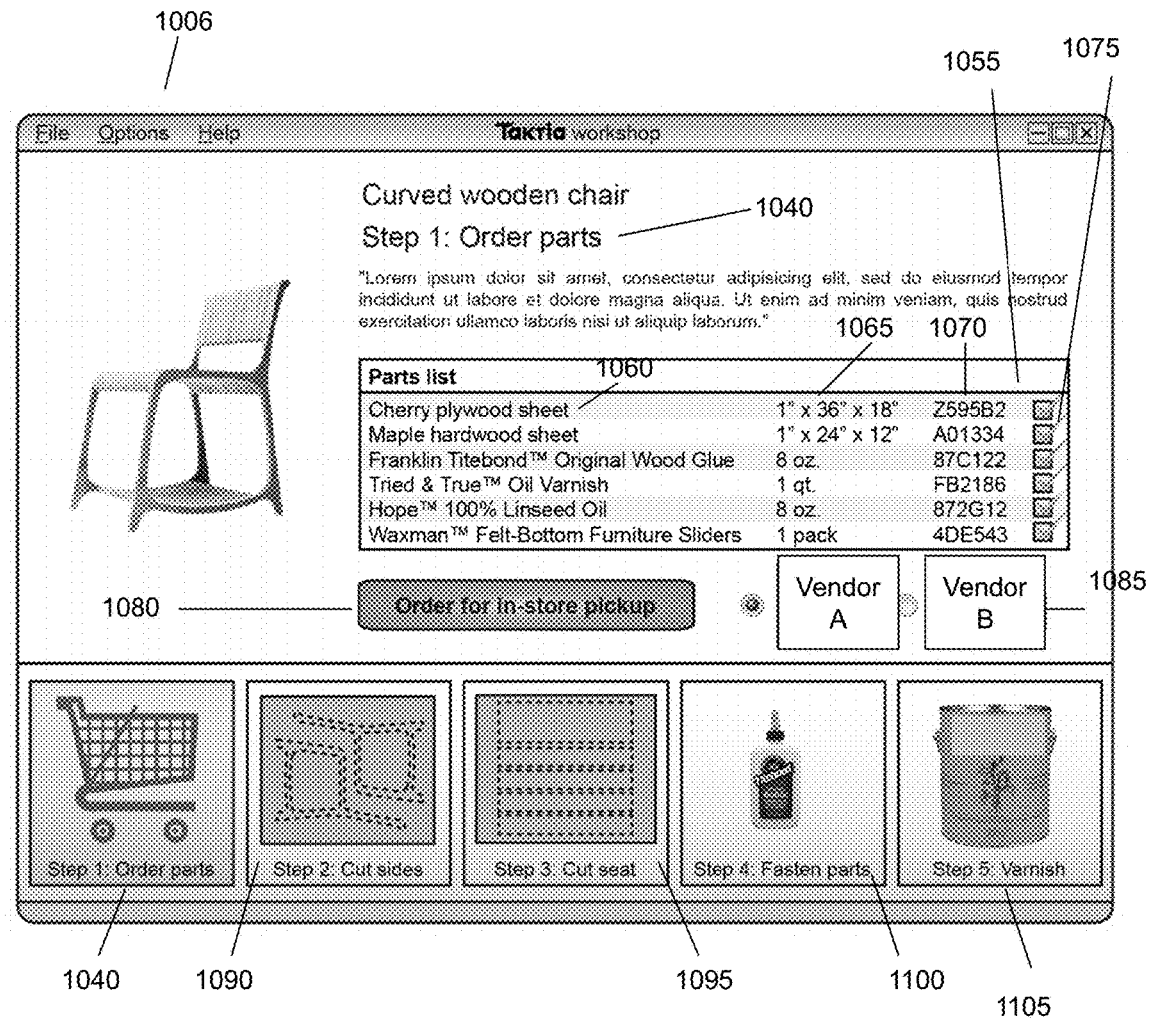
FIG. 7 is an illustrative example of an embodiment of ordering parts for an electronic design via an electronic workshop.

Referring to FIG. 7, an illustrative example of an embodiment of ordering parts for an electronic design via an electronic workshop is shown. In some embodiments, upon selecting the build button 1025 of the electronic design store, a user may be directed to the electronic workshop 1006. The user may log into the electronic workshop 1006 directly. The electronic workshop 1006 can include a plurality of acts (e.g., 1040, 1090, 1095, 1100, 1105) to facilitate building a design. In some embodiments, upon selecting a design from the electronic design store 1005, the workshop 1006 may include the act of ordering parts 1040. Based on the design, the workshop 1006 may display a parts list 1055 that includes a plurality of parts 1060, dimensions for each part 1065, a part number 1070, or a check box to indicate whether or not to order the part 1075 or to indicate whether or not the part has been ordered. For example, the parts list 1060 may include cherry plywood sheet, with a dimension 1065 of 1"×36"×18" which corresponds to a part number 1070 Z595B2. This part may be selected for order 1075. The dimensions 1065 may be in various units or various unit systems including, e.g., the metric system, English units, or US customary units, for example.

In some embodiments, the workshop 1006 may include the ability to select an entity 1085 (e.g., from a plurality of entities) to supply the parts or from whom to order the parts. In some embodiments, the workshop 1006 may be configured to automatically determine whether an entity has the required/selected parts in stock. For example, if the entity does not have all the parts in stock or does not supply a specific part, the workshop 1006 may not display the entity or gray the entity out or otherwise indicate that the entity does not supply all the parts. In some embodiments, the workshop 1006 may determine that no single entity supplies all the parts or that certain parts may be obtain for a cheaper price at a different entity. Accordingly, the workshop 1006 may be configured to automatically order parts from the entities that supply them, that can supply/deliver them the soonest or by a certain date, or at the cheapest price.

In some embodiments, the workshop 1006 includes an "Order for in-store pickup" or the like button 1080. Upon receiving an indication to select the button 1080, the workshop may communicate, via the network, with the selected supplier 1085 to order the selected parts 1075. In some embodiments, the workshop 1006 may direct the user to the website of the supplier. In other embodiments, the workshop 1006 may directly order the parts. In some embodiments, the workshop 1006 may prompt the user or payment information or to confirm the order.

The workshop 1006 may display a plurality of acts including, e.g., ordering the parts 1040, cutting sides 1090, cutting seat 1095, fastening parts 1100, and varnishing 1105. The workshop 1006 may tailor the acts for each build project or type of build project. In some embodiments, the workshop 1006 may indicate to wait a certain period of time after performing an act before performing the next act.

Figure 8:
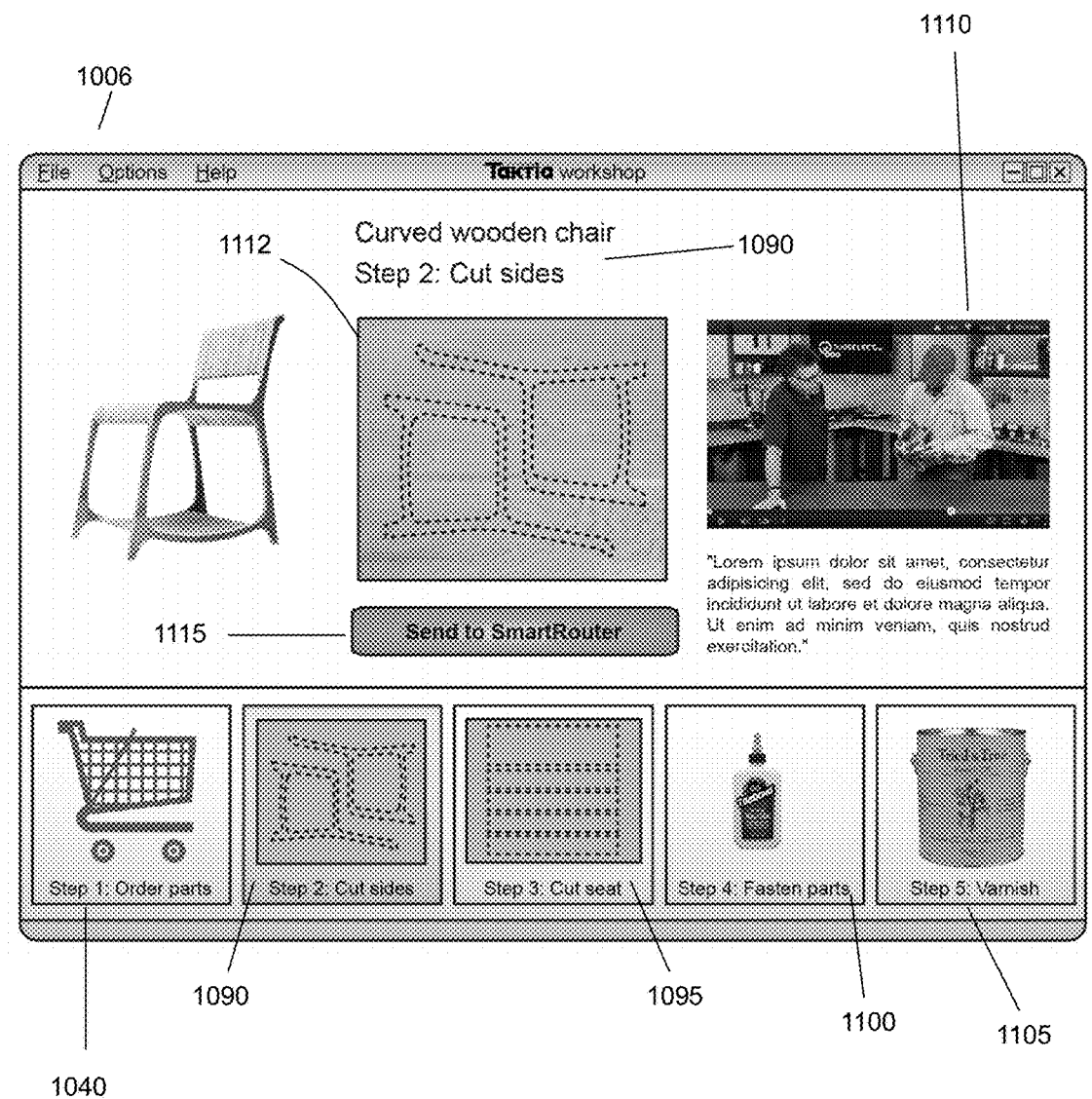
FIG. 8 is an illustrative example of an embodiment of providing instructions to perform a task via an electronic workshop.

Referring to FIG. 8, an illustrative example of an embodiment of providing instructions to perform a task via an electronic workshop is shown. In some embodiments, the workshop 1006 may include a second act of cutting sides 1090 in order to build a design, e.g., a chair. In some embodiments, the second act may include painting, varnishing, sanding, organizing, drawing, or other act that facilitates performing a task.

In some embodiments, the workshop 1006 may include audio or video 1110. The audio or video 1110 may provide instructions to the user to facilitate performing the act. For example, the instructions 1110 may instruct the user on how to download the design on the device, how to configure the device, how to place the device on the target material, how to prepare the target material, or safety tips.

In some embodiments, the workshop 1006 may display the design plan 1112 and be configured to send the design plan to the device via a "Send to SmartRouter" or the like button 1115. The SmartRouter may include a device disclosed herein such as a system 680, system 100, rig, device or any other tool configured or capable of performing a guided task. In some embodiments, the workshop 1006 may wirelessly transmit the design plan to the SmartRouter. In some embodiments, the workshop 1006 may transmit the design to the SmartRouter via an input/output (e.g., USB, serial port, Ethernet, Firewire, or optical link, for example). The SmartRouter may include a camera configured to take a picture of the design 1112 displayed via the graphical user interface of the workshop 1006.

Figure 9:
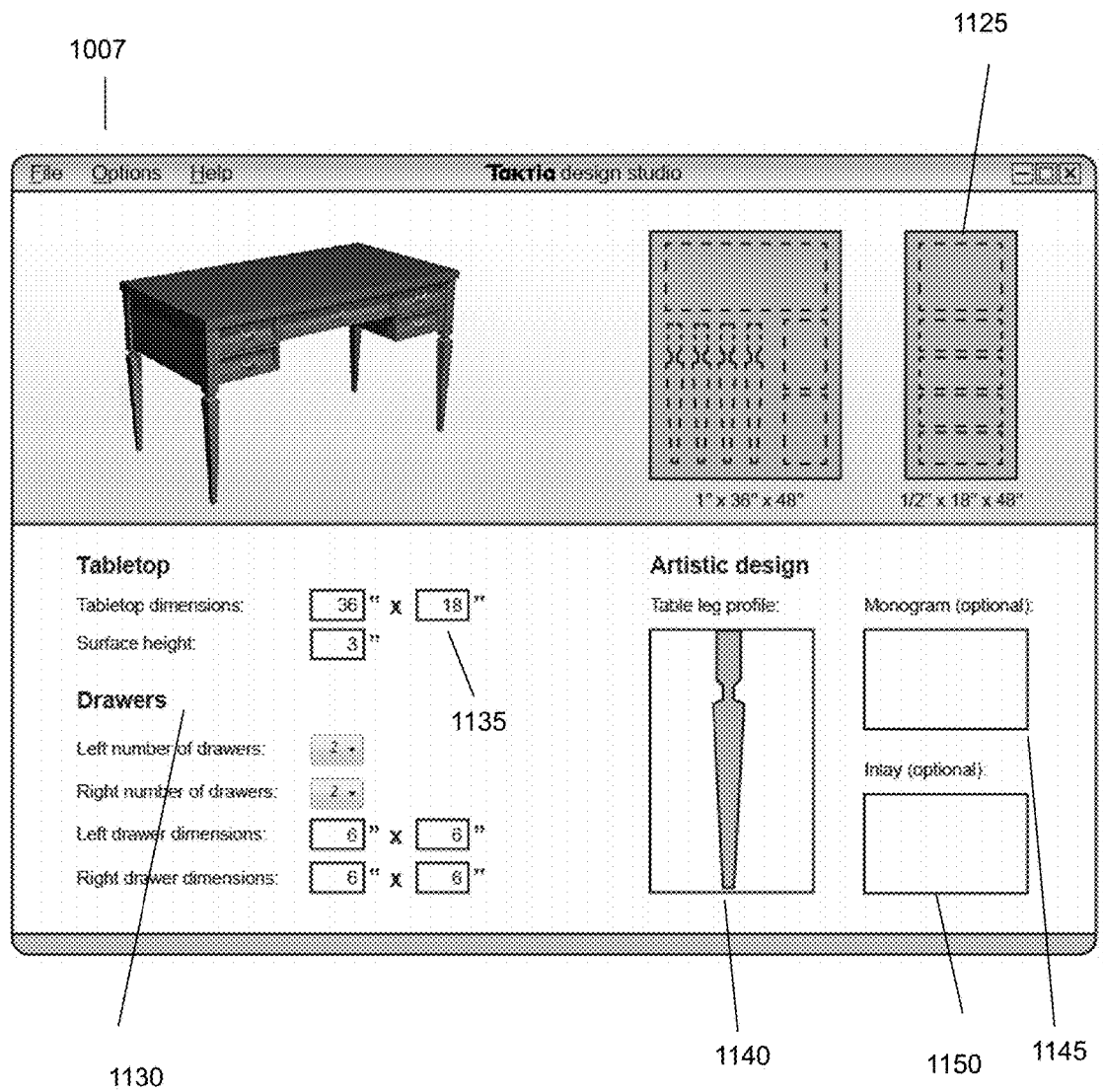
FIG. 9 is an illustrative example of an embodiment of an electronic design studio.

Referring to FIG. 9, an illustrative example of an embodiment of an electronic design studio 1007 is shown. The design studio 1007 may be configured to allow a user to design a project. For example, a user may want to design a custom table. The design studio 1007 may display the customizable components 1130 of the project, such as, e.g., the tabletop and drawers for a table design. In this example, the customizable features include the dimensions 1135 or features of the tabletop (or other design), such as the height of the surface, the number of left drawers, number of right drawers, and the dimensions of the left and right drawers. A user may input the dimensions or height via an input text box, drop down menu, scroll bar, buttons or any other way of inputting data. In some embodiments, the design studio 1007 may suggest a dimension or number or other feature attribute. In some embodiments, the design studio 1007 may automatically update a feature attribute based on the attribute of another feature. For example, if the user enters the table dimensions and the number of drawers, the design studio 1007 may automatically determine the dimensions for the drawers such that they will fit within the overall dimensions of the table.

In some embodiments, the design studio 1007 may be configured to allow a user to select various artistic components of the project. For example, the design studio 1007 includes various options 1145 and 1150 for the table leg profile 1140. For example, the user may select a monogram 1145 or an inlay 1150 design.

In some embodiments, the design studio 1007, upon receiving the design selections, may display a design plan 1125 corresponding to the design selections. The design plan 1125 may include the cutting pattern. The design pattern 1125 may further indicate the dimensions of the material. In some embodiments, based on the design attributes 1130 and 1140, the design studio may automatically configure the design cutout 1125 in order to maximize the material usage and reduce wasted material. For example, the design studio 1007 may combine various elements such that the elements are cut out of a first piece of material and a second piece of material. In some embodiments, the design studio 1007 may take into account the accuracy and precision of the SmartRouter or other cutting device in order to set up the cutting pattern.

Figure 10:
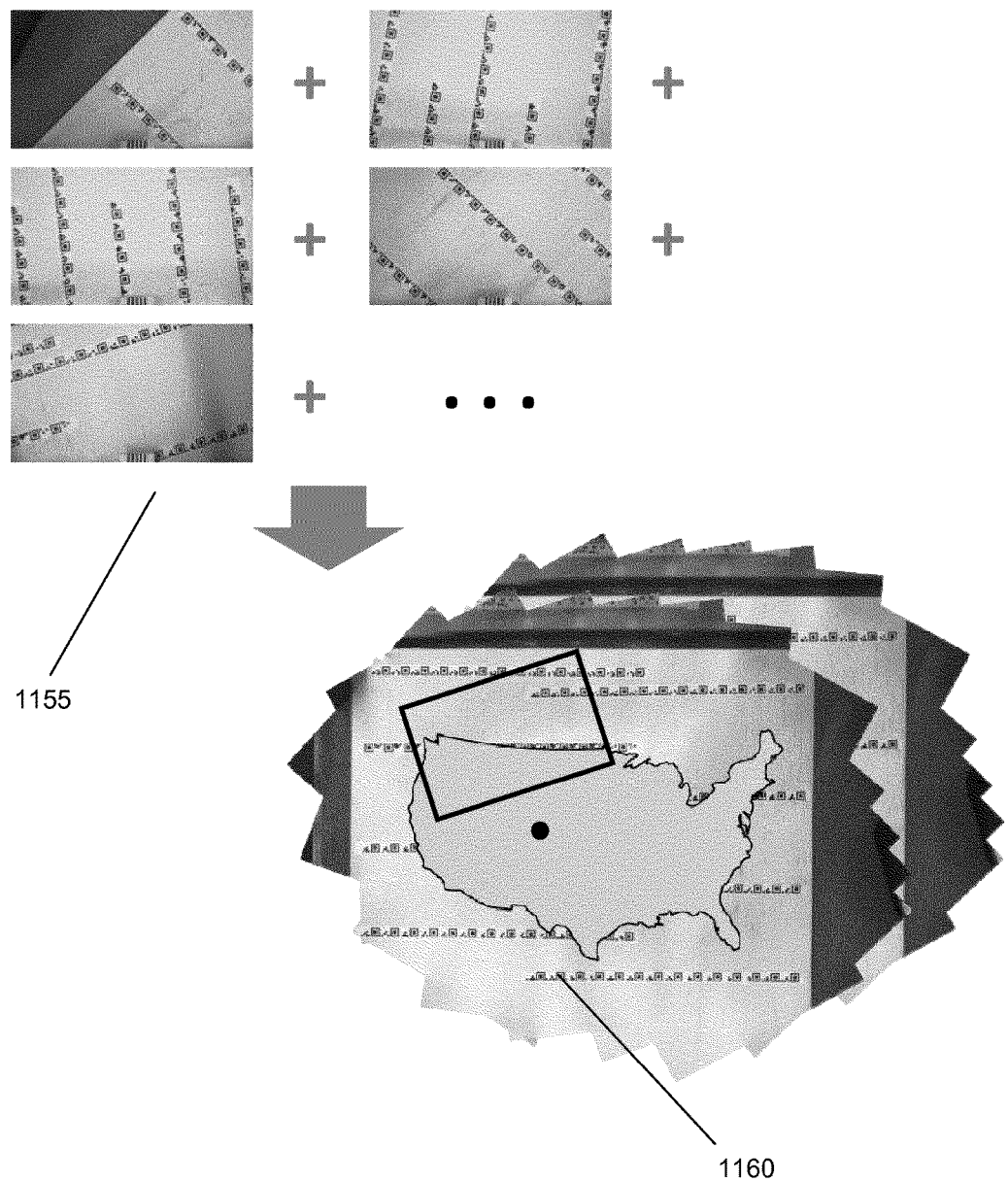
FIG. 10 is an illustrative example of an embodiment of a design plan.

Referring to FIG. 10, an illustrative example of an embodiment of design plan and marking material is shown. Placing marking material 1155 may facilitate mapping the target material. For example, the target material may not contain sufficient differentiating marks. Adding differentiating marks (e.g., stickers 1160) to the target material may facilitate the system 680 in mapping the target material and tracking the positioning of the cutting tool during the cutting process. In this example, the design plan is in the shape of a country. The marking material may be placed on the surface of the target material to facilitate mapping the target material and tracking the position and adjusting the position in accordance with the design.

Figure 11:
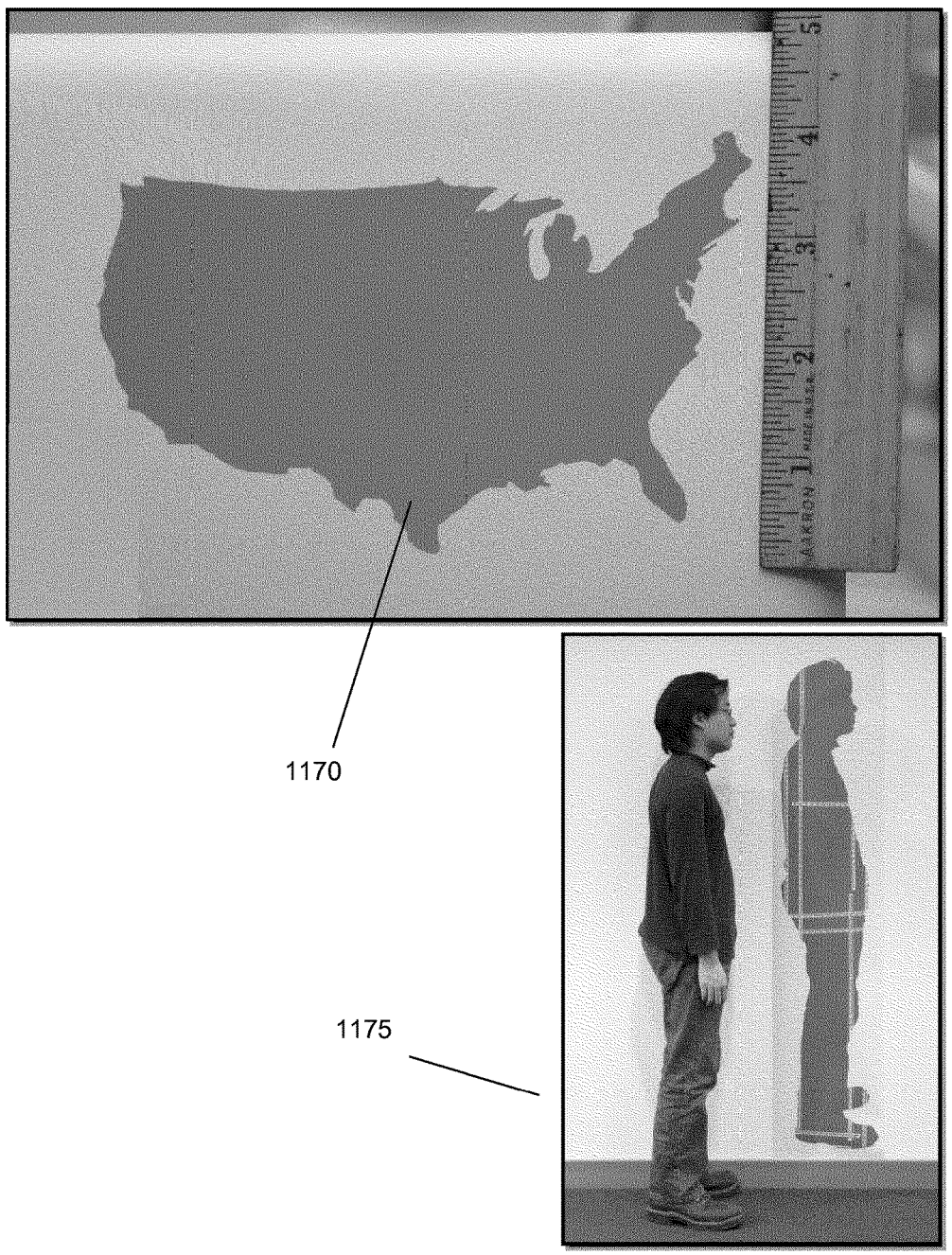
FIG. 11 is an illustrative example of results of generated by embodiments of systems and methods of the present disclosure.
Figure 12:
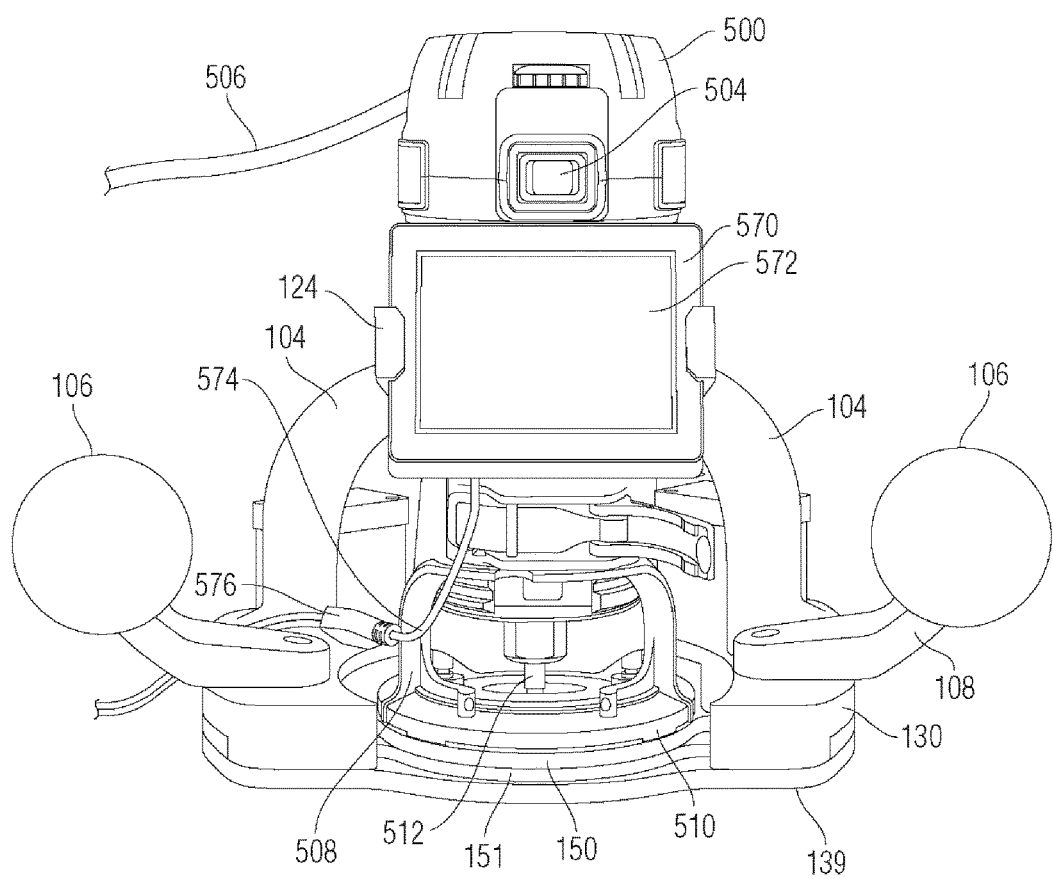
FIG. 12 is a front view of an illustrative example of an embodiment of a guided tool system including a router.
Figure 13:
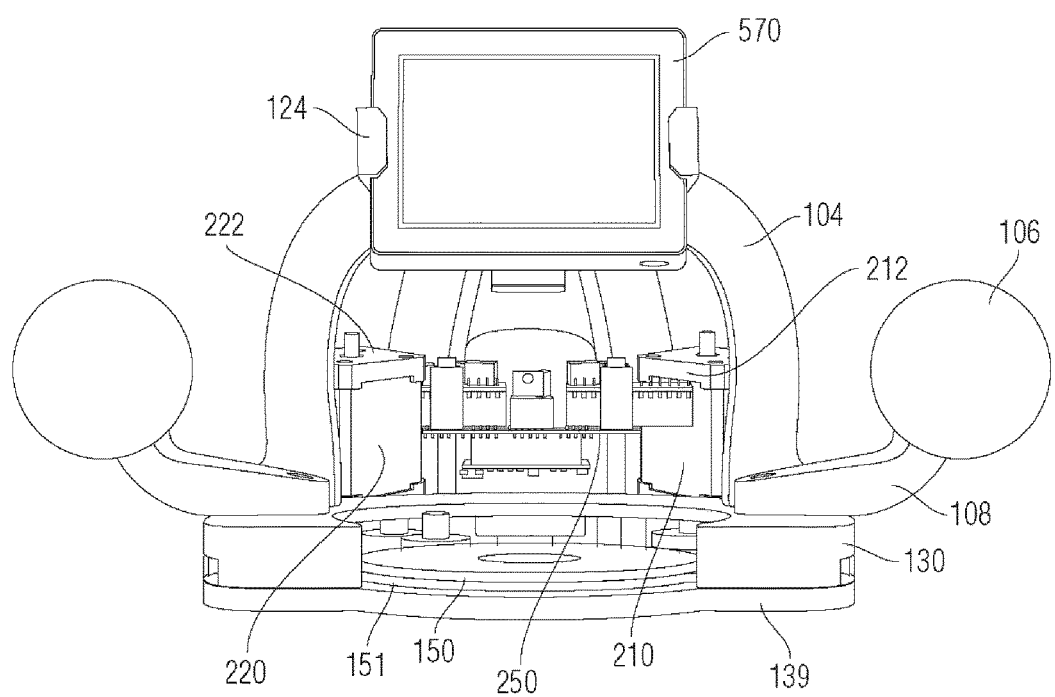
FIG. 13 is a front view of an illustrative example of an embodiment of a guided tool system.

Referring to FIG. 11, an illustrative example of results generated by embodiments of systems and methods of the present disclosure is shown. In some embodiments, these results may reflect cutting results or drawing results. In this example, a dimension of the cutout/drawing 1170 is approximately 4 inches while a dimension of the cutout/drawing 1175 may be several feet (e.g., 6 ft).

Referring to FIGS. 12-20, various embodiments of apparatuses and systems of the present disclosure for use with a cutting tool are shown. In some embodiments, a system or rig 100 is configured for use with a router 500. The system 100 may include two support legs 104 which may be coupled to or otherwise attached to a base housing 130 on the lower end and terminate into a device mount 122 at the upper end. The device mount 122 may include left and right display clips 124 to clamp or lock the monitor or smart device 570 into the device mount 122. In some embodiments, the device 570 includes a display screen 572 for the user to view the cutting path for that particular use. The base 130 may include left and right handles or grips 106 attached through handle support arms 108.

In some embodiments, the lower end of the base 130 includes a bottom plate 139 that encloses the stage 150 and a lower stage skid pad 151. The base 130 and bottom plate 139 may be fastened or otherwise coupled to one another such as by machined screws. As seen in FIG. 8, the bottom plate 139 may include a bottom skid pad 141 attached or otherwise coupled to the bottom. The bottom skid pad 141 may be used to assist movement of the rig 100 along the surface of the target material. The bottom skid pad 141 may be made of a high density polyethylene, Teflon, or other suitable material which is both durable and suited for sliding along the material.

Figure 20:
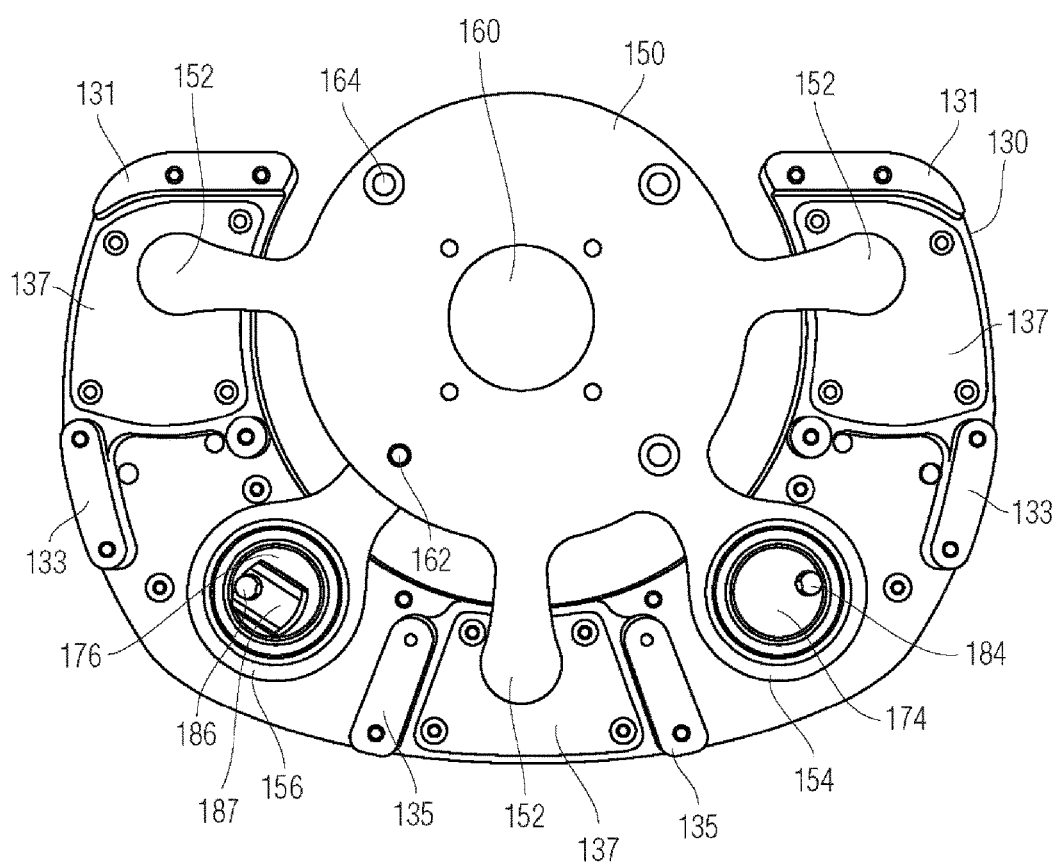
FIG. 20 is a bottom view of the internal stage and pivot components of an illustrative example of an embodiment of a guided tool system.

In some embodiments, the router 500 (or other tool) can be added to the rig 100 by attaching or otherwise coupling the router base plate 510 to the stage 150. As seen in FIG. 20, the stage 150 may include several tool attachment points 164 for attaching the router base 510 to the stage 150. The router base 510 may include several router base support legs 508 which forms a cage around the router bit 512. In some embodiments, the router 500 includes a power cord 506 and an on/off switch 504. As mentioned previously, the rig 100 may be implemented as a self contained portable unit including an on-board source of power, such as a battery source.

In some embodiments, the system 100 includes a smart unit or monitor 570. The smart unit or monitor 570 may include an input cable 574 with a cable terminal or receptacle 576. In some embodiments, a smart unit may include the CPU, software, and memory. In some embodiments, the device 570 may include a monitor and a cable 574 and receptacle 576 that is communicatively coupled to or connect to the CPU unit.

As shown in FIGS. 13-18, the system 100 may include a stage motor 210 and a pivot motor 220. The stage motor 210 may be used to control movement of the stage 150. The pivot motor 220 may be used to control movement of the pivot arm 156 which pulls or pushes the stage 150 to convert the rotational motion of the motors 210, 220 into a relatively linear motion. The stage motor 210 and pivot motor 220 may each include their own motor cap 212, 222 respectively.

In some embodiments, the motors 210, 220 are controlled by the stage motor driver 253 and the pivot motor driver 254. The drivers 253 and 254 may be connected or otherwise communicatively coupled to the printed circuit board 250 or the microcontroller board 252. In some embodiments, the microcontroller 252 processes low level instructions from the smart device or CPU unit (e.g., a laptop, tablet, smartphone, desktop computer, mobile devices). The instructions may include instructions to position the motors 210, 220 (e.g., positions 150, 125) into the correct commands to drive the motors to those positions. In some embodiments, the motors' orientations are tracked by homing them to a zero position once and then tracking all or part of the subsequent acts taken. In some embodiments, the system may use rotary encoders to track the state of the motor shafts' orientations. The motors 210, 220 and the motor drivers 253, 254 may be powered by connecting the power plug receptacle 255 into a power source.

Figure 14:
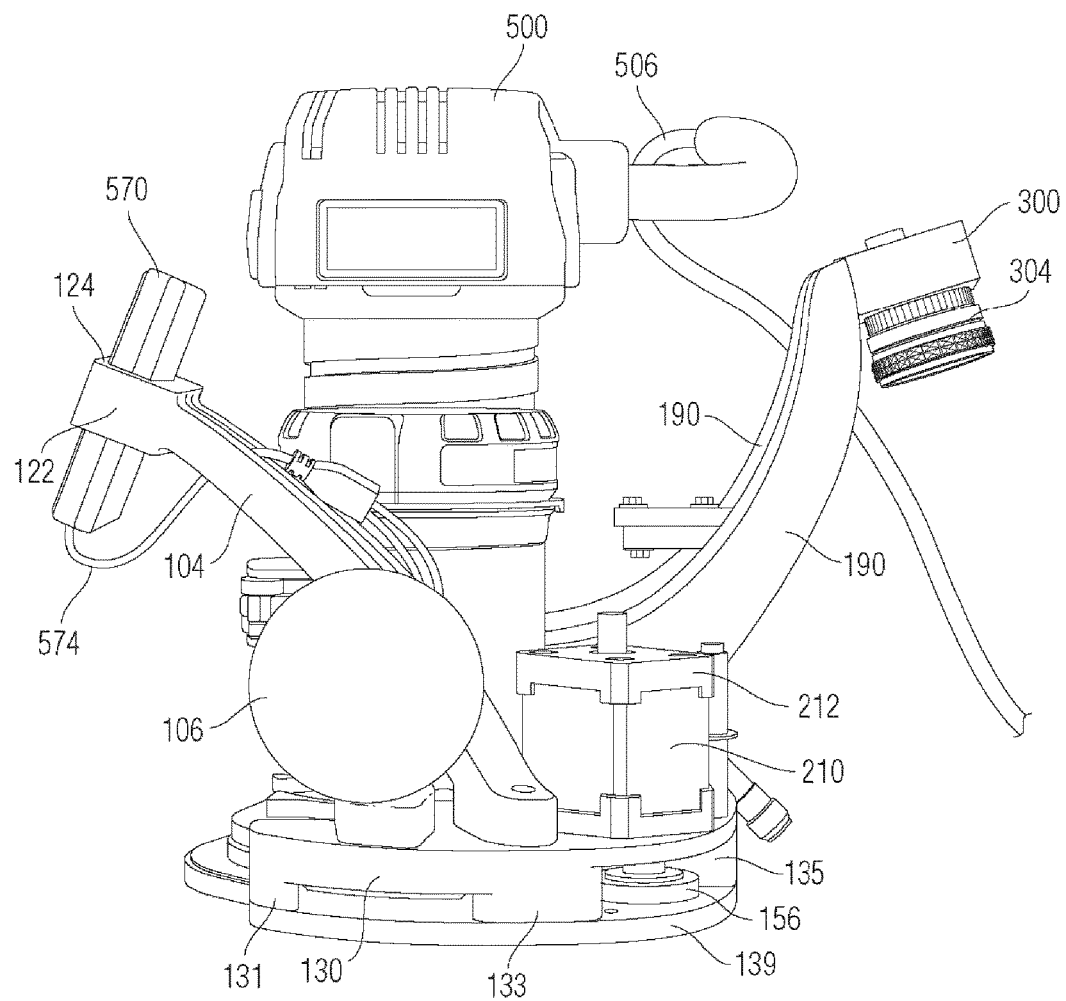
FIG. 14 is a side view of an illustrative example of an embodiment of a guided tool system including a router.
Figure 15:
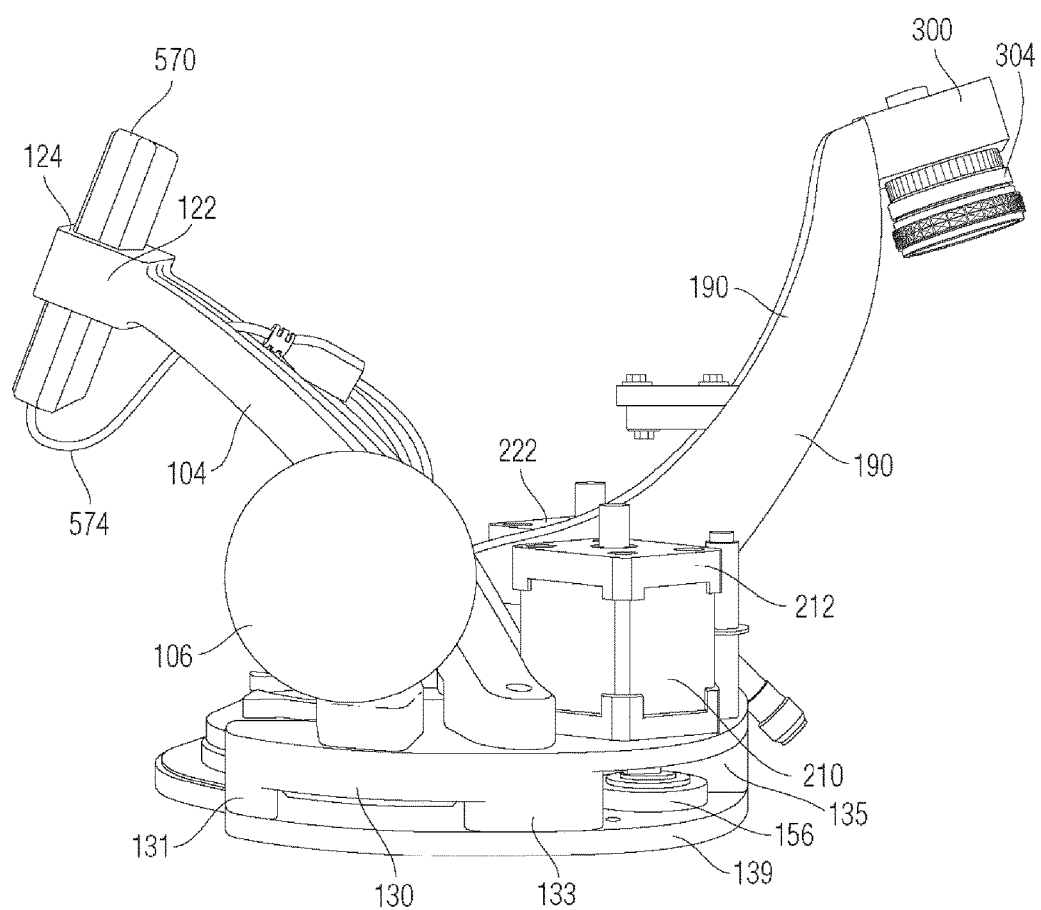
FIG. 15 is a side view of an illustrative example of an embodiment of a guided tool system.
Figure 16:
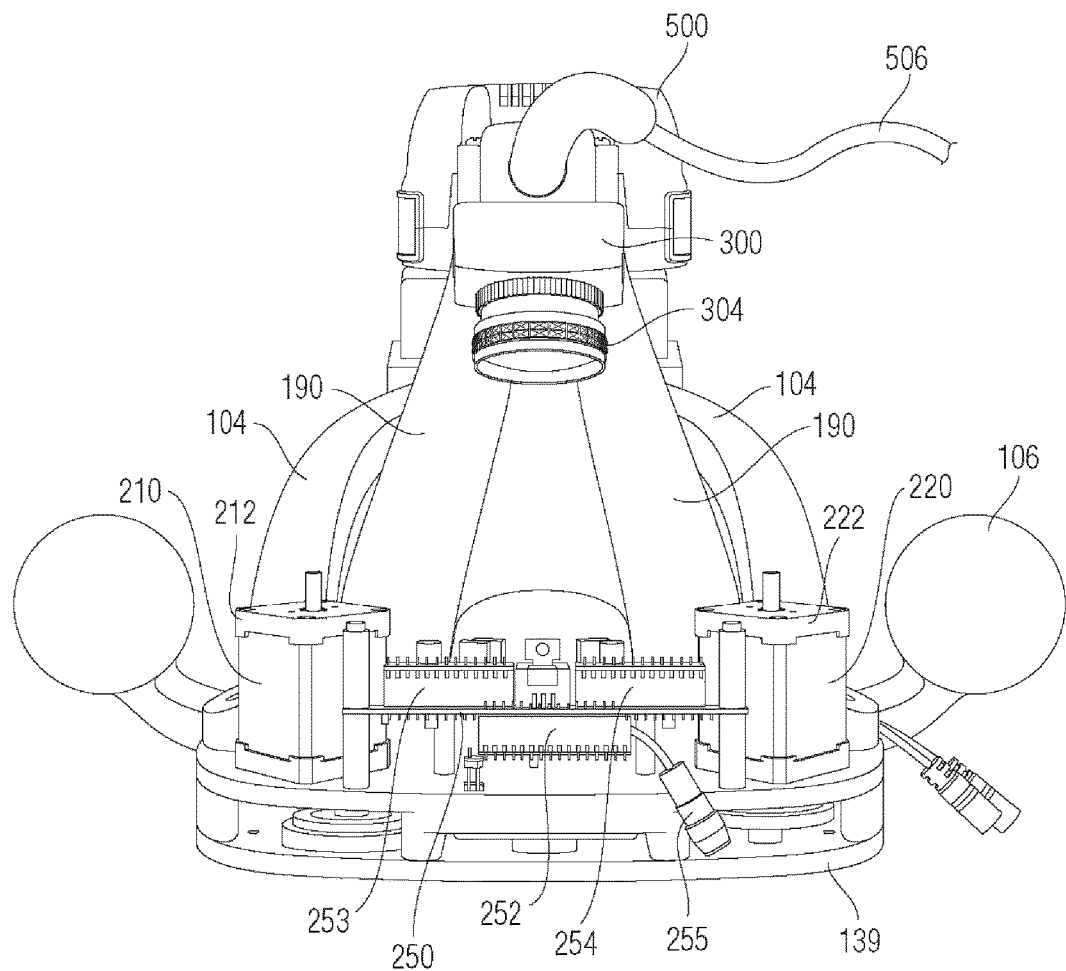
FIG. 16 is a rear view of an illustrative example of an embodiment of a guided tool system including a router.
Figure 17:
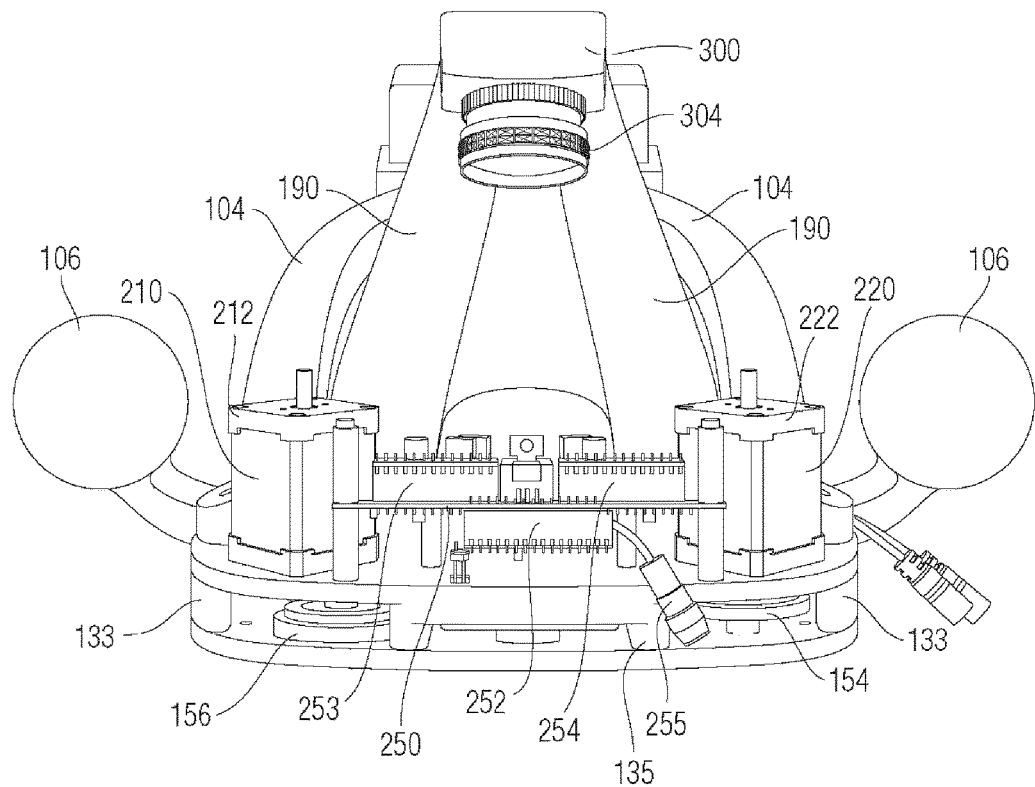
FIG. 17 is a rear view of an illustrative example of an embodiment of the a guided tool system.
Figure 18:
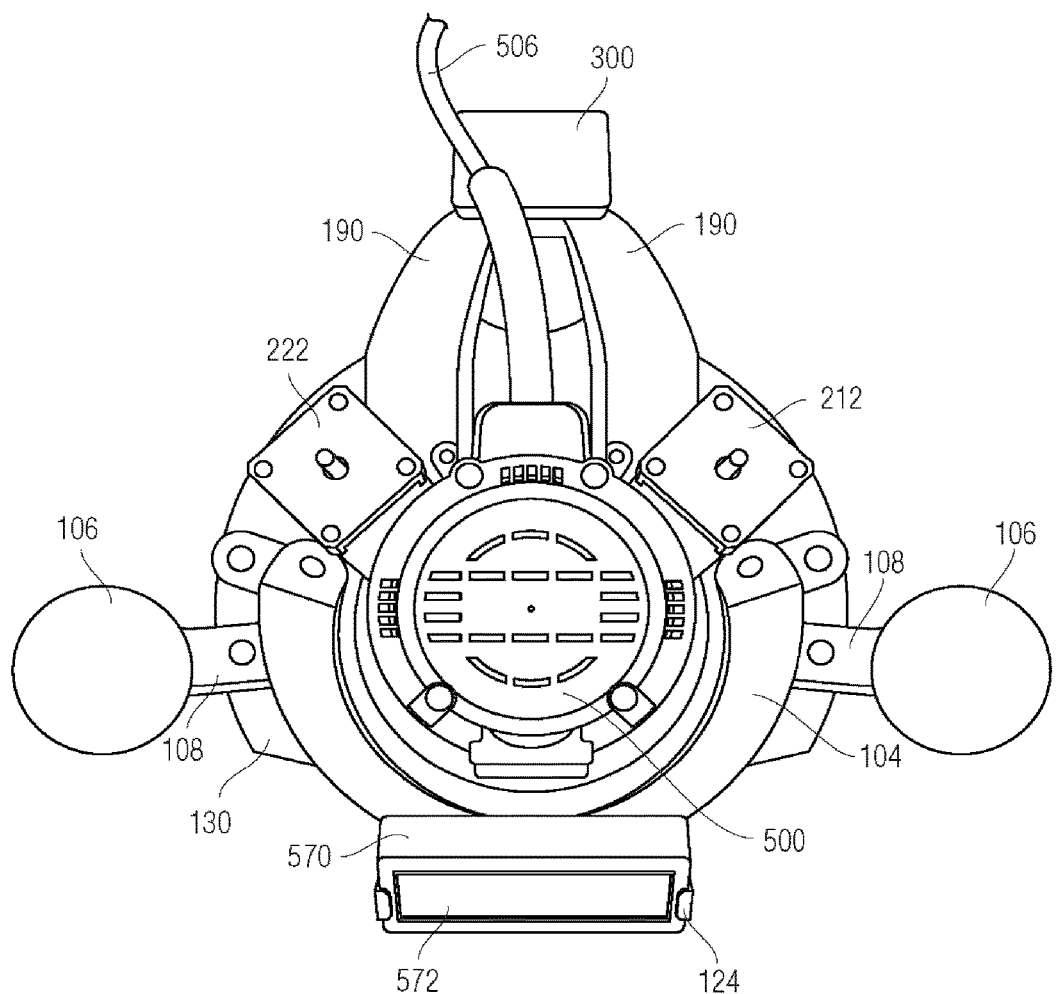
FIG. 18 is a top view of an illustrative example of an embodiment of a guided tool system including a router.
Figure 19:
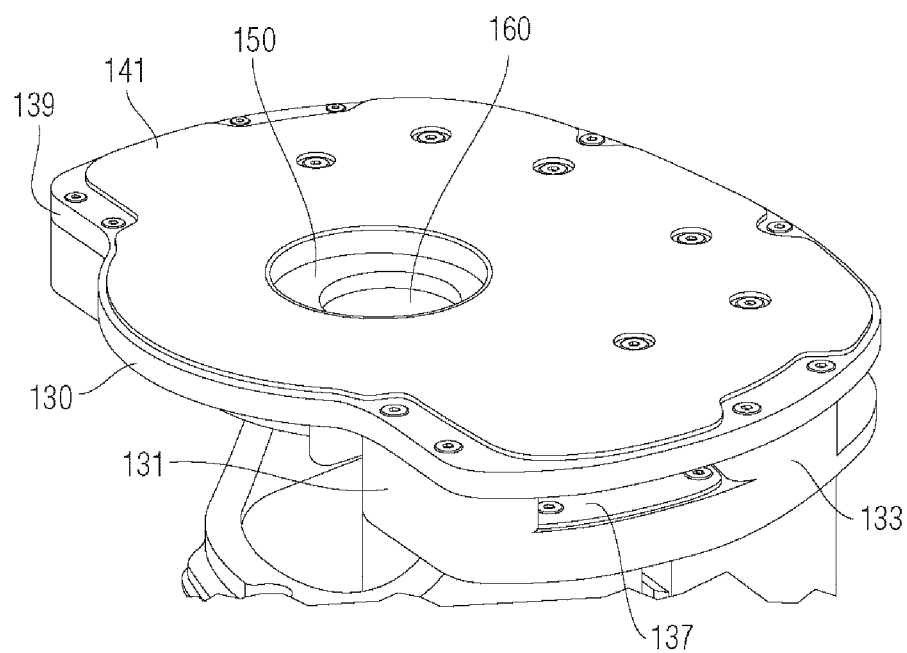
FIG. 19 is a perspective view of the bottom of an illustrative example of an embodiment of a guided tool system.

As shown in FIGS. 14-15, some embodiments of the present disclosure include a rig 100 having a camera support 190. The camera support 190 may include one or more support members which may be connected to the upper stage housing 130 and terminate at the top of the rig 100 where a camera 300 is mounted. In some embodiments, the camera 300 and a lens 304 are placed in a relatively downward position to capture images of the material being worked and the surrounding areas thereof.

In some embodiments, eccentrics, or eccentric members, can be used to convert the rotational motion of the motors into linear motion. Eccentrics may include circular disks rotating around an off-center shaft. As the shafts are rotated, they produce linear motion in the collars wrapped around the eccentric disks. Eccentrics may be capable of maintaining the same low backlash accuracy of a precision linear stage while being less expensive. For example, a linear displacement range of ½" may be within the capabilities of an eccentric. In some embodiments, the system 100 may include two eccentrics mounted to the frame and connected to a stage configured to slide on a base. The eccentrics may be rotated by stepper motors, which may rotate or move the stage within the frame. In various embodiments, the size and shape of the various eccentrics can be varied to provide larger or smaller relative movement of the tool 699 relative to the workspace.

In some embodiments, to constrain the stage, at least one eccentric can be connected directly to the stage by a ball bearing coupling, with another eccentric connected by a coupling and a hinge. This linkage design may result in a nonlinear relationship between the eccentric orientation and stage position. For example, a linkage design closer to the center of the range moderate rotation of an eccentric may produce moderate motion of the stage. In another example, a linkage design near the edge of the range may produce larger rotations which may move the stage a fixed amount. In some embodiments, stage displacement is limited to a threshold of the maximum range (e.g., 99%, 98%, 97%, 95%, 94%, 90%, 87%, 85%, or another percentage that facilitates the functionality of the present disclosure) to avoid positions with extreme nonlinearity. This linkage design may allow for back driving, in that forces acting on the tool may cause the cams to rotate away from their target positions. In some embodiments, the present disclosure includes adequately powered motors which have sufficient power to preclude back driving even in the presence of significant forces.

As seen in FIG. 20, in some embodiments, the upper stage housing 130 is a one piece unit with spacers 131, 133, 135 machined or formed into the upper stage housing 130. The spacers 131, 133, 135 may provide the required space for the stage 150 and pivot arm 156 to move. In some embodiments, the front spacers 131, side spacers 133, and rear spacers 135 need not be formed as one unit. For example, the front spacers 131, side spacers 133, and rear spacers 135 may include separate pieces attached to the upper stage housing 130. The upper stage housing 130 may accommodate a plurality of upper stage skid pads 137. The upper stage skid pads 137 may be configured to allow the stage stabilizing arms 152 to move along the pads 137 with minimal friction.

In some embodiments, the stage 150 may include a light but durable and strong material such as aluminum or some other alloy. In some embodiments, the stage 150 may be machined to include one or more stabilizing arms 152, the stage eccentric arm member 154, tool attachment points 164, or an opening 160 where the tool extends through the stage 150. In some embodiments, a pivot arm 156 may be machined from the same alloy or material as the stage 150.

During operation of some embodiments, the stage motor 210 can move in response to rotation of the stage motor shaft 184. A stage eccentric cam member 174 may be attached to the stage motor shaft 184. When the stage motor shaft 184 rotates, the stage eccentric cam 174 may rotate. This cam design may cause the stage arm member 154 connected to and surrounding the cam 174 to move the stage 150. In some embodiments, a bearing ring may be used between the cam 174 and the stage arm member 154.

In some embodiments when the pivot motor 220 moves, the pivot motor shaft 186 rotates. The system 100 may include a pivot eccentric cam member 176 attached to the pivot motor shaft 186. When the pivot motor shaft 186 rotates, the pivot eccentric cam 176 may rotate, causing the pivot arm member 154 connected to and surrounding the cam 176 to move the pivot arm 156 back and forth, which may cause the stage 150 to move relative to the pivot arm 156. In some embodiments, a bearing ring may be used between the cam 176 and the pivot arm 156.

In some embodiments, as the stage 150 and pivot arm 154 move, the stage stabilizing arms 152 move along the upper stage skid pads and the lower stage skid pad 151 (see FIG. 12) to stabilize the stage 150 during movement. In some embodiments, the stage eccentric 174 and pivot eccentric 176 include a boss. The boss, for example, may provide the eccentric 174, 176 with extra material to house the set screw which clamps on the stage motor shaft 184 or pivot motor shaft 186. This may facilitate secure attachment of the respective eccentric 174, 176. An embodiment of the pivot eccentric boss 187 is shown in FIG. 20. The figure does not show the stage eccentric boss because, in the embodiment shown, the eccentric is flipped relative to the pivot boss 187 because the stage 150 and the pivot arm 156 are operating on different planes.

Figure 23:
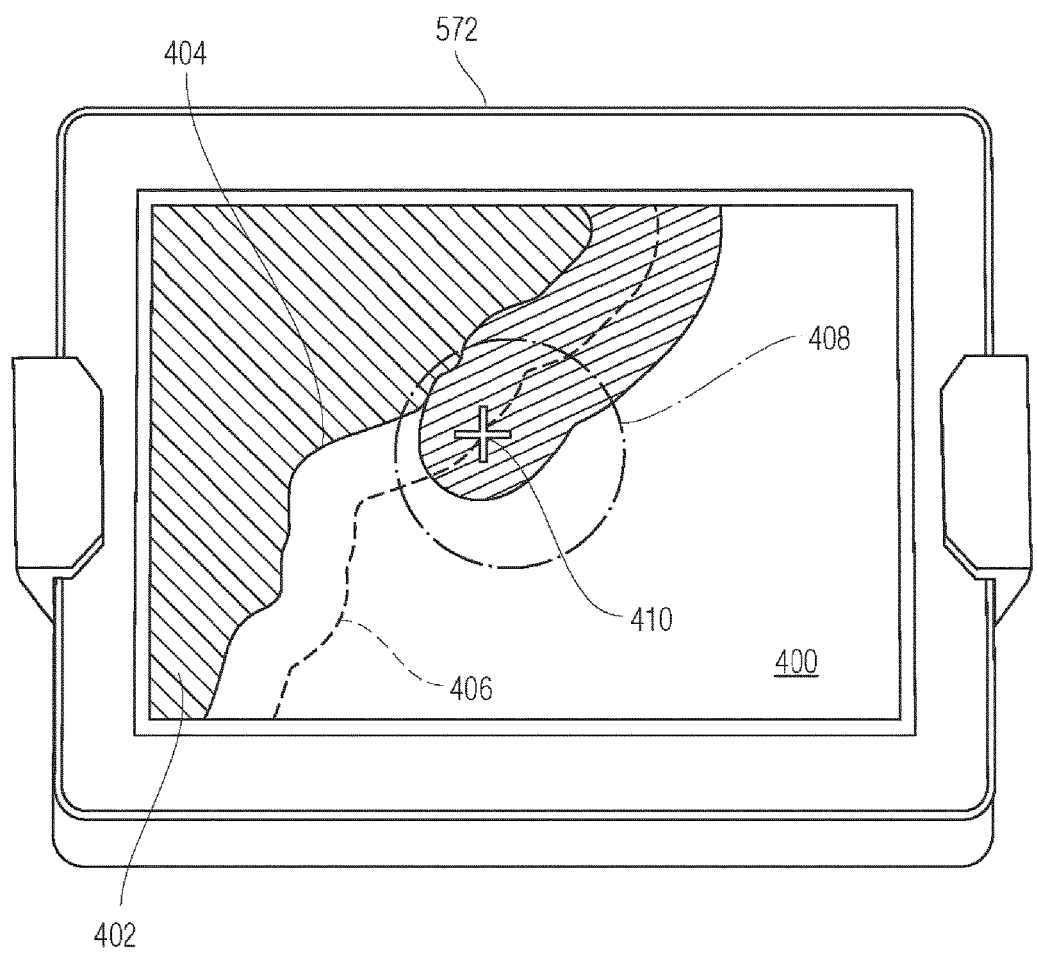
FIG. 23 is a illustrative example of a graphical user interface of an embodiment of a guided tool system.

By way of example of some embodiments, FIG. 23 depicts the monitor or display 572 as the user pulls or pushes the rig 100 using, e.g., handles 106. The router bit 512 (as shown by the crosshairs 410) of the router 500 may perform a task on a target material 400, e.g., cut the material 402 or draw on the target material. The user may view the intended path 404 (as shown in solid lines) of the design on the display 572 of the monitor or smart device 570. In some embodiments, the display 572 shows the desired path 406 as well as the target range 408. The target range 408 may be related to the range of movement of the stage 150 and correspondingly the attached tool. For example, if the range of movement of the router is generally 0.5 inches in any direction from its center point then the target range 408 may be defined as a circle with a one inch diameter since the router bit can only move 0.5 inches from the center point. Further to this example, the user may move the router bit 410 within 0.5 inches of the intended path 404. Once the intended path 404 is within the target range 408, the CPU may automatically identify a target point on the intended path 404. The CPU may send instructions to the motor controllers to move the stage 150 to the appropriate coordinates, which may correspond with the bit 410 reaching the target point and cutting along the intended path 404. In some embodiments, the system can account for the width of the cutting bit 410. For example, if the system were to place the router bit 410 directly on the intended path 404 the width of the router blade may cause the router to remove material beyond the intended path 404. The system may account for the width of the cutting bit 410 by setting the desired path 406 some distance from the intended path 404 so that the bit 410 takes out material up to, but not beyond, the intended path 404. Since cutting elements or bits may have different widths, the system may be adjusted to remove or vary the bit width adjustment or the gap between the intended path 404 and the desired path 406.

As the system cuts or reaches one target point, in some embodiments, the system may identify a next target point and continue cutting along the intended path 404 in a clockwise direction. The user may continue to pull or push the rig 100 via the handles 106. The user may keep the intended path 404 (a line or area) within the target range 408 as displayed on monitor 572. A more detailed flow and process is described in conjunction with FIGS. 4 and 5.

Figure 21:
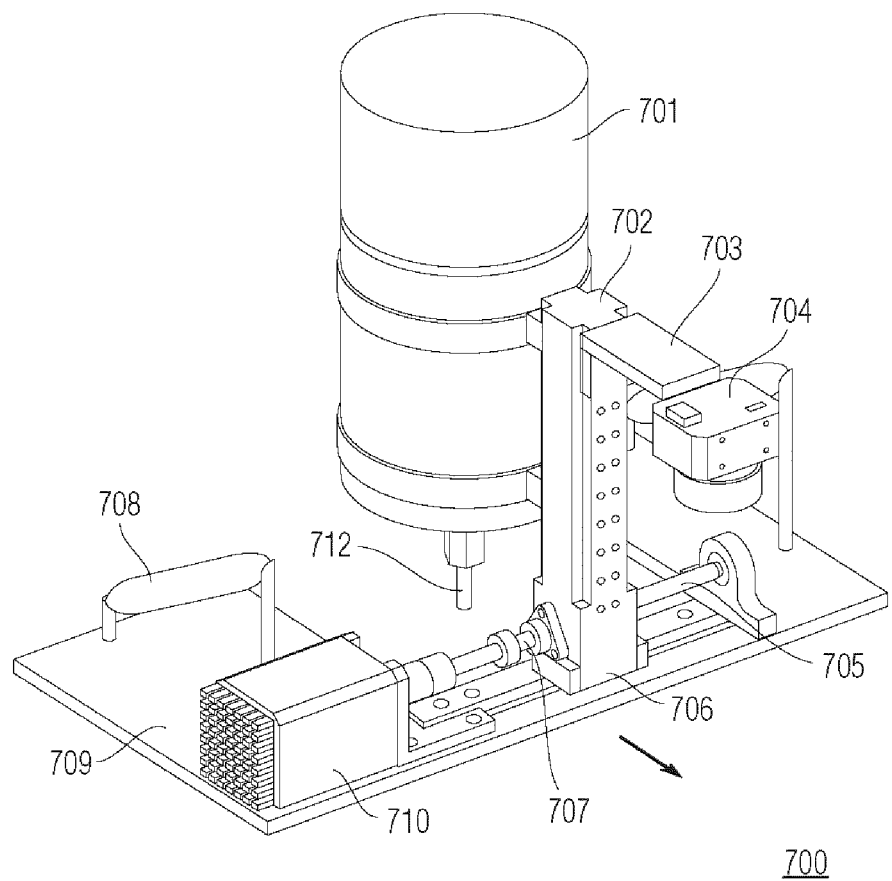
FIG. 21 is a perspective view of an illustrative example of an embodiment of a guided tool system.

With reference to FIGS. 12-20, an embodiment of the present disclosure includes a handheld computer controlled router system using an eccentric cam movement of a stage to control the router. However, eccentric cam movement is not the only design or method that can be employed to move a tool or stage. As seen in FIG. 21, an illustration of an embodiment of a system of the present disclosure that includes a linear based design is shown. The system 700 may include a router 701 mounted to a tool arm 702. The tool arm 702 may be built on top of the linear stage base 706. The linear stage base 706 may move in a back and forth direction along the axis line formed by the lead screw 705 and the precision nut 707. In some embodiments, linear movement is achieved by controlling the stepper motor 710 which turns the lead screw 705 which moves the precision nut 707 forcing the linear stage base 706 to move. The stepper motor and end of the linear system may be mounted on the base 709. In some embodiments, handles 708 may be attached to the base 709 for users to move the system 700 on the material.

In some embodiments, the linear system 700 includes camera 704 or sensor technology previously described to map the surface of the material and determine the coordinates or location of the device 700 on the material. The user may scan the material with the camera 704 (connected to tool arm 702 using bracket 703) to make a map as described herein. In some embodiments, the system 700 receives a design and registers the design or otherwise relates the design to a map of the material. For example, a user may create, download, or otherwise obtain a design and provide it to the system 700. In some embodiments, a user may return to the material with the tool, and follow the cut lines of the plan.

In some embodiments, the device 700 includes handles 708 to move the device forward while trying to keep the router 701 on the intended cut path or line. If the device 700 drifts off the cutline or path, the system 700 may detect the error by detecting its location and comparing it with the plan. The system 700 may, responsive to detecting the error, correct the path. For example, the system 700 may power the stepper motor 710 to rotate the lead screw 705 to move the router 701 by moving the linear stage base 706 to such a point where the cutting bit 712 intersects the plan line exactly. In this example, the present disclosure can be used to make complex, curved, or precise cuts.

Both the eccentric and linear embodiments may employ a monitor or display to communicate or display the location of the tool relative to the intended path. Various embodiments may also use other techniques such as shining a laser point or line where the user should go or some combination thereof.

In an illustrative example, the tool may be used to cut a design, such as on a table top or sign, where the cut does not go all the way through the material and the tool can be used for more than one pass to remove all the material required for the design. In such instances, the system may be configured to signal the motors to move the router back and forth within the target range until all material has been removed in accordance with the design. In some embodiments, the system may be configured to provide a notice to the user to wait until all such material within the target range has been removed. In some embodiments, the system may notify the user upon completion of the design in a certain region. This may indicate to the user it is time to move forward to a new target area.

In some embodiments, the router may be configured to follow a line drawn onto the material itself. For example, the camera may be placed at the front of the operating tool and view the drawn line. The system may use location mapping to stay accurate to the drawn line.

Some embodiments of the present disclosure may include printing or drawing on a target surface or material. For example, a user may build or otherwise obtain a map and upload a design. The system may be configured to print the design section by section on a large canvas. The system may identify which color or colors to emit based on the design and location of the printing tool. After the user mapped the material and uploaded the design, the user may pass the device over the material to print the image.

Figure 22:
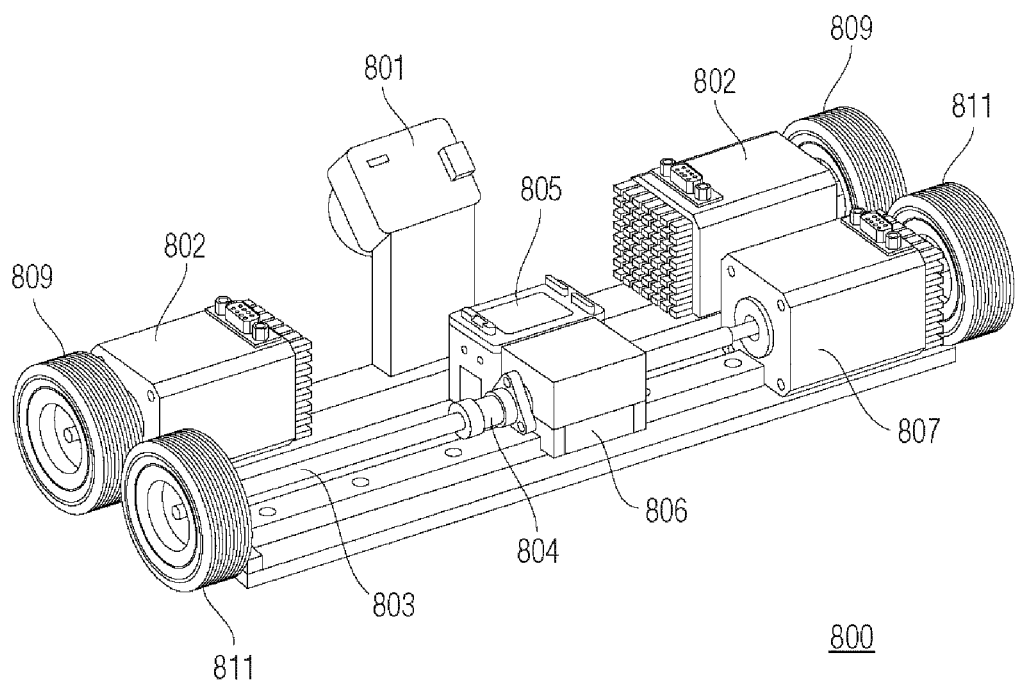
FIG. 22 is a perspective view of an illustrative example of an embodiment of a guided tool system.

Referring to FIG. 22, an illustrative embodiment of a printer of the present disclosure is shown. In some embodiments, the printer may be manually guided, while in other embodiments the printer may be automatically positioned with wheels (or treads, or other) like a robot. As with the tool based embodiments, the system 800 includes a camera 801 which may be used to build a map of the surface and track the position of the device 800 on the surface. The printer head 805 can be configured to slide along a linear stage 806 powered by a stepper motor 807 which may rotate a lead screw 803 which may move a precision nut 804.

In some embodiments, the device 800 obtains or generates a map of a surface and registers or otherwise relates an image that is to be printed on that surface. The device 800 may then be positioned at one side of the intended printed area. In some embodiments, the camera 801 may take an image and the device 800 may determine its position on the surface. The device 800 may then move the printer head 805 from one end of the linear stage 806 to the other to lay down a strip of ink. The device 800 may further be moved forward the width of one strip of ink (or slightly less to prevent gaps) by stepper motors 802 attached to wheels 809. In some embodiments, the printer 800 may include wheels 811 that are configured to roll when the motor driven wheels 809 are driven. Once the printer 800 has determined that the location of the printer 800 is correct for the next strip, the printer may print the strip of ink and repeat until the edge of the image has been reached. In this example, the printer 800 can lay down a band of ink as wide as a strip's length and arbitrarily long. At this point, the printer 800 can either move itself to the next position to start laying down another band of ink, or the user can do this manually.

Various embodiments of the printer system 800 can work either in real time (e.g., printing as it is moving) or by taking steps (printing when at a stop position). Embodiments can suit different tasks: e.g., a highspeed, real-time version might be built to print billboards, which have low accuracy requirements, while a more precise, slower, step-taking device might be built to do accurate large-format printing, e.g. of posters. Either approach can also be made to work on a wall, which would make it possible to print murals, advertisements, or other images directly onto a wall, rather than having to print the image on wall paper and then stick it up. In addition, this tool could easily be made to work with curved surfaces, which are typically extremely difficult to cover with images.

The printer embodiment 800 may be adapted for use with any type of paint including inkjet, liquid or spray paints, markers, laser printing technology, latex based paints, and oil based paints.

In some embodiments, the mapping phase may be bypassed if the material size is greater than the design. For example, the user may determine a starting point that corresponds with a region on the design (i.e. the top right corner) and the system 800 may start painting the image.

The embodiments discussed herein so far have focused on rigs that accommodate a tool being attached to a stage and the stage is moved or controlled by one or more motors. The linear design depicts a router moved by a motor where the router is connected to a linear stage. In such instances, the router is attached or mounted as a separate unit. However, the system can be designed as one unit where the stage, motors moving the stage, controllers, and all within the same housing and within the same power system as the housing and power of the tool. By way of example, the router housing would be enlarged to fit the stage and motors and might include a display integrated into the housing. Through such an embodiment, the form factor might be improved to look like a one piece tool.

The embodiments presented here are not meant to be exhaustive. Other embodiments using the concepts described herein are possible. In addition, the components in these embodiments may be implemented in a variety of different ways. For example, a linear stage, or a hinge joint, or an electromagnetic slide, or another positioning mechanism may be used to adjust a tool or the stage the tool is on in reaction to its detected position and its intended position.

By way of example, the systems and methods described herein can be used with drills, nail guns, and other tools that operate at a fixed position. In such embodiments, the tool and software could be modified such that the plan includes one or more target points instead of a full design. The device could be moved by the user such that a target position is within the adjustment range. The software could then move the tool to the correct target position. The user could then use the tool to drill a hole, drive in a nail, or perform other operations.

In some embodiments, the tools can facilitate performing a task without providing automatic adjustment. For example, the stage, pivot, motors, and eccentrics could be removed. The tool could be attached to the lower stage housing. The software could be modified such that the plan includes one or more target points. The user could move the device such that the tool is directly over the target position. The user could use the location feedback provided on the display to perform accurate positioning.

In some embodiments, the present disclosure facilitates guiding or positioning a jigsaw. A jigsaw blade may be rotated and moved in the direction of the blade, but not moved perpendicular to the blade or it will snap. The present disclosure may include a rotating stage that can be placed on top of the positioning stage. The jigsaw may be attached to this rotating stage. The software may be modified to make the jigsaw follow the plan and rotate to the correct orientation, and made to ensure that the jigsaw was never moved perpendicular to the blade. In some embodiments, a saber saw may take the place of the jigsaw to achieve the same effect. The cutting implement may be steered by rotating the rotating stage, and the cutting implement could be moved along the direction of cutting by moving the positioning stage.

In some embodiments, the system may support rotation and not support translation. For example, the system may automatically orient the blade in a scrolling jigsaw (e.g., a jigsaw with a blade that can be rotated independently of the body). In this embodiment, the software may steer the blade to aim it at the correct course and the user may be responsible for controlling its position.

In some embodiments, the system may position a scroll saw. For example, the camera may be coupled to the scroll saw, and the user may move the material. The upper and lower arms of the scroll saw may be mechanized such that they can move independently by computer control. The user may then move the material such that the plan lay within the adjustment range of the scroll saw, and the software would adjust the scroll saw to follow the plan. In some embodiments, the upper and lower arms could be moved to the same position, or moved independently to make cuts that are not perpendicular to the material.

In some embodiments, the position correcting device can be mounted to a mobile platform. For example, the device may be placed on material and left to drive itself around. The device can also be used in an alternative embodiment in which two mobile platforms stretch a cutting blade or wire between them. For example, each platform may be controlled independently, allowing the cutting line to be moved arbitrarily in 3D, for example to cut foam.

In some embodiments, the system may be coupled or otherwise attached to vehicles or working equipment such as a dozer in which the position-correcting mechanism is mounted on the vehicle. For example, some embodiments of the hybrid positioning system may include a vehicle comprising a first position-correcting system that is accurate to within a first range and a second position-correcting system that is accurate to a second range that is more precise than the first range. The vehicle may be driven over a sheet of material such as a steel plate lying on the ground, and a cutting tool such as a plasma cutter could be used to cut the material. In some embodiments, the present disclosure may facilitate a plotting device or painting device, for example to lay out lines on a football field or mark a construction site.

The vehicle, for example, may include an industrial vehicle such as a forklift type vehicle configured to include a cutter or other tool, a camera, and control circuitry described herein to determine location of the vehicle (or the tool) on the material, identify where to cut or mark the material, and adjust the tool to cur or mark the material in the appropriate location.

Figure 24:
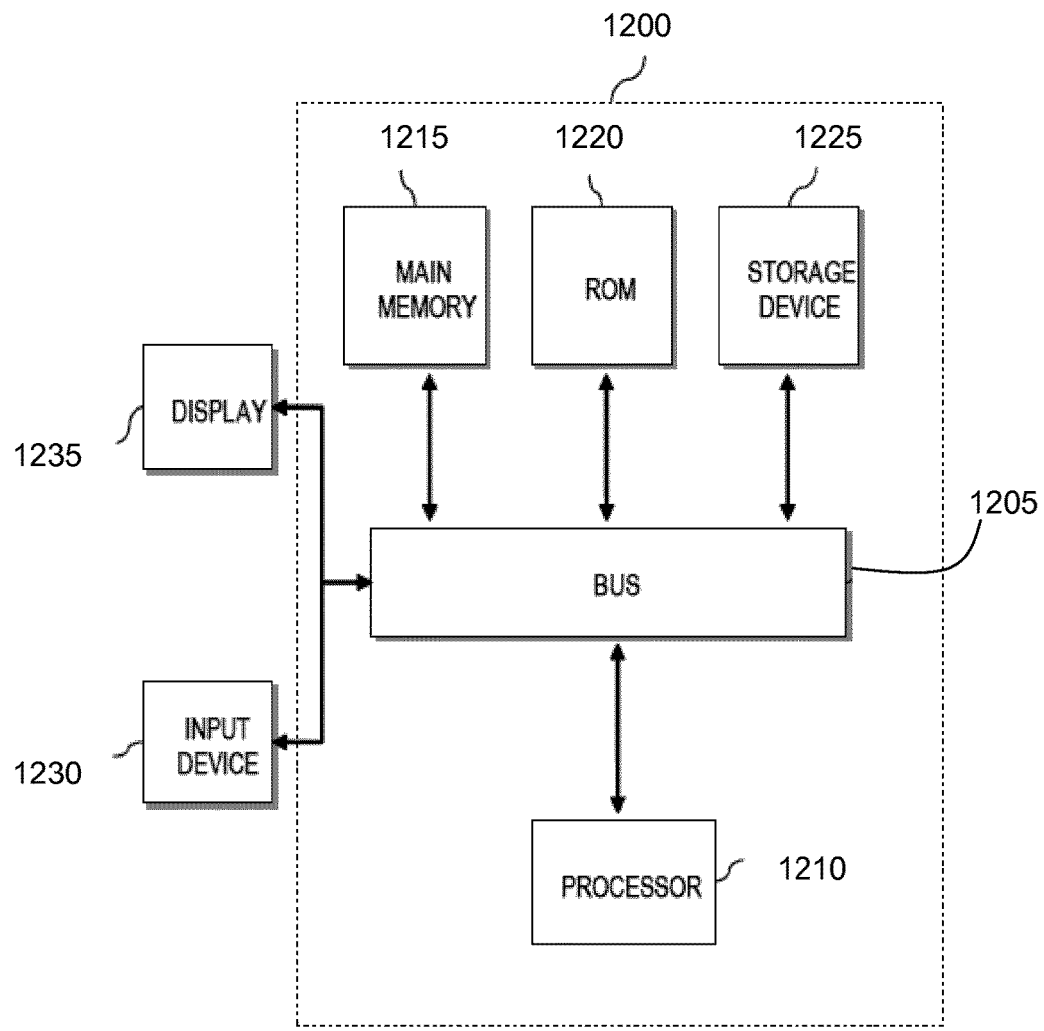
FIG. 24 is a block diagram illustrating a general architecture for a computer system that may be employed to implement various elements of the systems and the methods disclosed herein, in accordance with an implementation.

FIG. 24 is a block diagram of a computer system 1200 in accordance with an illustrative implementation. The computer system or computing device 1200 can be used to implement the system 100, content provider, user device, web site operator, data processing system, weighting circuit, content selector circuit, and database. The computing system 1200 includes a bus 1205 or other communication component for communicating information and a processor 1210 or processing circuit coupled to the bus 1205 for processing information. The computing system 1200 can also include one or more processors 1210 or processing circuits coupled to the bus for processing information. The computing system 1200 also includes main memory 1215, such as a random access memory (RAM) or other dynamic storage device, coupled to the bus 1205 for storing information, and instructions to be executed by the processor 1210. Main memory 1215 can also be used for storing position information, temporary variables, or other intermediate information during execution of instructions by the processor 1210. The computing system 1200 may further include a read only memory (ROM) 1220 or other static storage device coupled to the bus 1205 for storing static information and instructions for the processor 1210. A storage device 1225, such as a solid state device, magnetic disk or optical disk, is coupled to the bus 1205 for persistently storing information and instructions.

The computing system 1200 may be coupled via the bus 1205 to a display 1235, such as a liquid crystal display, or active matrix display, for displaying information to a user. An input device 1230, such as a keyboard including alphanumeric and other keys, may be coupled to the bus 1205 for communicating information and command selections to the processor 1210. In another implementation, the input device 1230 has a touch screen display 1235. The input device 1230 can include a cursor control, such as a mouse, a trackball, or cursor direction keys, for communicating direction information and command selections to the processor 1210 and for controlling cursor movement on the display 1235.

According to various implementations, the processes described herein can be implemented by the computing system 1200 in response to the processor 1210 executing an arrangement of instructions contained in main memory 1215. Such instructions can be read into main memory 1215 from another computer-readable medium, such as the storage device 1225. Execution of the arrangement of instructions contained in main memory 1215 causes the computing system 1200 to perform the illustrative processes described herein. One or more processors in a multi-processing arrangement may also be employed to execute the instructions contained in main memory 1215. In alternative implementations, hard-wired circuitry may be used in place of or in combination with software instructions to effect illustrative implementations. Thus, implementations are not limited to any specific combination of hardware circuitry and software.

Although an example computing system has been described in FIG. 24, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 25:
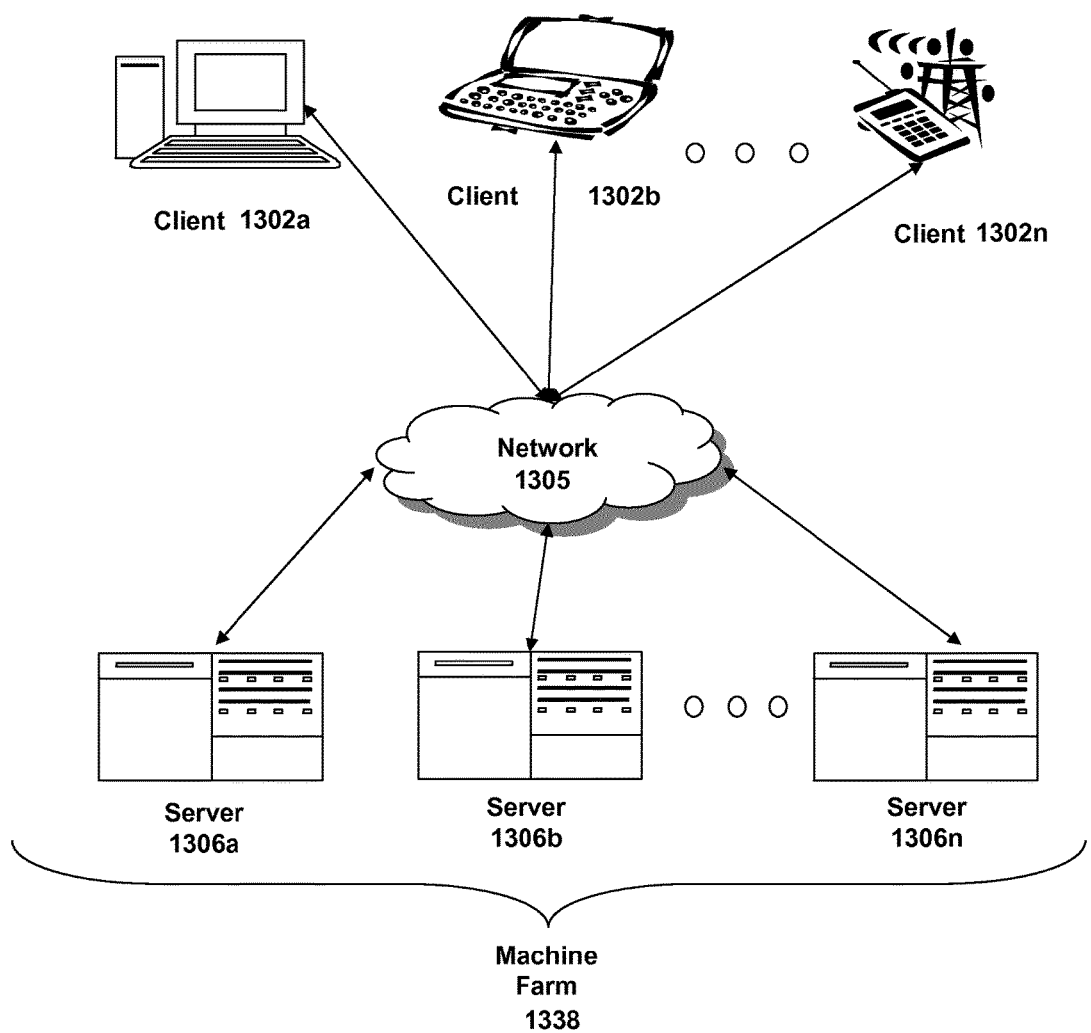
FIG. 25 shows an illustration of an example network environment comprising client machines in communication with remote machines in accordance with an implementation.

The system 100 and its components, such as a data processing system, may include hardware elements, such as one or more processors, logic devices, or circuits. FIG. 25 shows an illustration of an example network environment comprising client machines in communication with remote machines in accordance with an implementation. The system 100 can operate in the exemplary network environment depicted in FIG. 25. In brief overview, the network environment includes one or more clients 1302 that can be referred to as local machine(s) 1302, client(s) 1302, client node(s) 1302, client machine(s) 1302, client computer(s) 1302, client device(s) 1302, endpoint(s) 1302, or endpoint node(s) 1302) in communication with one or more servers 1306 that can be referred to as server(s) 1306, node 1306, or remote machine(s) 1306) via one or more networks 1305. In some implementations, a client 1302 has the capacity to function as both a client node seeking access to resources provided by a server and as a server providing access to hosted resources for other clients 1302.

Although FIG. 25 shows a network 1305 between the clients 1302 and the servers 1306, the clients 1302 and the servers 1306 may be on the same network 1305. The network 1305 can be a local-area network (LAN), such as a company Intranet, a metropolitan area network (MAN), or a wide area network (WAN), such as the Internet or the World Wide Web. In some implementations, there are multiple networks 1305 between the clients 1305 and the servers 1306. In one of these implementations, the network 1305 may be a public network, a private network, or may include combinations of public and private networks.

The network 1305 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 1305 may include a wireless link, such as an infrared channel or satellite band. The topology of the network 1305 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

In some implementations, the system 100 may include multiple, logically-grouped servers 1306. In one of these implementations, the logical group of servers may be referred to as a server farm 1338 or a machine farm 1338. In another of these implementations, the servers 1306 may be geographically dispersed. In other implementations, a machine farm 1338 may be administered as a single entity. In still other implementations, the machine farm 1338 includes a plurality of machine farms 1338. The servers 1306 within each machine farm 1338 can be heterogeneous—one or more of the servers 1306 or machines 1306 can operate according to one type of operating system platform.

In one implementation, servers 1306 in the machine farm 1338 may be stored in high-density rack systems, along with associated storage systems, and located in an enterprise data center. In this implementation, consolidating the servers 1306 in this way may improve system manageability, data security, the physical security of the system, and system performance by locating servers 1306 and high performance storage systems on localized high performance networks. Centralizing the servers 1306 and storage systems and coupling them with advanced system management tools allows more efficient use of server resources.

The servers 1306 of each machine farm 1338 do not need to be physically proximate to another server 1306 in the same machine farm 1338. Thus, the group of servers 1306 logically grouped as a machine farm 1338 may be interconnected using a wide-area network (WAN) connection or a metropolitan-area network (MAN) connection. For example, a machine farm 1338 may include servers 1306 physically located in different continents or different regions of a continent, country, state, city, campus, or room. Data transmission speeds between servers 1306 in the machine farm 1338 can be increased if the servers 1306 are connected using a local-area network (LAN) connection or some form of direct connection. Additionally, a heterogeneous machine farm 1338 may include one or more servers 1306 operating according to a type of operating system, while one or more other servers 1306 execute one or more types of hypervisors rather than operating systems. In these implementations, hypervisors may be used to emulate virtual hardware, partition physical hardware, virtualize physical hardware, and execute virtual machines that provide access to computing environments.

Management of the machine farm 1338 may be decentralized. For example, one or more servers 1306 may comprise components, subsystems and circuits to support one or more management services for the machine farm 1338. In one of these implementations, one or more servers 1306 provide functionality for management of dynamic data, including techniques for handling failover, data replication, and increasing the robustness of the machine farm 1338. Each server 1306 may communicate with a persistent store and, in some implementations, with a dynamic store.

Server 1306 may include a file server, application server, web server, proxy server, appliance, network appliance, gateway, gateway, gateway server, virtualization server, deployment server, secure sockets layer virtual private network ("SSL VPN") server, or firewall. In one implementation, the server 1306 may be referred to as a remote machine or a node.

The client 1302 and server 1306 may be deployed as or executed on any type and form of computing device, such as a computer, network device or appliance capable of communicating on any type and form of network and performing the operations described herein.

Figure 26:
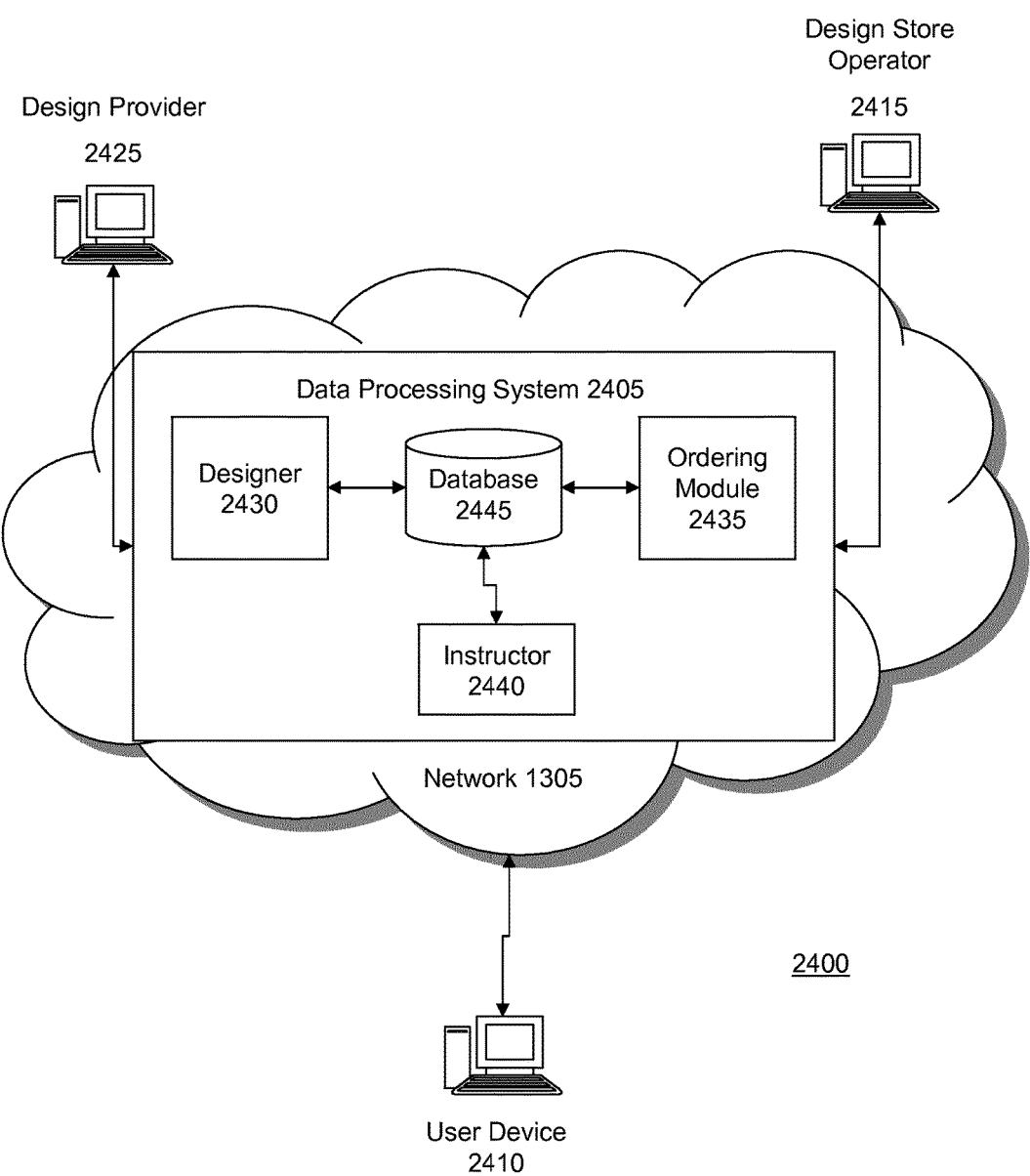
FIG. 26 is an illustration of an example system of a design store via a computer network in accordance with an implementation.

FIG. 26 illustrates an example system 2400 providing an online design store via a computer network such as network 1305. The network 1305 can include computer networks such as the Internet, local, wide, metro, or other area networks, intranets, satellite networks, and other communication networks such as voice or data mobile telephone networks. The network 1305 can be used to access web pages, web sites, domain names, online documents, or uniform resource locators that can be displayed on at least one user device 2410, such as a cutting system, drawing system, laptop, desktop, tablet, personal digital assistant, smart phone, or portable computers. For example, via the network 1305 a user of the user device 2410 can access web pages provided by at least one design store operator 2415. In this example, a web browser of the user device 2410 can access a web server of the design store operator 2415 to retrieve a web page for display on a monitor of the user device 2410. The design store operator 2415 generally includes an entity that operates the design store. In one implementation, the design store operator 2415 includes at least one web page server that communicates with the network 1305 to make the web page available to the user device 2410.

The system 2400 can include at least one data processing system 2405. The data processing system 2405 can include at least one logic device such as a computing device having a processor to communicate via the network 1305, for example with the user device 2410, the design store operator 2415, and at least one design provider 2425. The data processing system 2405 can include at least one server. For example, the data processing system 2405 can include a plurality of servers located in at least one data center. In one implementation, the data processing system 2405 includes a content placement system having at least one server. The data processing system 2405 can also include at least one designer 2430, ordering module 2435, instructor 2440, and database 2445. The designer 2430, ordering module 2435 and instructor 2440 can each include at least one processing unit or other logic device such as programmable logic arrays or application specific integrated circuits configured to communicate with the database 2445. The designer 2430, ordering module 2435, and instructor 2440 can be separate components, a single component, or part of the data processing system 2405.

In some embodiments, the data processing system 2405 includes a designer 2430 configured to provide a plurality of designs to a user of the user device 2410. The designer 2430 may receive a selection of a design and may be further configured to customize the design based on a plurality of parameters. For example, the designer 2430 may customize the design based on length, width or height parameters, weight (e.g., the amount of weight a table might hold), number of drawers, or style. The designer 2430 may receive one or more parameters from a user of the user device 2410.

In some embodiments, the designer 2430 may provide a plurality of options for a design from which a user may select one or more option. For example, the designer 2430 may display, via a user interface, a drop down menu that includes options for the number drawers for a table (e.g., 1, 2, or 3 drawers). Designer 2430 may receive a selection of the number of drawers and design a table accordingly.

In some embodiments, the designer 2430 may be configured to determine a design plan based on the dimensions or other parameters. For example, if the table top is two feet by four feet, the designer 2430 may determine to order a piece of wood with the dimensions of two feet by four feet. The designer 2430 may further determine that there are four drawers and each drawer needs four pieces with dimensions one foot by two feet each. In some embodiments, the designer 2430 may determine to generate a design plan such that all four pieces can be cut out of a single piece of wood, two pieces of wood, or as four pieces of wood.

In some embodiments, the designer 2430 may be configured to transmit the design plan to the user device 2410, such as, e.g., a cutting system disclosed herein. The user device 2410 may include a communication interface configured to receive the design plan. The design plan may include a CAD drawing, JPEG, GIF, BMP, or any other format or software that can convey a design plan. The designer 2430 may convey the design to the user device 2410 via the network, over a wireless protocol, flash drive, USB drive, or wired link (e.g., USB cable, serial port, Ethernet, or Firewire). In some embodiments, a user may draw the design plan on the target material. In some embodiments, the user may print the design plan and place it on the target material. In some embodiments, the system may take a picture of the design plan and overlay the design on the digital map of the material. In some embodiments, the system may relate the design plan to scanned data of the surface of the material (e.g., correlate the design plan to the scanned data, map the design plan to the scanned data, register the design plan to the scanned data, etc.). For example, the scanned data may include a digital map of the surface of the material with which the system can relate the design plan.

In some embodiments, the data processing system 2405 includes an ordering module 2435 configured to determine supplies or parts needed to build the design or order the parts and supplies from a vendor. For example, the ordering module 2435 may determine, based on the design, the dimensions of a piece of wood and the type of wood being used for the project and identify a vendor that supplies the wood. The ordering module 2435 may search a database of a vendor or may send a query to a vender, via the network, to determine whether the vendor can provide the part.

In some embodiments, the ordering module 2435 may facilitate purchasing the part. The ordering module 2435 may prompt the user to enter payment information and relay the payment information to the vendor so that user can directly or indirectly purchase the supplies from the vendor.

In some embodiments, the data processing system 2445 may include an instructor 2440 configured to provide instructions to a user of the user device 2410. Instructions may include instructions on how to select a design, customize a design, order supplies, transfer the design plan to a user device 2410 or cutting or drawing system, safety tips, how to use a cutting tool, or assembly instructions. In some embodiments, the instructor 2440 may provide video tutorials. In some embodiments, the instructor 2440 may provide interactive information. In some embodiments, a user may interact with an online community via the instructor 2440. For example, a user may post questions on a message board, online chat room, or another online medium in which another user of the system 2405 can response to a question.

In some embodiments, the data processing system 2405 may include an online community functionality that provides access to reviews and ratings provided by other users. For example, users of the data processing system 2405 comprising the online community may rate a design plan for a table and further write a review. In some embodiments, users may generate their own designs to the designer 2430 which may be stored in the database 2445.

In some embodiments, the data processing system 2405 may be configured to allow users to purchase designs using money, tokens, points, or another form of compensation. In some embodiments, users may sell their own designs (e.g., design providers 2425) via the data processing system 2405. In some embodiments, where a user modifies a design and sells the modified design, the user selling the modified version may receive a portion of the purchase price while the original design provider 2425 who created the original design may receive a portion of the purchase price. In some embodiments, the entity controlling the data processing system 2405, e.g., the design store operator 2415, may receive portion of the purchase price.

The design plans purchased via the data processing system 2405 may be encoded such that they can only be transmitted or used by authorized users, which may be users that purchased the design. In some embodiments, users may obtain a monthly or yearly membership to the design store allowing them to purchase and use up to a certain number of designs per time interval (possibly based on membership fee) or unlimited designs during a time interval.

Although various acts are described herein according to the exemplary method of this disclosure, it is to be understood that some of the acts described herein may be omitted, and others may be added without departing from the scope of this disclosure.

It will be recognized by those skilled in the art that changes or modifications may be made to the herein described embodiments without departing from the broad concepts of the disclosure. It is understood therefore that the disclosure is not limited to the particular embodiments which are described, but is intended to cover all modifications and changes within the scope and spirit of the disclosure.

The systems described herein may provide multiple ones of any or each of those components and these components may be provided on either a standalone machine or, in some embodiments, on multiple machines in a distributed system. The systems and methods described herein may be implemented as a method, apparatus or article of manufacture using programming or engineering techniques to produce software, firmware, hardware, or any combination thereof. In addition, the systems and methods described herein may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs), hardware (e.g., integrated circuit chip, Field Programmable Gate Array (FPGA), Application Specific Integrated Circuit (ASIC)), electronic devices, a computer readable non-volatile storage unit (e.g., CD-ROM, floppy disk, hard disk drive). The article of manufacture may be accessible from a file server providing access to the computer-readable programs via a network transmission line, wireless transmission media, signals propagating through space, radio waves, or infrared signals. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for virtualizing audio hardware for one or more virtual machines, it will now become apparent to one of skill in the art that other embodiments incorporating the concepts of the disclosure may be used.

While various embodiments have been described and illustrated herein, those of ordinary skill in the art will readily envision a variety of other means or structures for performing the function or obtaining the results or one or more of the advantages described herein, and each of such variations or modifications is deemed to be within the scope of the embodiments described herein. More generally, those skilled in the art will readily appreciate that all parameters, dimensions, materials, and configurations described herein are meant to be exemplary and that the actual parameters, dimensions, materials, or configurations will depend upon the specific application or applications for which the teachings are used. Those skilled in the art will recognize, or be able to ascertain using no more than routine experimentation, equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, or method described herein. In addition, any combination of two or more such features, systems, articles, materials, kits, or methods, if such features, systems, articles, materials, kits, or methods are not mutually inconsistent, is included within the scope of the present disclosure.

The herein-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

The concept described herein may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments described herein. The computer readable medium or media can be transportable, such that the program or programs stored thereon can be loaded onto one or more different computers or other processors to implement various aspects and embodiments described herein.

The terms "program" or "software" are used herein in a generic sense to refer to any type of computer code or set of computer-executable instructions that can be employed to program a computer or other processor to implement various aspects of embodiments as discussed herein. Additionally, according to one aspect, one or more computer programs that when executed perform methods or operations described herein need not reside on a single computer or processor, but may be distributed in a modular fashion amongst a number of different computers or processors to implement various aspects or embodiments described herein.

Computer-executable instructions may be in many forms, such as program modules, executed by one or more computers or other devices. Generally, program modules include routines, programs, objects, components, or data structures that perform particular tasks or implement particular abstract data types. Typically the functionality of the program modules may be combined or distributed as desired in various embodiments.

The data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. Any suitable mechanism may be used to establish a relationship between information in fields of a data structure, including through the use of pointers, tags or other mechanisms that establish relationship between data elements.

The concepts described herein may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

As used herein, the terms "light", "optical" and related terms should not but understood to refer solely to electromagnetic radiation in the visible spectrum, but instead generally refer to electromagnetic radiation in the ultraviolet (about 10 nm to 390 nm), visible (390 nm to 750 nm), near infrared (750 nm to 1400 nm), mid-infrared (1400 nm to 15,000 nm), and far infrared (15,000 nm to about 1 mm).

The indefinite articles "a" and "an," as used herein in the specification and in the claims, unless clearly indicated to the contrary, should be understood to mean "at least one."

References to "or" may be construed as inclusive so that any terms described using "or" may indicate any of a single, more than one, and all of the described terms.

In the claims, as well as in the specification herein, all transitional phrases such as "comprising," "including," "carrying," "having," "containing," "involving," "holding," "composed of," and the like are to be understood to be open-ended, i.e., to mean including but not limited to.

APPENDIX

0. Abstract

Many kinds of digital fabrication are accomplished by precisely moving a tool along a digitally-specified path. This precise motion is typically accomplished fully automatically using a computer-controlled multi-axis stage. In this approach, one can only create objects smaller than the positioning stage, and large stages can be quite expensive. We propose a new approach to precise positioning of a tool that combines manual and automatic positioning: in this approach, the user coarsely positions a frame containing the tool in an approximation of the desired path, while the device tracks the frame's location and adjusts the position of the tool within the frame to correct the user's positioning error in real time. Because the automatic positioning need only cover the range of the human's positioning error, this frame can be small and inexpensive, and because the human has unlimited range, such a frame can be used to precisely position tools over an unlimited range.

1. Introduction

Personal digital fabrication endeavors to bridge the gap between computer graphics and the real world, turning virtual models into physical objects. Novel software modeling allows users to create unique objects of their own design, e.g. [Mori and Igarashi 2007; Kilian et al. 2008; Lau et al. 2011; Saul et al. 2011], which can then be fabricated using 2D devices such as laser or water jet cutters, or 3D devices such as 3D printers and computer numerical control (CNC) mills. While rapid prototyping machines are dropping in price, affordable tools have severe size limitations because of the expense of a precise and long-range positioning system. As an illustration, a 2'×1.5' ShopBot CNC mill costs approximately $6,000, while a 5'×8' ShopBot mill costs over $20,000 [ShopBot Tools].

We aim to reduce the cost of digital fabrication for the domain of 2D shapes while simultaneously removing constraints on range. Our central idea is to use a hybrid approach to positioning where a human provides range while a tool with a cheap short-range position-adjustment enables precision. Given an input 2D digital plan such as the outline of a shape, the user manually moves a frame containing a tool in a rough approximation of the desired plan. The frame tracks its location and can adjust the position of the tool within the frame over a small range to correct the human's coarse positioning, keeping the tool exactly on the plan (FIG. 2). A variety of tools can be positioned in this manner, including but not limited to a router (which spins a sharp bit to cut through wood, plastic, or sheet metal in an omnidirectional manner) to cut shapes, a vinyl cutter to make signs, and a pen to plot designs.

In this approach, the core challenges are localization (determining the current position of the tool) and actuation (correcting the tool's position). For localization, we use computer vision and special markers placed on the material. For actuation, we present a new two-axis linkage that can adjust the position of the tool within the frame. We also describe an interface for guiding the user using a screen on the frame, which illustrates the tool's current position relative to the plan. We show an example of a device (FIG. 27(a)) built using our approach which can be fitted with a router or a vinyl cutter, and show results that can be achieved with these tools when they are positioned with our computer-augmented approach.

2. Related Work

Personal digital fabrication has been an active area of research within the computer graphics community, in particular on interfaces that integrate fabrication considerations with design. Several papers have presented systems to allow fabrication-conscious design of a variety of material and object types, such as plush toys [Mori and Igarashi 2007], chairs [Saul et al. 2011], furniture [Lau et al. 2011], shapes made out of a single folded piece of material [Kilian et al. 2008], and paneled buildings [Eigensatz et al. 2010]. Other papers explore how to generate designs with desired physical properties, such as deformation characteristics [Bickel et al. 2010], appearance under directed illumination [Alexa and Matusik 2010], and subsurface scattering [Dong et al. 2010; Hašan et al. 2010].

When it comes to fabricating objects from these designs, the most widely used devices are 3D printers, laser cutters, and CNC milling machines. Recently, a variety of efforts growing out of the DIY community have sought to reduce the cost of 3D printers [MakerBot Industries: Drumm 2011; Sells et al.] and CNC mills [Hokanson and Reilly; Kelly] for personal use. These projects typically provide relatively cheap kits for entry-level devices. However, as with professional models, positioning is done with a multi-axis stage, and the tradeoff between cost and range remains.

Our computer-augmented positioning approach removes the limitation on range of the above technologies. To do so, it relies on accurately detecting the position of the frame in real time. A variety of approaches to real-time localization have been employed over the years, from global-scale GPS [Getting 1993] to local-scale systems based on radio and ultrasonic signals [Priyantha et al. 2000]; an overview is given in a survey by Welch and Foxlin [2002].

Our approach to localization is computer vision-based. Computer vision has been widely used for position tracking in the context of motion capture (see Moeslund et al. [2006] for a survey). These setups typically use stationary cameras tracking a moving object, though recently Shiratori et al. [2011] proposed a system in which cameras are placed on the human and track the environment. In our approach, the camera is on the tool and tracks the material over which it moves, first stitching frames together to make a map of the material (see Zitova and Flusser and Szeliski [2006] for surveys of image registration and stitching techniques) and then using that map to perform localization. This approach has been used before, with some differences, in a recent new peripheral, LG's LSM-100 scanner mouse [LG; Zahnert et al. 2010], which is a mouse that can scan a document it is passed over. Our implementation differs from theirs in that we use only a camera (no optical mice), capture a wider area of the material in each frame, and use high-contrast markers placed on the material to allow capture of untextured materials.

3. Localization

To keep the tool on the plan as closely as possible, the tool must detect its current position accurately, robustly, and with low latency.

Figure 28:
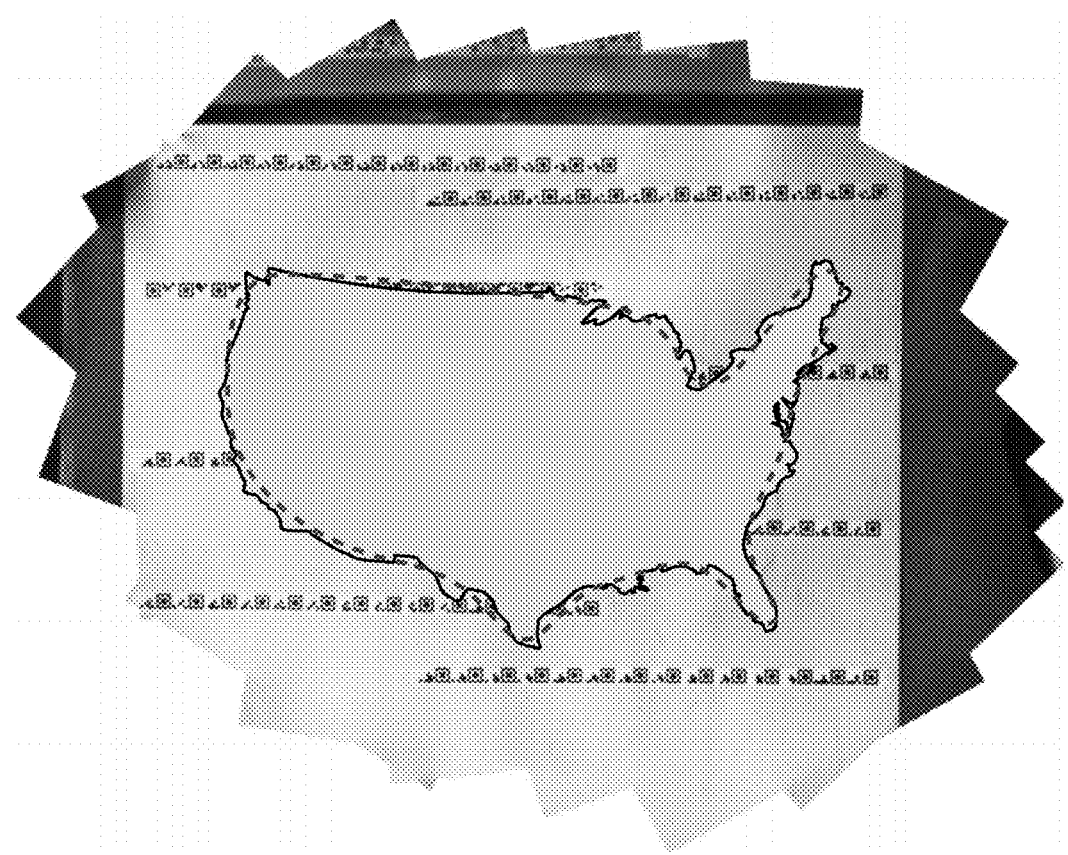
FIG. 28 Map: A scanned map with a plan registered to it. The red dotted line indicates a path that a user could conceivably follow to cut out the shape.

To this end, we considered a variety of localization systems, eventually settling on a simple computer vision-based approach, in which a camera on the frame of the device tracks high-contrast markers placed (in an arbitrary pattern) on the material. In this approach, a map of the material (FIG. 28) is first built by passing the device back and forth over the material to be cut; then, images from the camera are compared to this map to determine the device's location. This was chosen for a variety of reasons: it can achieve very high accuracy; it always remains calibrated to the material (as the markers are on the material itself, as as opposed to, e.g., external beacons, which can become uncalibrated); it does not require excessive setup; the hardware required is relatively inexpensive; and it can be implemented using standard computer vision techniques. Building the map is fast and easy.

3.1. High-Contrast Markers

Figure 29:
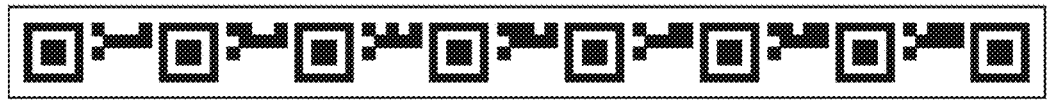
FIG. 29 Markers: A sequence of markers, with values 1000 to 1006, such as would be printed on a strip of tape.

We leverage specially-printed tape marked with high-contrast patterns to make it possible to track materials that have no visual features of their own (such as sheet metal or plastic) and to increase robustness under varying lighting conditions. This tape is applied before map-making, in an any pattern so long as some tape is visible from every position that the device will move to, and can be removed when the job is complete. The tape consists of many QR-code-like markers [Denso-Wave Incorporated] in a row, each consisting of an easily-detectable box-within-box pattern we call an "anchor" and a 2D barcode that associates a unique number with the anchor (see FIG. 29). As long as four of these markers are visible at any time (which is typically the case even if only a single piece of tape is visible), the device is able to locate itself. The redundancy of the markers means that it does not matter if some are occluded (e.g. by sawdust) or obliterated by the tool itself. Note that these markers function just as features their positions are not assumed before mapping, and therefore they need not be laid out in any specific pattern.

3.2. Image Processing

The core operations used during locating and building a map are detecting markers in an image and registering one set of markers onto another.

Detecting markers To detect markers, the frame is first binarized using the Otsu method [1979]. Anchors are extracted using a standard approach to QR code reading: first, horizontal scanlines are searched for runs of alternating pixel colors matching the ratio of 1:1:3:1:1, as will always be found at an anchor. Locations that match this pattern are then checked for the same pattern vertically. Locations that match horizontally and vertically are then flood filled to confirm the box-within-box pattern. Once anchors have been extracted, each anchor is experimentally matched with the nearest anchor, and the area in between is parsed as a barcode. Barcode orientation is disambiguated by having the first bit of the 2D barcode always be 1 and the last bit always be 0. If the parsed barcode does not match this pattern, the next-nearest anchor is tried. If neither matches, the anchor is discarded. If the pattern is matched, the barcode's value is associated with the first anchor and that anchor's position is added to the list of detected markers.

Matching sets of markers One set of markers is matched to another using a RANSAC algorithm. The potential inliers are the pairs of markers from the two sets that share the same ID. The model that is fit is the least-squares Euclidean transformation (rotation and translation).

3.3. Building a Map

Mapping is done by stitching together video frames into a 2D mosaic (FIG. 28) as the user passes the device back and forth over the material. To reduce computation loads, we retain only frames that overlap with the previously retained frame by less than 75%. We use a simple method to stitch images together: as frames are acquired, they are matched to all previous frames and assigned an initial position and orientation by averaging their offsets from successfully matched frames; once all images have been acquired, final positions and orientations are computed by iteratively applying all constraints between successfully matched frames until the system converges to a stable configuration.

Once the map is complete, a super-list of markers for the entire map is generated from the markers in input images by averaging the map-space positions of markers that share the same ID. This global list of known positions for each marker ID is what is used to localize new images when the device is in use.

When preparing to cut a shape, the user will register a shape onto this 2D map. Having the map of the material makes it trivial to visually align the plan with features of the material. This would otherwise require careful calibration relative to a stage's origin point, as is usually the case with a CNC machine.

3.4. Localization Using the Map

Once the map has been created as above, registering a new image to the map is straightforward. Markers are detected as above and matched to the global list of markers from the map using the same RANSAC algorithm as above. An image from the camera can be registered to a map in 4 milliseconds total on a standard laptop. Although localization exhibits strong time-coherence, thanks to the low cost of processing we can afford to solve the system from scratch at every frame.

4. Actuation

Once the location of the frame is known, the tool must be repositioned within the frame to keep it on the plan. This task can be broken down into the control challenge of determining where within the frame to move (as there are usually many possible positions that lie on the plan) and the mechanical engineering challenge of building an accurate, responsive, and low-cost position-adjusting actuation system.

The range of our positioning linkage was determined by first attempting to move the frame along a 2D plan as closely as possible by hand. We found that when provided with accurate location information relative to the plan a user can keep the tool within 1/8" of the plan, even when cutting wood. (Having accurate location information allows for greater precision than normal freehand positioning.) To allow a safety margin and increase ease of use, we doubled this value to arrive at the goal of being able to correct errors up to 1/4" (i.e. having a range circle with a 1/2" diameter).

4.1. Actuation System

The actuation system need only support a small range of motion, as it need only correct the coarse positioning done by the human. This affords the possibility of using a very different design for the positioning system than the multi-axis stage employed by traditional rapid prototyping machines.

Our major mechanical departure from traditional rapid prototyping machines is that we use eccentrics, rather than linear stages, to convert the rotational motion of the motors into linear motion. Eccentrics are circular disks rotating around an off-center shaft. As they are rotated, they produce linear motion in a collar wrapped around the disk. Eccentrics are able to maintain the same low-backlash accuracy of a precision linear stage while being much cheaper. For this, they sacrifice range. However, a linear displacement range of 1/2" is well within the capabilities of an eccentric.

Figure 30A:
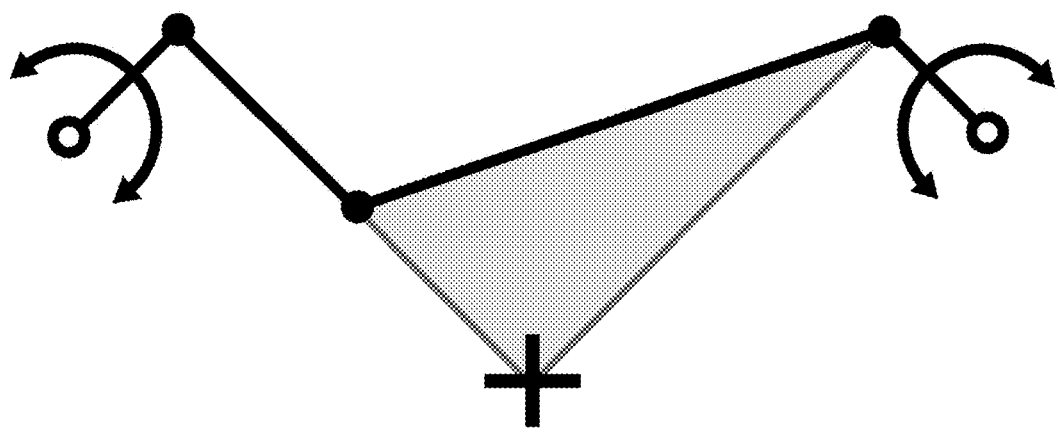
FIG. 30(a) Positioning linkage: The mechanics of our linkage can be conceptualized as two shafts (unfilled circles) rotating arms that are connected with pivots (filled circles) to a rigid stage (shaded region) that holds the spindle (cross). To properly constrain the degrees of freedom of the stage, one arm is directly connected to the stage while the other is connected via an additional hinge.
Figure 30B:
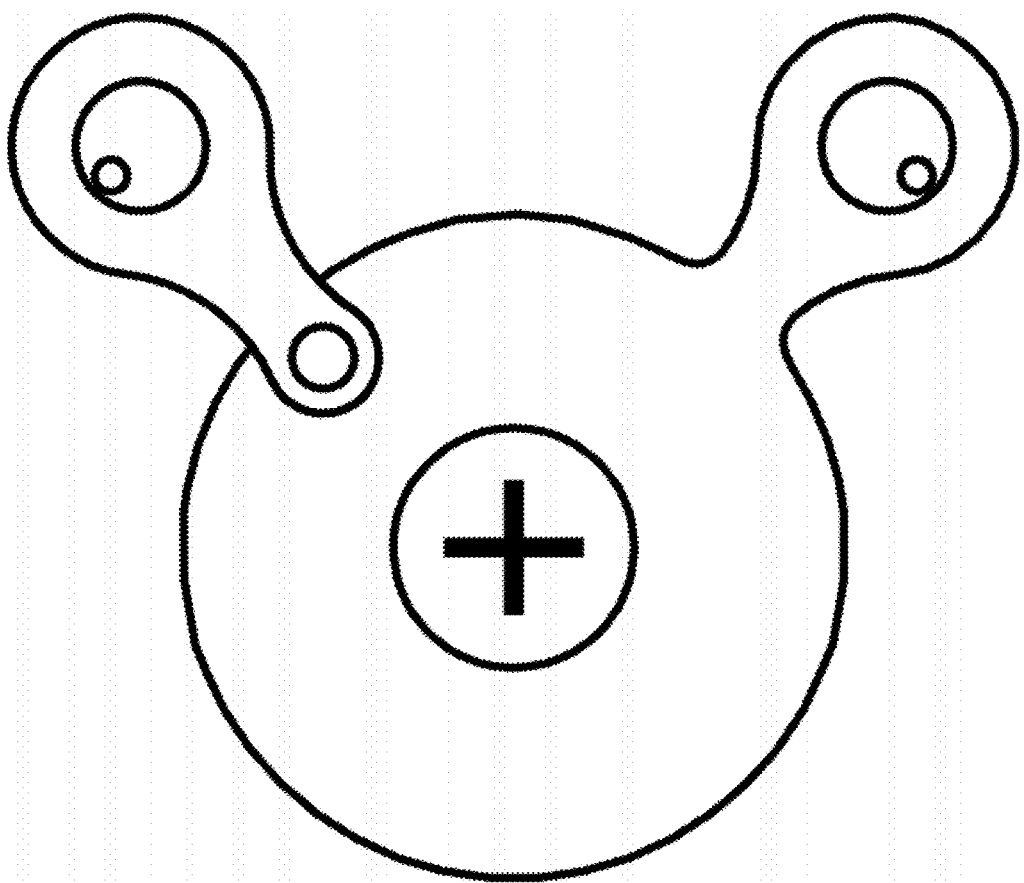
FIG. 30(b) The design is achieved in practice using eccentrics, which are circular disks rotating about off-center shafts to produce linear displacement in fitted collars.

Our design (FIG. 30(*a*), (*b*), FIG. 20) consists of two eccentrics mounted to the frame and connected to a stage that can slide on its base. The eccentrics are rotated by stepper motors, and by rotating them the stage can be moved within the frame. To properly constrain the stage, one eccentric is connected directly to the stage by a ball bearing coupling, while the other is connected both by a coupling and a hinge.

This linkage design results in a nonlinear relationship between eccentric orientation and stage position: near the center of its range, moderate rotation of an eccentric produces moderate motion of the stage, while near the edge of its range much larger rotations are necessary to move the stage a fixed amount. We limit stage displacement to ~95% of the maximum range to cut out the positions with extreme nonlinearity. This linkage design also permits backdriving, in that forces acting on the tool can cause the cams to rotate away from their target positions; however, we found that the stepper motors we use (62 oz-in holding torque) are sufficiently powerful to preclude backdriving, even in the presence of significant material forces.

4.2. Following a Plan

As the user moves the frame, the device must ensure that the tool stays on the plan. To do this, the path that is to be followed must be first computed (which may not be the same as the plan); then, every frame, given the frame's position, the tool's position within the frame, and the plan, the device must determine where to move the tool within the frame.

For the applications we focus on—routing and vinyl cutting—the user generally wishes to cut a shape out of a piece of material. This means that there will be some areas of the material that are outside the target shape, and which may be cut freely (which we call "exterior material"), while other areas lie inside the target shape and must not be cut ("interior material"). To allow for this distinction, we define a plan as consisting of polygons, with defined insides and outsides, rather than simply as paths.

In applications such as vinyl cutting, the tool should follow the border of the interior material as closely as possible. When routing, however, the size of the cutting bit must be taken into account, and the tool should move along a path offset from the interior material by the radius of the bit, to leave the actual cut shape as close as possible to the specified plan. We provide an option to set the diameter of the cutting bit and offset the plan polygons accordingly.

We propose two different strategies for moving the tool to keep it on the plan, and will show how each of these is appropriate for a different class of applications.

4.2.1. Constant-Speed Motion

In the simpler strategy, the tool is moved through the material at as close to a constant rate as possible. This strategy is useful for applications such as routing, in which the material may offer resistance if the tool is moved too quickly and may burn if the tool is moved too slowly.

In this approach, the user decides only what polygon to follow and when to start motion. Thereafter, the software drives the tool around that polygon at a constant rate. While the tool is moving, the user moves the frame to keep the tool near the center of its range, ensuring that the tool can continue its constant-speed motion without reaching the end of its range. If the tool does reach the end of its range, it must stop until the user catches up.

4.2.2. Freeform Motion

In the second strategy, the user moves the frame around the plan freely, and the device tries to keep the tool at the point on the plan that most "makes sense" given the user's positioning of the frame. This approach is suitable to applications such as plotting or vinyl cutting in which there is negligible material resistance and no need to move at a constant rate.

The point that the tool is moved to is, generally speaking, the closest point on the border of a plan polygon to the center of the tool's range. However, several considerations make determining the path to get to this point complicated. First, the tool should never move through interior material, even if the shortest path from its current position to the target position goes through it. Second, the tool should seek to follow the border of the interior material even when a shorter direct route is possible through exterior material, to avoid skipping over features of the plan.

Figure 31:
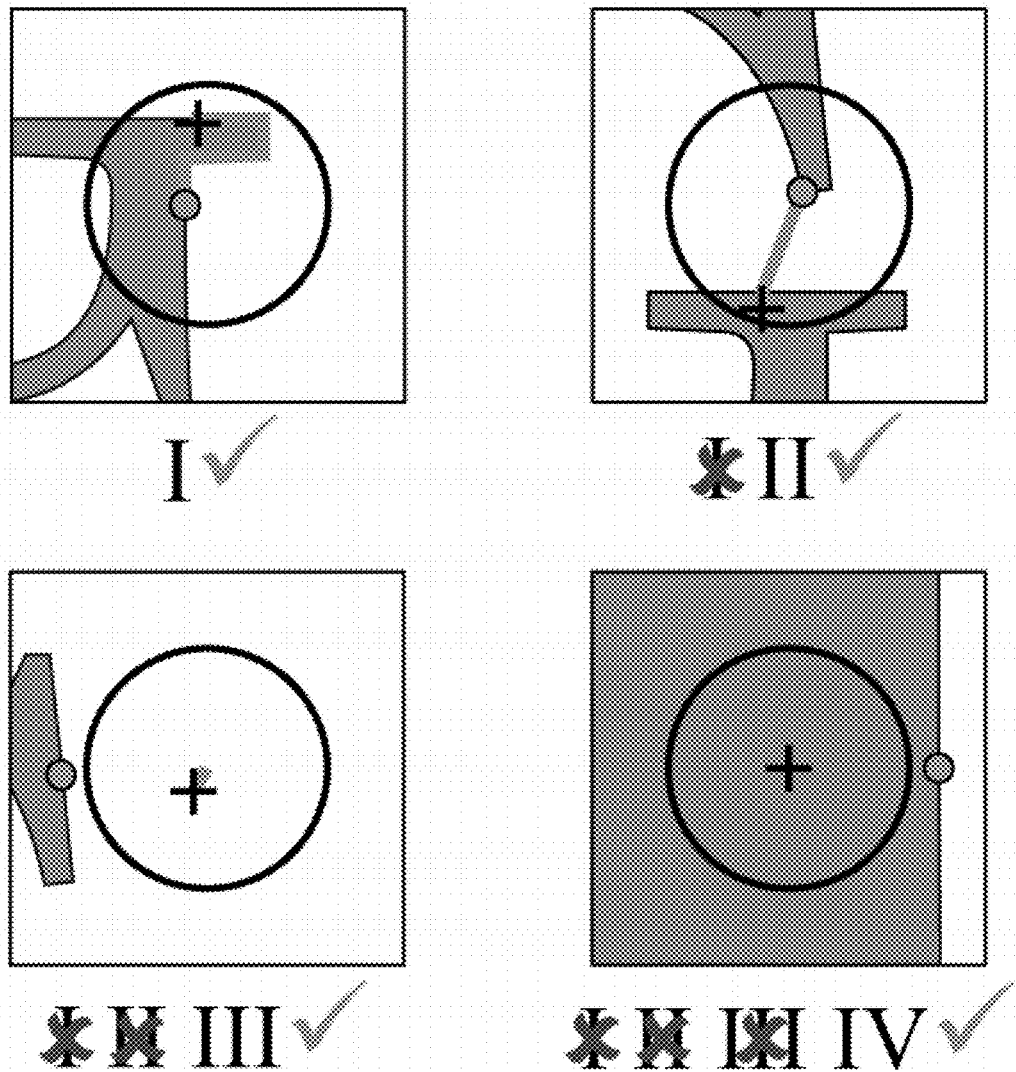
FIG. 31 Freeform motion paths: Each box illustrates a case in which a different path (described below) is used, due to the higher-preference paths being infeasible. In each box, the cross is the current position of the tool, the circle is the range of the positioning system, the green dot is the target position, and the green path is the selected path.

We aim to account for these considerations while also maximizing the predictability of the tool's motion. We propose a simple strategy in which four possible paths are computed each frame, ranking from most desirable to least desirable, and the most desirable path that is feasible is followed. All seek to move the tool to the target position, which is the closest point on the border of a plan polygon to the center of the tool's range, or to the center of the tool's range itself if the target position is not reachable. These paths, illustrated in FIG. 31, are:

I. The path that goes from the tool's position to the nearest point on the border of a polygon, and then walks along the border of that polygon to the target position in whichever direction is shorter. This path is infeasible if it leaves the tool's range or if the target position is on the border of a polygon other than the polygon closest to the tool's position.

II. The path that goes from the tool's position to the nearest exterior material (if it is in the interior material) and then in a straight line to the target position. This path is infeasible if the nearest exterior material is outside the range or the straight line segment passes through interior material.

III. The path that goes from the tool's position to the nearest exterior material (if it is in the interior material) and then in a straight line to the center of the tool's range, stopping whenever interior material is encountered. This path is infeasible if the nearest exterior material lies outside the range of the tool.

IV. Don't move. This path is always feasible.

5. Using the Tool

As described above, use of the device proceeds as follows: the user places marker tape on the material; the user scans the material; the user registers a plan onto the scanned map of the material; the user uses the device to follow the plan. When following a plan, the user roughly follows the shape of the plan, and the positioning linkage moves the router to keep it exactly on the plan. In principle, the tool can follow any 2D path. In the application of routing, this means that it can cut out any 2D shape in a single pass, or more complex 2.5D (heightmap) shapes using multiple passes at different depths.

5.1. User Interface

Figure 32:
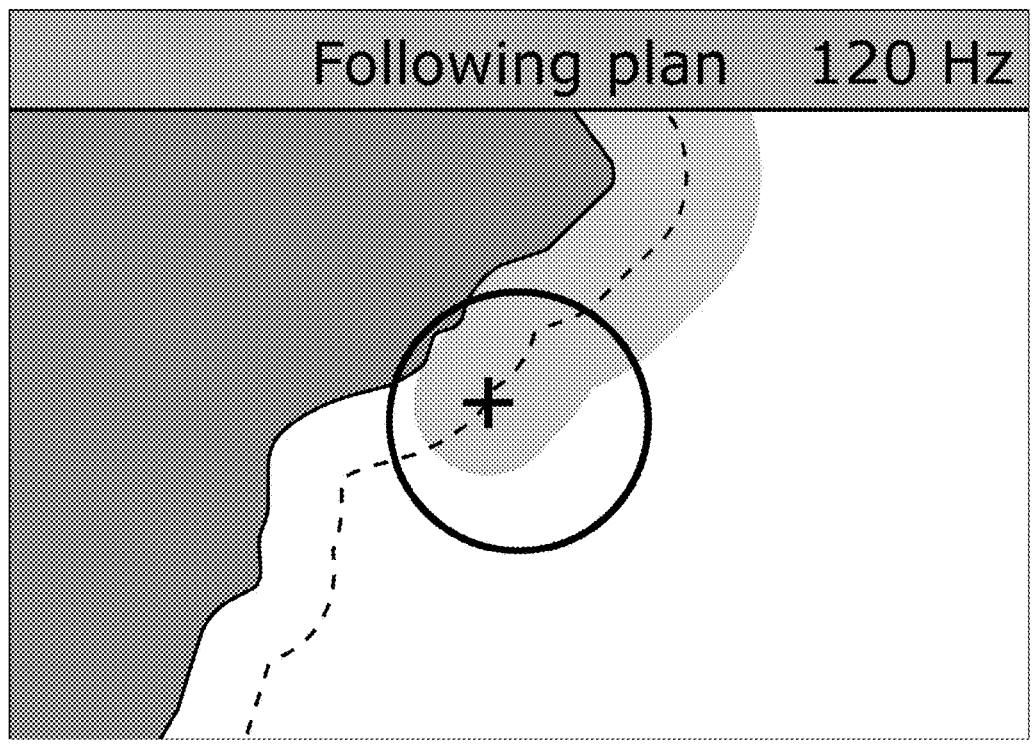
FIG. 32 User interface: This display shows the shapes of the plan (blue polygons); the path that the tool is actually following, which is those shapes offset by the tool's radius (dotted line); the tool's current position (cross); the area cut by the tool (shaded area); and the range of the tool's position correction (black circle). As long as the user keeps the tool path within the correction range, the tool should be able to follow the plan.

When following a plan, the user is shown the position of the tool relative to the plan on the screen (see FIG. 32). In theory, the user's task is to keep the center of the router's motion range as close to the plan as possible. In practice, the user may deviate by as much as the radius of the router's adjustment range.

6. Results

Figure 27A:
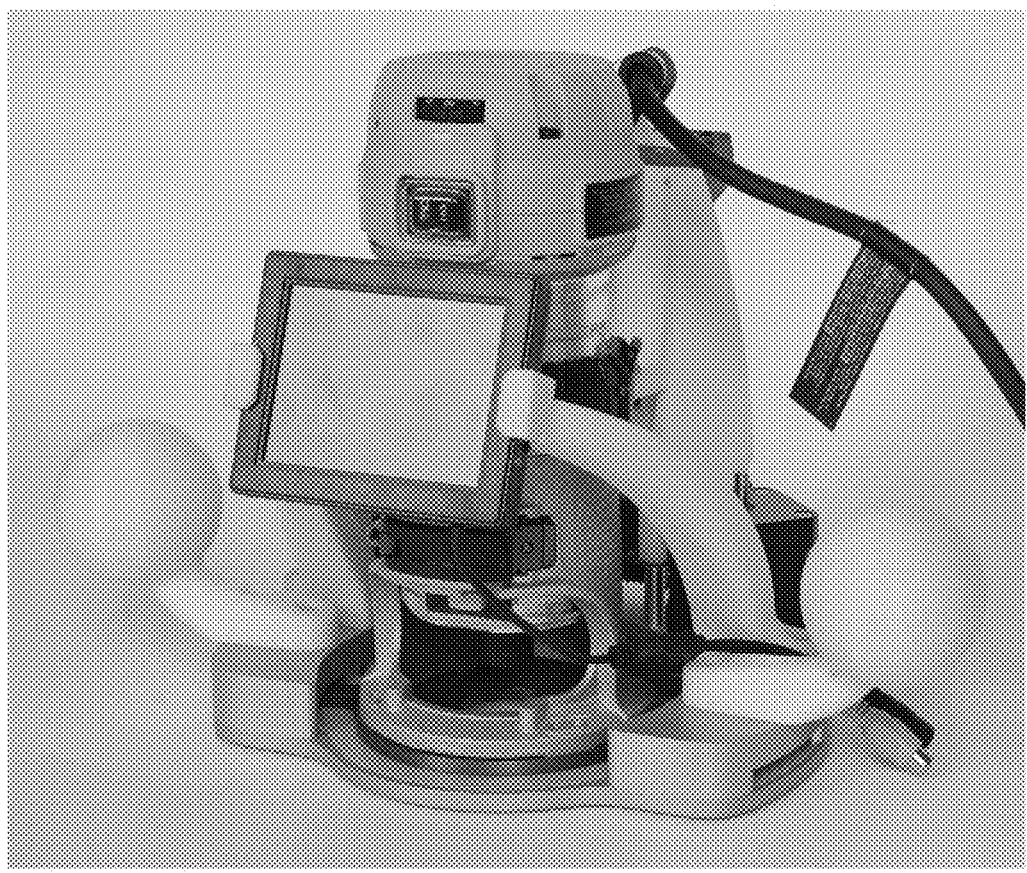
FIG. 27(a) Overview: A position-correcting tool. The device consists of a frame and a tool (in this case a router) mounted within that frame. The frame is positioned manually by the user. The device can adjust the position of the tool within the frame to correct for error in the user's coarse positioning.
Figure 27B:
FIG. 27(b) An example of a shape cut out of wood using such a tool.
Figure 33:
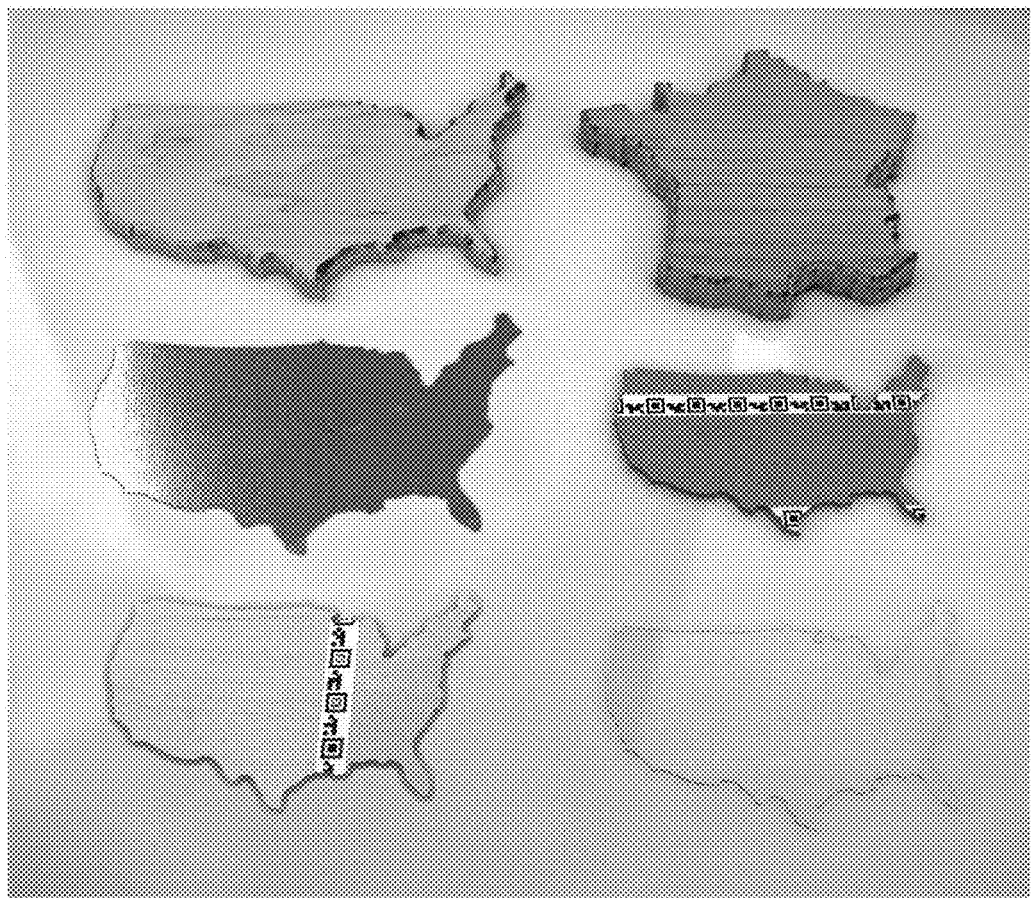
FIG. 33 Results: Several shapes cut out from wood, sheet metal, paperboard, and polycarbonate plastic.

We built a device (FIG. 27(a)) that implements the position-correcting system described above. The device that we built can be mounted a router or vinyl cutter, and can follow any 2D plan. FIGS. 27(b) and 33 show shapes cut out of wood, plastic, paperboard, and sheet metal. FIG. 11, 1175 demonstrates the ability to follow plans of unlimited range with a full-size vinyl cutout of a human silhouette. FIG. 11, 1170 shows an example of a cut shape with high-resolution details.

Figure 34:
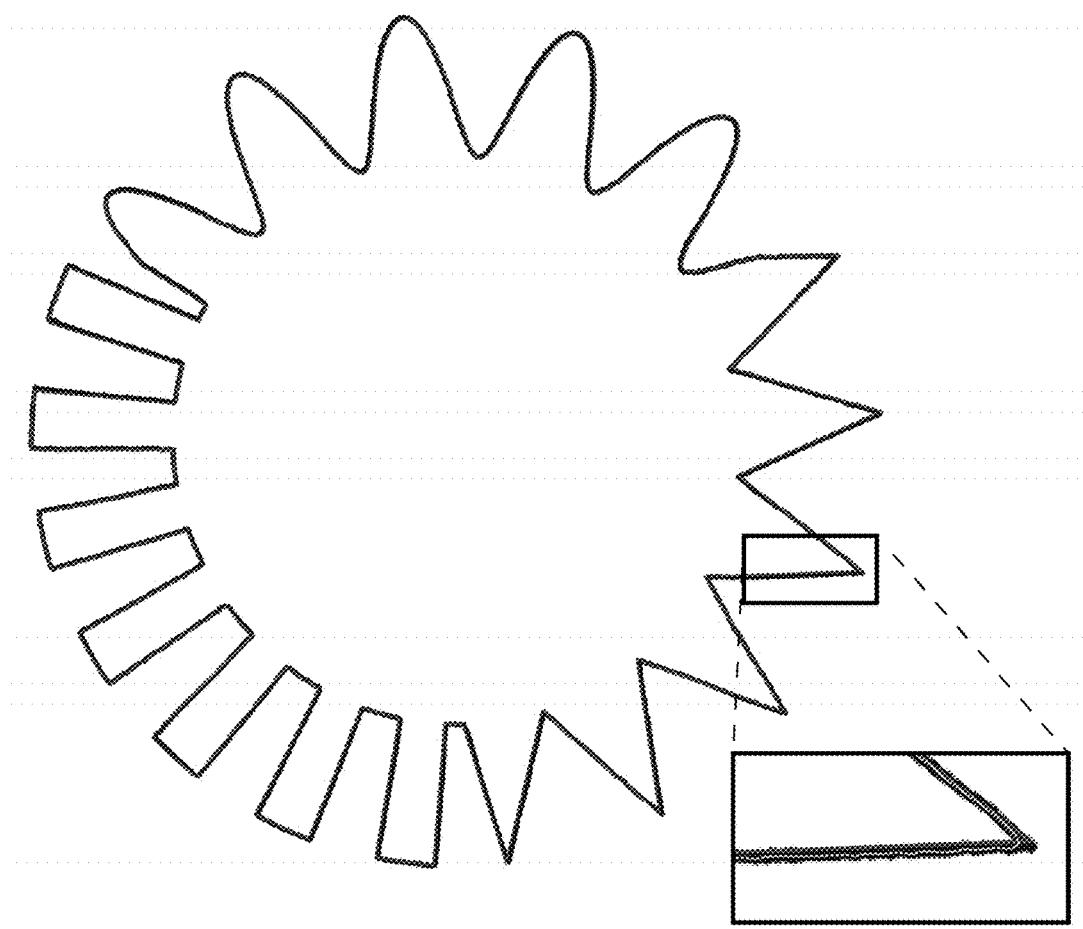
FIG. 34 Accuracy: A scan of a plotted pattern (6" wide) shown with the design that was used to create it (red). The inset shows an expansion of the area of worst error, with the addition of the line fit to the scan for analysis (green). Note that even here the error is only on the order of the width of the pen.

We empirically tested the fidelity of shape reproduction by plotting a complex pattern, scanning the result, and measuring deviation from the digital plan (FIG. 34). The shape was plotted 6" wide. We fitted a curve to the scanned plot, aligned the plan to that curve, and measured deviation from evenly-sampled points along the drawn shape curve to the nearest point on the plan. The average error was 0.009", with a maximum error of 0.023". The error was small enough that the aligned design always fell within the width of the pen stroke.

7. Conclusion and Future Work

We have proposed a computer-augmented positioning system that avoids the cost-versus-range tension that currently affects rapid prototyping devices, and demonstrated a tool using this approach that combines the unlimited range of a human operator with the accuracy of a computerized positioning system. This device incorporates a computer vision-based system for localization and a specially designed low-cost linkage that can be used to adjust the position of a tool within the device's frame. We have shown how this device can be used with a router and a vinyl cutter to accurately fabricate objects from digital plans.

In future work, we would like to explore applying this type of computer-augmented positioning to a variety of other tools and device form factors.

REFERENCES

ALEXA, M., AND MATUSIK, W. 2010. Reliefs as images. ACM Transactions on Graphics 29, 4 (July), 1.

BICKEL, B., BACHER, M., OTADUY, M. A., LEE, H. R., PFISTER, H., GROSS, M., AND MATUSIK, W. 2010. Design and fabrication of materials with desired deformation behavior. ACM Transactions on Graphics 29, 4 (July), 1.

DENSO-WAVE INCORPORATED. QR Code Specification. http://www.denso-wave.com/qrcode/index-e.html.

DONG, Y., WANG, J., PELLACINI, F., TONG, X., AND GUO, B. 2010. Fabricating spatially-varying subsurface scattering. ACM Transactions on Graphics 29, 4 (July), 1.

DRUMM, B., 2011. Printrbot. http://www.printrbot.com/.

EIGENSATZ, M., KILIAN, M., SCHIFTNER, A., MITRA, N. J., POTTMANN, H., AND PAULY, M. 2010. Paneling architectural freeform surfaces. In ACM SIGGRAPH 2010 papers on—SIG-GRAPH '10, ACM Press, New York, N.Y., USA, vol. 29, 1.

FERRAIOLO, J., FUJISAWA, J., AND JACKSON, D., 2003. Scalable Vector Graphics (SVG) 1.1 Specification. World Wide Web Consortium, Recommendation REC-SVG11-20030114.

GETTING, I. 1993. Perspective/navigation—The Global Positioning System. IEEE Spectrum 30, 12, 36-38, 43-47.

GROSS, M. 2009. Now More than Ever: Computational Thinking and a Science of Design. 16, 2, 50-54.

HAŠAN, M., FUCHS, M., MATUSIK, W., PFISTER, H., AND RUSINKIEWICZ, S. 2010. Physical reproduction of materials with specified subsurface scattering. In ACM SIGGRAPH 2010 papers on—SIGGRAPH '10, ACM Press, New York, N.Y., USA, vol. 29, 1.

HOKANSON, T., AND REILLY, C. DIYLILCNC. http://diylilcnc.org/.

KELLY, S. Bluumax CNC. http://www.bluumaxcnc.com/Gantry-Router.html.

KILIAN, M., FLORY, S., CHEN, Z., MITRA, N. J., SHEFFER, A., AND POTTMANN, H. 2008. Curved folding. ACM Transactions on Graphics 27, 3 (August), 1.

LANDAY, J. A. 2009. Technical perspectiveDesign tools for the rest of us. Communications of the ACM 52, 12 (December), 80.

LAU, M., OHGAWARA, A., MITANI, J., AND IGARASHI, T. 2011. Converting 3D furniture models to fabricatable parts and connectors. In ACM SIGGRAPH 2011 papers on—SIGGRAPH '11, ACM Press, New York, N.Y., USA, vol. 30, 1.

LG. LSM-100. http://www.lg.com/ae/it-products/external-hard-disk/LG-LSM-100.jsp.

MAKERBOT INDUSTRIES. MakerBot. http://www.makerbot.com/.

MOESLUND, T. B., HILTON, A., AND KRÜGER, V. 2006. A survey of advances in vision-based human motion capture and analysis. Computer Vision and Image Understanding 104, 2-3 (November), 90-126.

MORI, Y., AND IGARASHI, T. 2007. Plushie. In ACM SIGGRAPH 2007 papers on—SIGGRAPH '07, ACM Press, New York, N.Y., USA, vol. 26, 45.

OTSU, N. 1979. A Threshold Selection Method from Gray-Level Histograms. IEEE Transactions on Systems, Man, and Cybernetics 9, 1, 62-66.

PRIYANTHA, N. B., CHAKRABORTY, A., AND BALAKRISHNAN, H. 2000. The Cricket location-support system. In Proceedings of the 6th annual international conference on Mobile computing and networking—MobiCom '00, ACM Press, New York, N.Y., USA, 32-43.

SAUL, G., LAU, M., MITANI, J., AND IGARASHI, T. 2011. SketchChair. In Proceedings of the fifth international conference on Tangible, embedded, and embodied interaction—TEI '11, ACM Press, New York, N.Y., USA, 73.

SELLS, E., SMITH, Z., BAILARD, S., BOWYER, A., AND OLLIVER, V. RepRap: The Replicating Rapid Prototyper: Maximizing Customizability by Breeding the Means of Production.

SHIRATORI, T., PARK, H. S., SIGAL, L., SHEIKH, Y., AND HOD-GINS, J. K. 2011. Motion capture from body-mounted cameras. ACM Transactions on Graphics 30, 4 (July), 1.

SHOPBOT TOOLS. ShopBot. http://www.shopbot-tools.com/.

SMITH, A., BALAKRISHNAN, H., GORACZKO, M., AND PRIYANTHA, N. 2004. Tracking moving devices with the cricket location system. In Proceedings of the 2nd international conference on Mobile systems, applications, and services—MobiSYS '04, ACM Press, New York, N.Y., USA, 190.

SZELISKI, R. 2006. Image Alignment and Stitching: A Tutorial. Foundations and Trends in Computer Graphics and Vision 2, 1 (January), 1-104.

WELCH, G., AND FOXLIN, E. 2002. Motion tracking: no silver bullet, but a respectable arsenal. IEEE Computer Graphics and Applications 22, 6 (November), 24-38.

WEYRICH, T., DENG, J., BARNES, C., RUSINKIEWICZ, S., AND FINKELSTEIN, A. 2007. Digital bas-relief from 3D scenes. In ACM SIGGRAPH 2007 papers on—SIGGRAPH '07, ACM Press, New York, N.Y., USA, vol. 26, 32.

XIN, S., LAI, C.-F., FU, C.-W., WONG, T.-T., HE, Y., AND COHEN-OR, D. 2011. Making burr puzzles from 3D models. ACM Transactions on Graphics 30, 4 (July), 1.

ZAHNERT, M. G., FONSEKA, E., AND ILIC, A., 2010. Handheld Scanner with High Image Quality.

ZITOVA, B., AND FLUSSER, J. 2003. Image registration methods: a survey. Image and Vision Computing 21, 11 (October), 977-1000.

What is claimed is:

1. A computer-implemented method of positioning a cutting instrument mounted in a rig, the method comprising:
   scanning, by a first sensor, a first portion of a surface of a material to obtain scanned data, wherein the scanned data is used to generate first data;
   scanning, by a second sensor coupled to one or more processors, a second portion of the surface of the material to obtain second scanned data, wherein the second sensor is separate from the first sensor;
   determining, by at least one of the one or more processors and based at least in part upon the first data and the second scanned data, a position of the cutting instrument;
   comparing, using at least one of the one or more processors, the position of the cutting instrument to a desired path, wherein the desired path is based at least in part upon a design plan; and
   responsive to the comparison and using at least one actuator, moving the cutting instrument to a target point on the desired path.

2. The method of claim 1, comprising:
   causing a display device to display, based at least in part upon at least one of the first data or the second scanned data, an image overlaid with an indication of the position of the cutting instrument, wherein the display device is coupled to at least one of the one or more processors.

3. The method of claim 1, wherein the surface is marked with a marker, the marker comprising at least one of a sticker, ink, paint, graphite, a light beam, pencil mark, a barcode, tape, a drawing, or a pattern, the method comprising:
   identifying, by at least one of the one or more processors, a variation in the appearance of the marked surface of the material based at least in part upon a characteristic of the marker.

4. The method of claim 1, comprising:
   relating, using at least one of the one or more processors, the design plan to at least a portion of the first data.

5. The method of claim 4, comprising:
   identifying, by at least one of the one or more processors, the design plan based at least in part upon the scanned data, wherein the scanned data includes an indication of the design plan.

6. The method of claim 4, comprising:
   obtaining, via a communication interface coupled to at least one of the one or more processors, the design plan.

7. The method of claim 6, comprising:
   selecting, using at least one of the one or more processors, the design plan via an online design store.

8. The method of claim 4, comprising:
   modifying, using at least one of the one or more processors, the design plan.

9. The method of claim 4, comprising:
   obtaining, via a user interface of the user device, an input related to the design plan.

10. The method of claim 9, wherein the input corresponds to at least one or more of: a distance, an angle, a shape, or a free hand drawing.

11. The method of claim 1, wherein an eccentric mechanism is used to move the cutting instrument.

12. The method of claim 1, wherein a work area, comprising at least a portion off of the surface of the material, is marked with a marker, the method comprising:
   identifying, by at least one of the one or more processors, a variation in the appearance of the marked work area based at least in part up on a characteristic of the marker, the marked work area being off of the surface of the material.

13. The method of claim 1, wherein the cutting instrument is a router bit.

14. The method of claim 1, wherein the first sensor is in a first camera and the second sensor is in a second camera.

15. The method of claim 1, wherein the desired path is based at least in part upon a physical dimension of the cutting instrument.

16. The method of claim 1, comprising:
moving, using the at least one actuator, the cutting instrument from the target point to engage the material along the desired path to remove some of the material.

17. The method of claim 1, wherein the first data is generated by stitching together a plurality of the scanned data.

18. The method of claim 1, wherein the first portion of the surface includes at least a portion of the second portion of the surface.

19. A system for positioning a cutting instrument mounted in a rig, the system comprising:
at least one actuator;
a first sensor configured to scan a first portion of a surface of a material to obtain scanned data, wherein the scanned data is used to generate first data; and
a second sensor coupled to one or more processors, wherein the second sensor is separate from the first sensor, and at least one of the one or more processors is configured to:
scan, by the second sensor, a second portion of the surface of the material to obtain second scanned data;
determine, based at least in part upon the first data and the second scanned data, a position of the cutting instrument;
compare the position of the cutting instrument to a desired path, wherein the desired path is based at least in part upon a design plan; and
responsive to the comparison and using the at least one actuator, move the cutting instrument to a target point on the desired path.

20. The system of claim 19, comprising:
a display device coupled to at least one of the one or more processors;
wherein at least one of the one or more processors is configured to:
cause the display device to display, based at least in part upon at least one of the first data or the second scanned data, an image overlaid with an indication of the position of the cutting instrument.

21. The system of claim 19, comprising:
a marker configured to mark the surface of the material, the marker comprising at least one of a sticker, ink, paint, graphite, a light beam, pencil mark, a barcode, tape, a drawing, or a pattern, and wherein the surface is marked with the marker;
wherein at least one of the one or more processors is configured to:
identify a variation in the appearance of the marked surface of the material based at least in part upon a characteristic of the marker.

22. The system of claim 19, wherein at least one of the one or more processors is configured to:
relate the design plan to at least a portion of the first data.

23. The system of claim 22, wherein at least one of the one or more processors is configured to:
identify the design plan based at least in part upon the scanned data, wherein the scanned data includes an indication of the design plan.

24. The system of claim 22, comprising:
a communication interface coupled to at least one of the one or more processors;
wherein at least one of the one or more processors is configured to:
obtain the design plan via the communication interface.

25. The system of claim 24, comprising:
an online design store;
wherein the communication interface is configured to obtain the design plan selected via the online design store.

26. The system of claim 22, wherein at least one of the one or more processors is configured to:
modify the design plan.

27. The system of claim 22, wherein at least one of the one or more processors is configured to:
obtain, via a user interface of the user device, an input related to the design plan.

28. The system of claim 19, comprising:
an eccentric mechanism coupled to the cutting instrument, wherein the eccentric mechanism is used to move the cutting instrument.

29. The system of claim 19, wherein a work area, comprising at least a portion off of the surface of the material, is marked with a marker, and wherein at least one of the one or more processors is configured to:
identify a variation in the appearance of the marked work area based at least in part upon a characteristic of the marker, the marked work area being off of the surface of the material.

30. The system of claim 19, wherein the desired path is based at least in part upon a physical dimension of the cutting instrument.

31. The system of claim 19, wherein at least one of the one or more processors is configured to:
move, using the at least one actuator, the cutting instrument from the target point to engage the material along the desired path to remove some of the material.

32. The system of claim 19, wherein the first data is generated by stitching together a plurality of the scanned data.

33. The system of claim 19, wherein the first portion of the surface includes at least a portion of the second portion of the surface.

34. A non-transitory computer readable medium storing executable instructions that position a cutting instrument mounted in a rig, wherein a first sensor is configured to scan a first portion of a surface of a material to obtain scanned data, the scanned data is used to generate first data, and the instructions, when executed by a computing system, cause the computing system to:
scan, by a second sensor, a second portion of the surface of the material to obtain second scanned data, wherein the second sensor is separate from the first sensor;
determine, based at least in part upon the first data and the second scanned data, a position of the cutting instrument;
compare the position of the cutting instrument to a desired path, wherein the desired path is based at least in part upon a design plan; and
responsive to the comparison and using at least one actuator, move the cutting instrument to a target point on the desired path.

35. The computer readable medium of claim 34, wherein the instructions, when executed by the computing system, cause the computing system to:

obtain, via a communication interface, the design plan; and relate the design plan to at least a portion of the first data.

36. The computer readable medium of claim 34, wherein the instructions, when executed by the computing system, cause the computing system to:

cause a display device to display, based at least in part upon at least one of the first data or the second scanned data, an image overlaid with an indication of the position of the cutting instrument.

37. The computer readable medium of claim 34, wherein the surface of the material is marked with a marker, the marker comprising at least one of a sticker, ink, paint, graphite, a light beam, pencil mark, a barcode, tape, a drawing, or a pattern, and wherein the instructions, when executed by the computing system, cause the computing system to:

identify a variation in the appearance of the marked surface of the material based at least in part upon a characteristic of the marker.

38. The computer readable medium of claim 34, wherein a work area, comprising at least a portion off of the surface of the material, is marked with a marker, and wherein the instructions, when executed by the computing system, cause the computing system to:

identify a variation in the appearance of the marked work area based at least in part upon a characteristic of the marker, the marked work area being off of the surface of the material.

39. The computer readable medium of claim 34, wherein the desired path is based at least in part upon a physical dimension of the cutting instrument.

40. The computer readable medium of claim 34, wherein the instructions, when executed by the computing system, cause the computing system to:

move, using the at least one actuator, the cutting instrument from the target point to engage the material along the desired path to remove some of the material.

41. The computer readable medium of claim 34, wherein the first data is generated by stitching together a plurality of the scanned data.

42. The computer readable medium of claim 34, wherein the first portion of the surface includes at least a portion of the second portion of the surface.

* * * * *

UNITED STATES PATENT AND TRADEMARK OFFICE
CERTIFICATE OF CORRECTION

PATENT NO. : 10,556,356 B2  
APPLICATION NO. : 14/396291  
DATED : February 11, 2020  
INVENTOR(S) : Rivers et al.

Page 1 of 1

It is certified that error appears in the above-identified patent and that said Letters Patent is hereby corrected as shown below:

On the Title Page

Column 1, (73) Assignee, Line 1 Delete "Sharper" and insert --Shaper-- therefor

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*